United States Patent
Kumamoto

(10) Patent No.: US 10,469,724 B2
(45) Date of Patent: Nov. 5, 2019

(54) IMAGING AND DISPLAYING DEVICE AND METHOD OF OPERATION OF IMAGING AND DISPLAYING DEVICE

(71) Applicant: Panasonic Intellectual Property Management Co., Ltd., Osaka (JP)

(72) Inventor: Yoshinori Kumamoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/707,044

(22) Filed: May 8, 2015

(65) Prior Publication Data
US 2015/0332090 A1    Nov. 19, 2015

(30) Foreign Application Priority Data

May 16, 2014  (JP) .................................. 2014-102524
Jan. 20, 2015  (JP) .................................. 2015-008746

(51) Int. Cl.
*H04N 5/232*    (2006.01)
*H04N 5/225*    (2006.01)
(Continued)

(52) U.S. Cl.
CPC ......... *H04N 5/232* (2013.01); *G06K 9/00013* (2013.01); *G06K 9/00369* (2013.01);
(Continued)

(58) Field of Classification Search
CPC ............... G06Q 30/06; G06Q 30/0619; G06Q 30/0627; G06Q 30/0621; G06Q 30/0631;
(Continued)

(56) References Cited

U.S. PATENT DOCUMENTS 7,978,246 B2 *  7/2011  Osann, Jr. ............... A47F 10/00
                                                  348/333.01
8,760,489 B1 *  6/2014  Osher .................... H04N 7/147
                                                  348/14.01
(Continued)

FOREIGN PATENT DOCUMENTS

JP       6-030406        2/1994
JP    2002-232856        8/2002
(Continued)

OTHER PUBLICATIONS

Toshi Minami "Television Telephone set" The Journal of the Institute of Electronics and Communication Engineers of Japan, vol. 56, Nov. 1973, pp. 1485-1490.

*Primary Examiner* — Lin Ye
*Assistant Examiner* — Tuan H Le
(74) *Attorney, Agent, or Firm* — Greenblum & Bernstein, P.L.C.

(57) ABSTRACT

An imaging and displaying device according to the present disclosure includes an imaging device that takes an image of a subject including a user; a display; and an image processor that receives data of an image of the subject taken by the imaging device and causes the image to be displayed on the display. The imaging device includes an imaging element that is disposed so that a normal to an imaging surface is horizontal; an optical system that has a lens for forming the image of the subject on the imaging surface; and an optical axis shift device. The optical axis shift device supports at least one of the imaging element and the lens in such a manner that the at least one is movable in a direction parallel with the imaging surface and that shifts the movably supported imaging element or lens in the direction parallel with the imaging surface.

9 Claims, 50 Drawing Sheets

(51) Int. Cl.
*G06K 9/00* (2006.01)
*G06T 7/60* (2017.01)
*G06K 9/03* (2006.01)
*H04N 7/18* (2006.01)
*H04N 101/00* (2006.01)

(52) U.S. Cl.
CPC ......... *G06K 9/00912* (2013.01); *G06K 9/036* (2013.01); *G06T 7/60* (2013.01); *H04N 5/2254* (2013.01); *H04N 5/23293* (2013.01); *H04N 5/23296* (2013.01); *H04N 7/18* (2013.01); *G06T 2207/10004* (2013.01); *H04N 2101/00* (2013.01)

(58) Field of Classification Search
CPC .. H04L 12/10; G06F 1/26; G06K 9/00; G06K 9/03; G06K 9/00369; G06K 9/036; G06K 9/00013; H04N 5/2254; H04N 5/23296; H04N 7/18; H04N 5/232; H04N 5/23293; H04N 2101/00; G06T 7/60; G06T 2207/10004
See application file for complete search history.

(56) References Cited

U.S. PATENT DOCUMENTS

| | | | | |
|---|---|---|---|---|
| 9,013,619 | B2* | 4/2015 | Kim | H04N 5/2251 348/333.06 |
| 9,122,320 | B1* | 9/2015 | Rowles | G06F 3/0317 |
| 2002/0004763 | A1* | 1/2002 | Lam | G06F 1/26 705/26.44 |
| 2008/0294017 | A1* | 11/2008 | Gobeyn | A61B 3/113 600/301 |
| 2010/0007665 | A1* | 1/2010 | Smith | G06T 13/40 345/473 |
| 2010/0177183 | A1* | 7/2010 | Bellis, Sr. | A61B 5/0059 348/77 |
| 2011/0157404 | A1* | 6/2011 | Shiohara | H04N 5/23212 348/222.1 |
| 2011/0216235 | A1* | 9/2011 | Waite | H04N 5/222 348/333.11 |
| 2011/0238218 | A1* | 9/2011 | Lee | G02B 7/1827 700/275 |
| 2012/0200724 | A1* | 8/2012 | Dua | H04N 5/23296 348/222.1 |
| 2012/0229616 | A1* | 9/2012 | Koike | H04N 7/183 348/77 |
| 2014/0192217 | A1* | 7/2014 | Kim | H04N 5/23293 348/222.1 |
| 2014/0289270 | A1* | 9/2014 | Jafarifesharaki | H04L 67/42 707/769 |

FOREIGN PATENT DOCUMENTS

| | | |
|---|---|---|
| JP | 2002-354334 A | 12/2002 |
| JP | 2003-186075 A | 7/2003 |
| JP | 2004-297733 | 10/2004 |
| JP | 2004-297734 | 10/2004 |
| JP | 2009-284361 | 12/2009 |
| JP | 2011-118330 | 6/2011 |
| JP | 2011-249873 A | 12/2011 |
| JP | 2012-060547 | 3/2012 |
| JP | 2013-157845 A | 8/2013 |

* cited by examiner

IMAGING AND DISPLAYING DEVICE AND METHOD OF OPERATION OF IMAGING AND DISPLAYING DEVICE

BACKGROUND

1. Technical Field

The present disclosure relates to an imaging and displaying device and a method of operation of the imaging and displaying device.

2. Description of the Related Art

In recent years, imaging and displaying devices are increasingly used indoors and outdoors. Typical examples of an imaging and displaying device include an electronic mirror, a video phone, and digital signage. In these devices, first, an image of a user is taken. Then, the image is subjected to lateral inversion, adjustment of brightness and colors, treatment, and the like, and then the image of the user is displayed on a display.

An imaging and displaying device can have an electronic mirror function. According to the electronic mirror function, a user can see himself or herself on a display. An interactive mirror is disclosed in Japanese Unexamined Patent Application Publication No. 2009-284361.

SUMMARY

The following is provided as an exemplary embodiment of the present disclosure.

In one general aspect, the techniques disclosed here feature an imaging and displaying device including: an imager that takes an image of a subject including a user; a display; and an image processor that receives data of an image of the subject taken by the and causes the image to be displayed on the display, wherein the imaging device includes: an imaging element that is disposed so that a normal to an imaging surface is horizontal; an optical system that has a lens for forming the image of the subject on the imaging surface; and an optical axis shift device that supports at least one of the imaging element and the lens in such a manner that the at least one of the imaging element and the lens is movable in a direction parallel with the imaging surface and shifts the imaging element or the lens, which is movably supported, in the direction parallel with the imaging surface.

According to the imaging and displaying device of the present disclosure, an imaging and displaying device with improved practicality is provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Specific problems found by the inventors of the present invention are described before embodiments of the present disclosure are described.

For example, in achieving the electronic mirror function, there is a problem that a user's line of sight does not match that in an image. This is because of a physical restriction that a camera cannot be placed at a position where the user's face is appearing on a display. According to the interactive mirror of Japanese Unexamined Patent Application Publication No. 2009-284361, a camera is placed beside a display, and therefore a user's line of sight does not match that on the display. Similarly, in a case where an imaging and displaying device is used as a video phone, a user's line of sight does not match that of a communication partner in an image.

One solution to the problem of mismatch between lines of sight is to place a camera in front of a face (in the direction of the light of sight). This is achieved, for example, by a method of spatially or temporally separating light that travels from a user to a camera and light that travels from a display to the user.

Examples of the method of separating light spatially are a method using a half mirror (for example, Japanese Unexamined Patent Application Publication No. 2002-232856), a method using a hologram screen as a screen on which an image is projected from a projector (for example, Japanese Patent No. 3122531), and a method of disposing an imaging element behind a display that is provided with a narrow hole (for example, Japanese Unexamined Patent Application Publication No. 2011-118330).

An example of the method of separating light temporally is a method using transmissive liquid crystals (for example, Japanese Unexamined Patent Application Publication No. 2004-297733). Note that a method of synthesizing a front image from images taken by multi-view cameras instead of disposing a camera in the direction of the line of sight (for example, Japanese Unexamined Patent Application Publication No. 2004-297734 and Japanese Unexamined Patent Application Publication No. 2012-60547) is also known.

Although the problem of mismatch between lines of sight can be solved by the above conventional art, another problem that an image is distorted in a case where the whole body of a user is displayed on a relatively large display occurs. A conventional video phone rarely displays the whole body of a user, and it is only necessary that the portion of the body above the chest be displayed. However, in the case of an electronic mirror or digital signage, there are situations where the whole body of a user is taken and displayed on a large display. In such cases, if an imaging device is disposed outside the display, there occurs a problem that the shape of the body of the user displayed on the display becomes distorted.

Figure 17A:
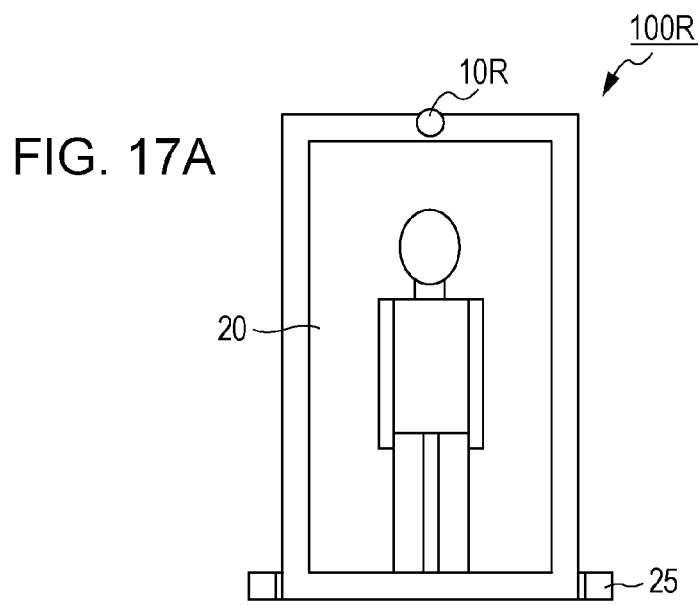
FIG. 17A is a front view of a display.
Figure 17B:
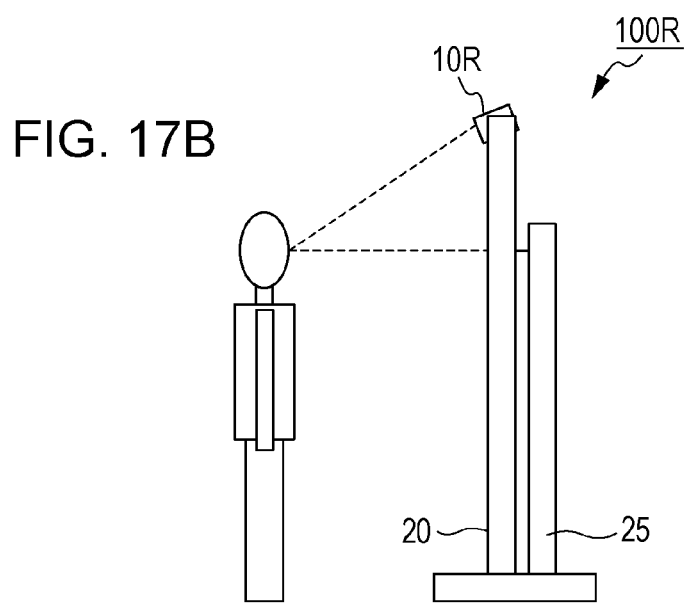
FIG. 17B is a side view that corresponds to FIG. 17A.
Figure 17C:
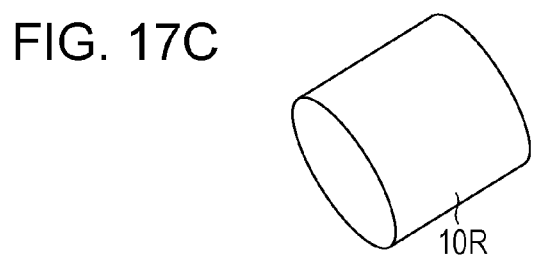
FIG. 17C is a view illustrating a direction of a camera in FIG. 17B.
Figure 17D:
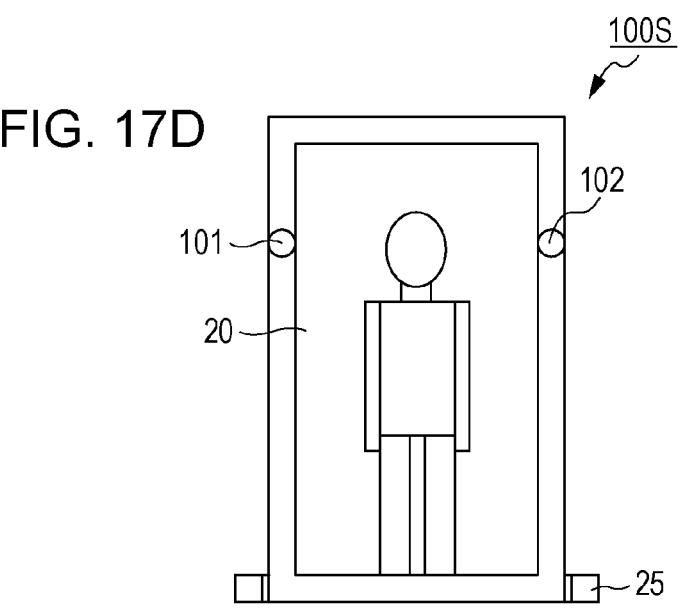
FIG. 17D is a front view of the display.
Figure 17E:
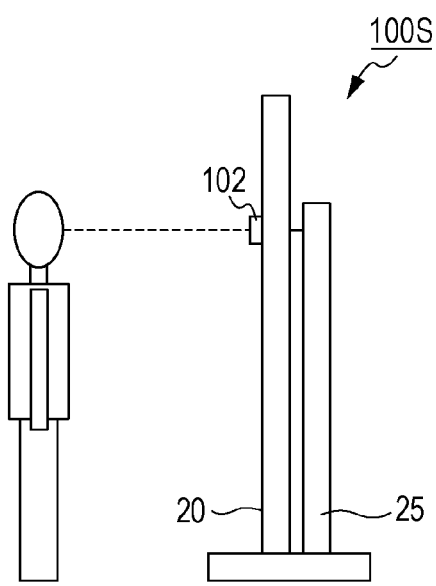
FIG. 17E is a side view that corresponds to FIG. 17D.
Figure 17F:
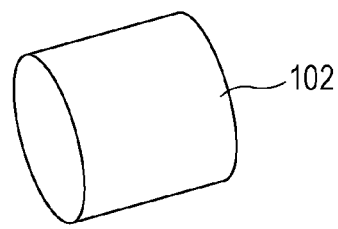
FIG. 17F is a view illustrating a direction of a camera in FIG. 17E.
Figure 17G:
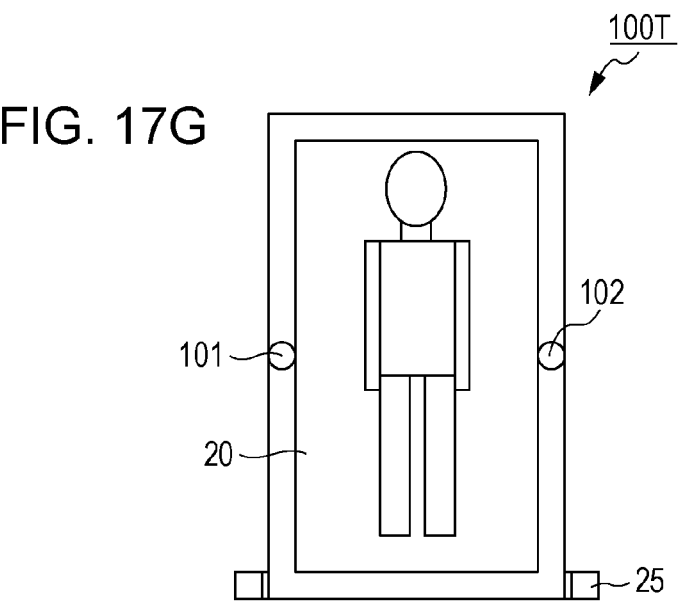
FIG. 17G is a front view of the display.
Figure 17H:
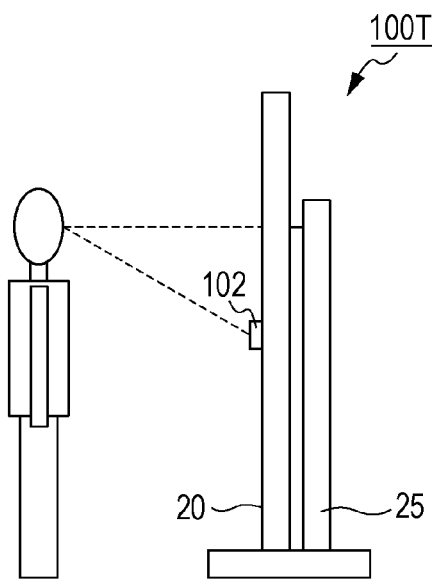
FIG. 17H is a side view that corresponds to FIG. 17G.
Figure 17I:
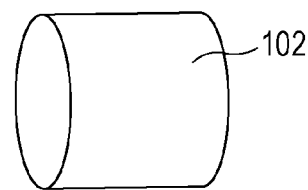
FIG. 17I is a view illustrating a direction of a camera in FIG. 17H.

FIGS. 17A through 17I are referred to below. FIGS. 17A through 17I are schematic views each illustrating an example of the way in which a user, a display, and a camera are disposed in imaging and displaying devices 100R, 100S, and 100T according to comparative examples. In the imaging and displaying device 100R illustrated in FIGS. 17A and 17B, a camera 10R is fixed at an upper part of a display 20. In the imaging and displaying device 100S illustrated in FIGS. 17D and 17E and the imaging and displaying device 100T illustrated in FIGS. 17G and 17H, cameras 101 and 102 are fixed on the left side and the right side of the display 20, respectively. FIGS. 17A, 17D, and 17G are front views of the display 20. FIGS. 17B, 17E, and 17H are side views that correspond to FIGS. 17A, 17D, and 17G, respectively. FIGS. 17C, 17F, and 17I are views illustrating a direction of the camera in FIGS. 17B, 17E, and 17H, respectively.

The eye height of a human is generally higher than 90% of the body height. Therefore, in the case of an imaging and displaying device having a display whose size is almost the same as the body height, a camera is mounted at a position higher than ⅔ of the screen. It is therefore necessary to direct the camera downward in order to capture the whole body of the user. For example, in the case of the imaging and displaying device 100R in which the camera 10R is disposed at the upper part of the display, the camera 10R needs to be directed downward as illustrated in FIGS. 17A and 17B.

In a case where the camera is directed downward, an image of a human diminishes downward. Legs appear short, and as a result, the whole body appears markedly unbalanced. An imaging and displaying device that displays such an image is inappropriate as a full-length mirror.

Figure 18A:
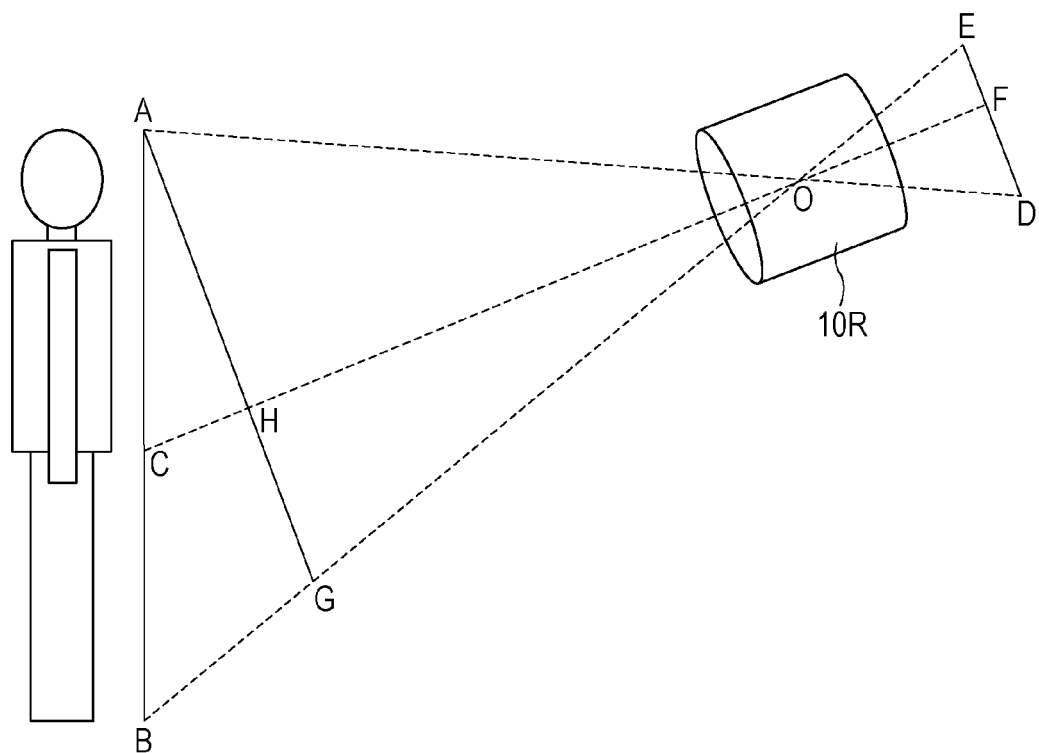
FIG. 18A is a schematic view illustrating the way in which a user and a camera of an imaging and displaying device are disposed.
Figure 18B:
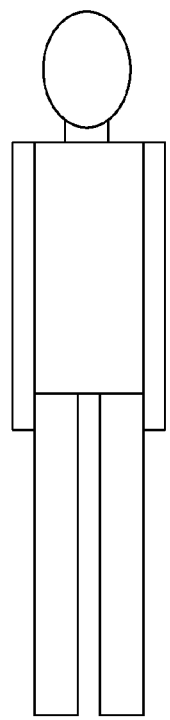
FIG. 18B is a view illustrating an example of an ideal image of a user displayed on the display.
Figure 18C:
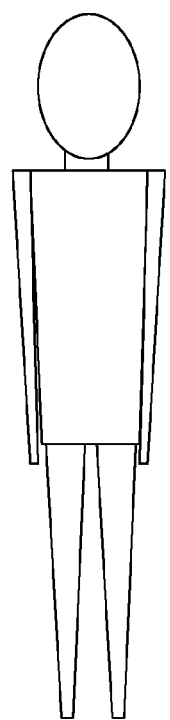
FIG. 18C is a view illustrating an example of an image of a user having distortion.
Figure 18D:
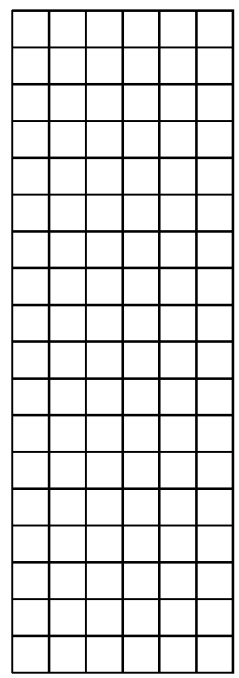
FIG. 18D is a view illustrating a partition of a grid-like pattern.
Figure 18E:
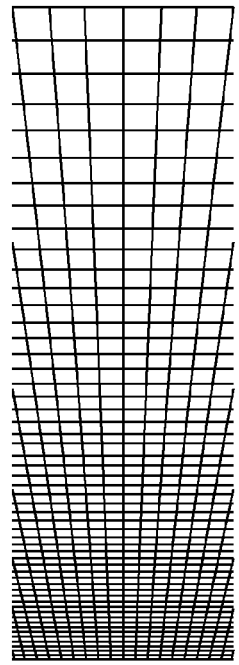
FIG. 18E is a view illustrating an example of an image of the grid-like pattern having distortion.

Distortion of an image acquired by a camera is described below in more detail with reference to FIGS. 18A through 18E. In the example illustrated in FIG. 18A, a person whose body height is 180 cm and whose leg length is 82 cm is standing 200 cm away from the camera 1 OR of the imaging and displaying device. In this case, the camera 10R is located at a height of 165 cm from the floor, which is at almost the same height as the line of sight. It is assumed that an image of a user is displayed from the top to the bottom of the screen of the display 20. The crotch of the user is located at the point C on the segment AB illustrated in FIG. 18A. An image of the segment AB that is formed on an imaging element via a lens of the camera 10R is the segment DE (an image of the crotch is the point F). An intersection of the segment BE and a line that is drawn from the point A in parallel with the segment ED is G, and an intersection of the segment AG and the segment CF is H. Accordingly, the position of the crotch of the user obtained by the imaging element is located at the point H of the segment AG. For example, in a case where the actual leg length ratio (BC/AB) is 45.6%, the leg length ratio in the image acquired by the imaging element (EF/DE=GH/AG) can be, for example, approximately 39.3%. In this case, the legs of the user in the image displayed on the display 20 appear quite short. That is, although the image of the user illustrated in FIG. 18B should be displayed on the display 20, the image of the user illustrated in FIG. 18C is displayed. In a case where an image of a partition of a grid-like pattern illustrated in FIG. 18D is taken instead of a human, the grid-like pattern displayed on the display 20 appears to diminish downward as illustrated in FIG. 18E.

In situations utilizing an electronic mirror function or a video phone function, matching a user's line of sight and a line of sight of a person displayed on a display is useful. In addition, there is also a demand for improvement of image quality while maintaining the matching of lines of sight. In the conventional art, it is possible to achieve matching of lines of sight, but the image quality is poor. For example, in the method using a half mirror or transmissive liquid crystals and the method using a display having a narrow hole, the amount of light that enters an imaging element decreases, and as a result, noise increases. In the method using a hologram screen, transmissive liquid crystals, or the like, an image becomes blurred due to transmission or reflection on the screen or the liquid crystals.

Even in the method of synthesizing a front image from images taken by multi-view cameras (for example, Japanese Unexamined Patent Application Publication No. 2012-60547), such a problem can occur. Even in a case where the cameras 101 and 102 are located at eye height as illustrated in FIGS. 17D, 17E, and 17F, the cameras (the cameras 101 and 102 in this case) are generally directed slightly downward in order to take an image of the whole body of the user. Since the image synthesis is performed on the basis of the images in which the body of the user diminishes downward, high image quality cannot be expected.

In a case where the cameras 101 and 102 are disposed at central parts of the screen as illustrated in FIGS. 17G and 17H, the optical axes of the cameras (the cameras 101 and 102 in this case) can be made parallel with the floor surface as illustrated in FIG. 17I. However, correction processing is needed to achieve matching of lines of sight. This correction processing causes degradation of image quality. Moreover, there is an influence of occlusion (a portion or an object that is on the near-side of a camera hides another portion or another object that is behind the portion or the object from view), and it is difficult to reproduce details of skin and hair. Therefore, high image quality cannot be expected.

It is desired that the body shape of a user be displayed with little distortion.

An outline of embodiments of the present disclosure is as follows.

An imaging and displaying device according to one aspect of the present disclosure includes an imaging device, a display, and an image processing device. The imaging device is disposed so as to take an image of a subject including a user. The image processing device receives data of an image of the subject taken by the imaging device and causes the image to be displayed on the display. The imaging device includes an imaging element that is disposed so that a normal to an imaging surface is horizontal, an optical system that forms the image of the subject on the imaging surface, and an optical axis shift device. The optical system has a lens that is supported in such a manner that the lens is movable in a direction parallel with the imaging surface. The optical axis shift device shifts the lens in the direction parallel with the imaging surface.

An imaging and displaying device according to another aspect of the present disclosure includes an imaging device, a display, and an image processing device. The imaging device is disposed so as to take an image of a user. The image processing device receives data of an image of a subject acquired by the imaging device and causes the image to be displayed on the display. The imaging device includes an imaging element that is disposed so that a normal to an imaging surface is horizontal, an optical system that forms the image of the subject on the imaging surface, and an optical axis shift device. The imaging element is supported in such a manner that the imaging element is movable in a direction parallel with the imaging surface. The optical axis shift device shifts the imaging element in a direction parallel with the imaging surface.

The imaging and displaying device may further include a body height information acquirer and a controller that performs control on the basis of the information supplied from the body height information acquiring device. The body height information acquirer may acquire information on the body height of the user or the height of a specific portion of the user.

In one aspect, the imaging device is fixed on an upper part of the display. The controller may be configured to control the optical axis shift device on the basis of the information supplied from the body height information acquirer to make a shift amount in the optical axis shift device larger as the body height of the user or the height of the specific portion of the user becomes lower.

The imaging and displaying device may further include a camera moving device that moves the imaging device up and down in accordance with an instruction given by the control section. The controller may control the camera moving device to make the height of the imaging device lower as the body height of the user or the height of the specific portion of the user becomes lower.

The controller may control the optical axis shift device to make the shift amount in the optical axis shift device smaller as the height of the imaging device becomes lower.

The imaging and displaying device may further include a display moving device that moves the display up and down. The imaging device may be fixed on an upper part of the display. The controller may control the display moving device to change the height of the display on the basis of the information supplied from the body height information acquirer.

A method according to still another aspect of the present disclosure of operation of an imaging and displaying device is a method of operation of any of the imaging and displaying devices described above. The method of operation of an imaging and displaying device includes acquiring information on the body height of the user or the height of a specific portion of the user; and performing control on the basis of the information acquired in the body height information acquiring.

The performing control may include controlling an optical axis shift device on the basis of the information acquired in the acquiring to make the shift amount in the optical axis shift device larger as the body height of the user or the height of the specific portion of the user becomes lower.

The performing may include setting the height of the imaging device in accordance with the body height of the user or the height of the specific portion of the user on the basis of the information acquired in the acquiring.

The performing control may be executing processing on the basis of the information acquired in the acquiring to make the shift amount in the optical axis shift device smaller as the height of the imaging device becomes lower.

The performing control may include setting the height of the display in accordance with the body height of the user or the height of the specific portion of the user on the basis of the information acquired in the acquiring.

An imaging and displaying device according to still another aspect of the present disclosure includes an imaging device, an image processing device, a display, a body height information acquiring device, and a control section. The imaging device is configured such that its optical axis of input light is parallel with a floor surface and takes an image of a user. The image processor processes an image supplied from the imaging device. The display displays output from the image processor. The body height information acquirer acquires information on the body height of the user or the height of a specific portion of the user. The controller performs control on the basis of the information supplied from the body height information acquirer. The image processor executes processing for cutting out an image of a human from the image obtained by the imaging device on the basis of an instruction given by the controller.

In one aspect, the imaging device is fixed on an upper part of the display. The controller may cause the image processor to execute the processing to make a cutout position of the image lower as the body height of the user or the height of the specific portion of the user becomes lower.

The imaging and displaying device further includes a camera moving device that moves the imaging device up and down. The controller may control the camera moving device to make the height of the imaging device lower as the body height of the user or the height of the specific portion of the user becomes lower.

The controller may cause the image processor to execute the processing to make a cutout position of the image higher as the height of the imaging device becomes lower.

The imaging and displaying device further includes a display moving device that moves the display up and down. The imaging device may be fixed on an upper part of the display. The controller may control the display moving device to change the height of the display in accordance with the body height of the user or the height of the specific portion of the user.

A method according to still another aspect of the present disclosure of operation of an imaging and displaying device is a method of operation of any of the imaging and displaying devices described above. The method of operation of an imaging and displaying device includes a acquiring information on the body height of the user or the height of a specific portion of the user; performing control on the basis of the information acquired in the acquiring; and cutting out an image of a human from the image obtained by the imaging device.

The cutting may be executing processing to make the cutout position of the image lower as the body height of the user or the height of the specific portion of the user becomes lower.

The performing control may include setting the height of the imaging device in accordance with the body height of the user or the height of the specific portion of the user on the basis of the information acquired in the acquiring.

The cutting may be executing processing on the basis of the information acquired in the acquiring to make the cutout position of the image higher as the height of the imaging device becomes lower.

The performing control may include setting the height of the display in accordance with the body height of the user or the height of the specific portion of the user on the basis of the information acquired in the acquiring.

In one aspect, the imaging and displaying device further includes a distance measurer that measures a distance to the user. At least one of the imaging device and the image processor may perform magnifying or reducing processing at a ratio that is proportional to the measured distance.

In one aspect, the image processor detects a specific portion of a lower half of the user and sets a magnification ratio on the basis of a position of the specific portion. At least one of the imaging device and the image processor may perform magnifying or reducing processing at the ratio.

The ratio may be a magnification ratio at which the user is displayed life size.

In one aspect, the imaging and displaying device further includes a communicator that transmits and receives image data to and from another imaging and displaying device. The image processor may include a first image processing block and a second image processing block. The communicator transmits image data of the first image processing block to the other imaging and displaying device. The communicator receives image data from the other imaging and displaying device and supplies, to the second image processing block, the image data received from the other imaging and displaying device.

In one aspect, the method of operation of an imaging and displaying device includes measuring a distance to the user and magnifying or reducing the image obtained by the imaging device at a ratio that is proportional to the measured distance.

In one aspect, the method of operation of an imaging and displaying device includes detecting a specific portion of a lower half of the user, setting a ratio on the basis of the position of the specific portion, and magnifying or reducing the image obtained by the imaging device at the ratio.

The ratio may be a magnification ratio at which the user is displayed life size.

In one aspect, the method of operation of an imaging and displaying device includes communicating with another imaging and displaying device. The communicating may include transmitting image data to another imaging and displaying device and receiving image data obtained by another imaging and displaying device.

At least one of the processing in the image processing device and control in the control section may be executed by a processor.

Embodiments of the present disclosure are described below in detail with reference to the drawings. Each of the embodiments described below illustrates a comprehensive or specific example. Numerical values, shapes, materials, constituent elements, the way in which the constituent elements are disposed, positions of the constituent elements, forms of connection of the constituent elements, steps, the order of steps, etc. are merely examples, and do not limit the present disclosure. Among the constituent elements in the embodiments below, constituent elements that are not described in independent claims that recite the highest concept are described as optional constituent elements. In the following description, constituent elements that have substantially identical functions are given identical reference numerals, and may therefore not be explained repeatedly.

These comprehensive or specific aspects may be realized by a system, a method, an integrated circuit, a computer program, or a computer-readable storage medium such as a CD-ROM. Alternatively, these comprehensive or specific aspects may be realized by any combination of a system, a method, an integrated circuit, a computer program, or a storage medium.

Embodiment 1

Figure 1A:
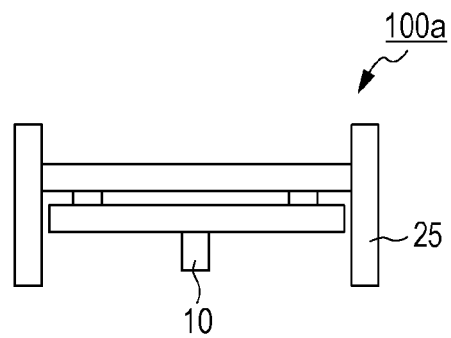
FIG. 1A is a top view of an imaging and displaying device according to Embodiment 1.
Figure 1B:
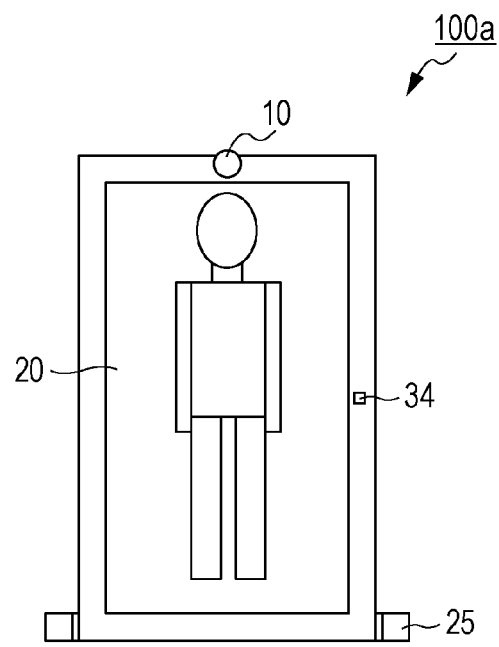
FIG. 1B is a front view of the imaging and displaying device.
Figure 1C:
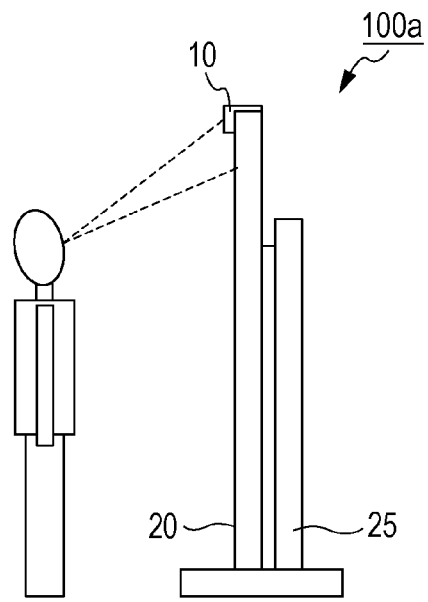
FIG. 1C is a side view of the imaging and displaying device.
Figure 1D:
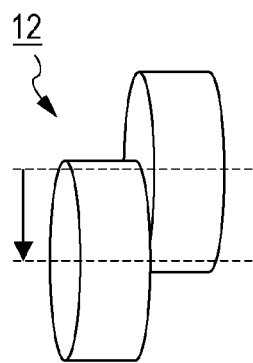
FIG. 1D is a perspective view illustrating an outline of an optical system.
Figure 1E:
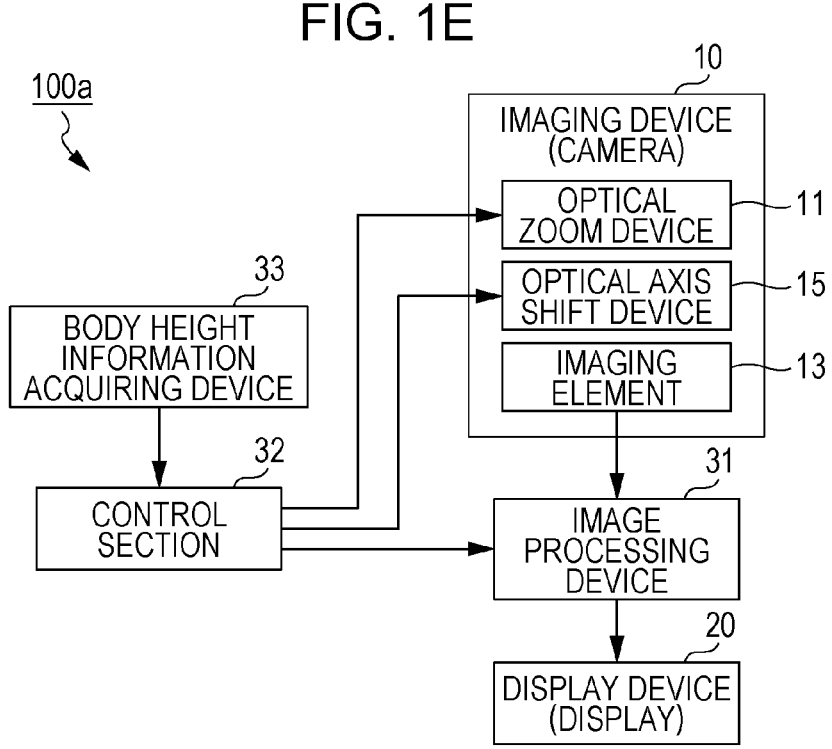
FIG. 1E is a block diagram illustrating an example of an outline configuration of the imaging and displaying device.

Embodiment 1 of the present disclosure is described with reference to FIGS. 1A through 5D. FIGS. 1A through 1F are schematic views each illustrating an exemplary configuration of an imaging and displaying device according to Embodiment 1. FIG. 1A is a top view of an imaging and displaying device 100a according to Embodiment 1. FIG. 1B is a front view of the imaging and displaying device 100a. FIG. 1C is a side view of the imaging and displaying device 100a. FIG. 1D is a perspective view illustrating an outline of an optical system. FIG. 1E is a block diagram illustrating an outline configuration of the imaging and displaying device 100a. In the following description, an example in which the imaging and displaying device is used as an electronic mirror is described unless otherwise specified.

In the configuration illustrated in FIGS. 1A, 1B, and 1C, an imaging device 10 that takes an image of a user of an electronic mirror is fixed at an upper part of a display 20. In the example illustrated in FIGS. 1A, 1B, and 1C, the display 20 is fixed on a stand 25. The display 20 may be a known display device such as a liquid crystal display device. The imaging device 10 has an imaging element, an optical system that forms an image of a subject (in this case, the user of the electronic mirror) on an imaging surface of the imaging element, and an optical axis shift device. The imaging element is disposed in the imaging device 10 so that a normal to the imaging surface is substantially horizontal. Examples of the imaging element encompass a CCD (Charge Coupled Device) image sensor and a CMOS (Complementary Metal-Oxide Semiconductor) image sensor. As illustrated in FIG. 1D, the optical system 12 can have a mechanism that is dividable into a subject-side part (the left side in FIG. 1D) and an imaging-element-side part (the right side in FIG. 1D). In the example illustrated in FIG. 1D, the subject-side part of a lens barrel of the optical system 12 is supported by the optical axis shift device that will be described later so as to be movable along a direction parallel with the imaging surface of the imaging element. The subject-side part of the lens barrel typically includes a lens. The optical axis in the optical system 12 can be shifted by sliding the subject-side part of the optical system 12 by using the optical axis shift device.

Figure 2A:
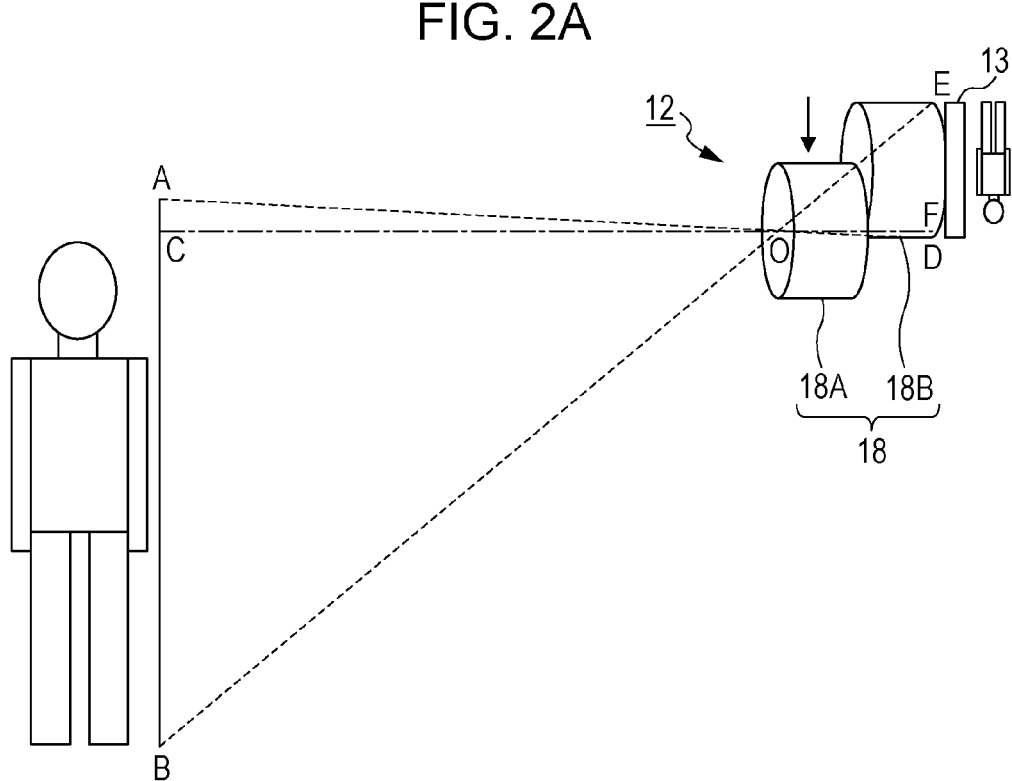
FIG. 2A is a schematic view illustrating an example of an optical system in which a lens barrel is configured to be dividable into two parts.
Figure 2B:
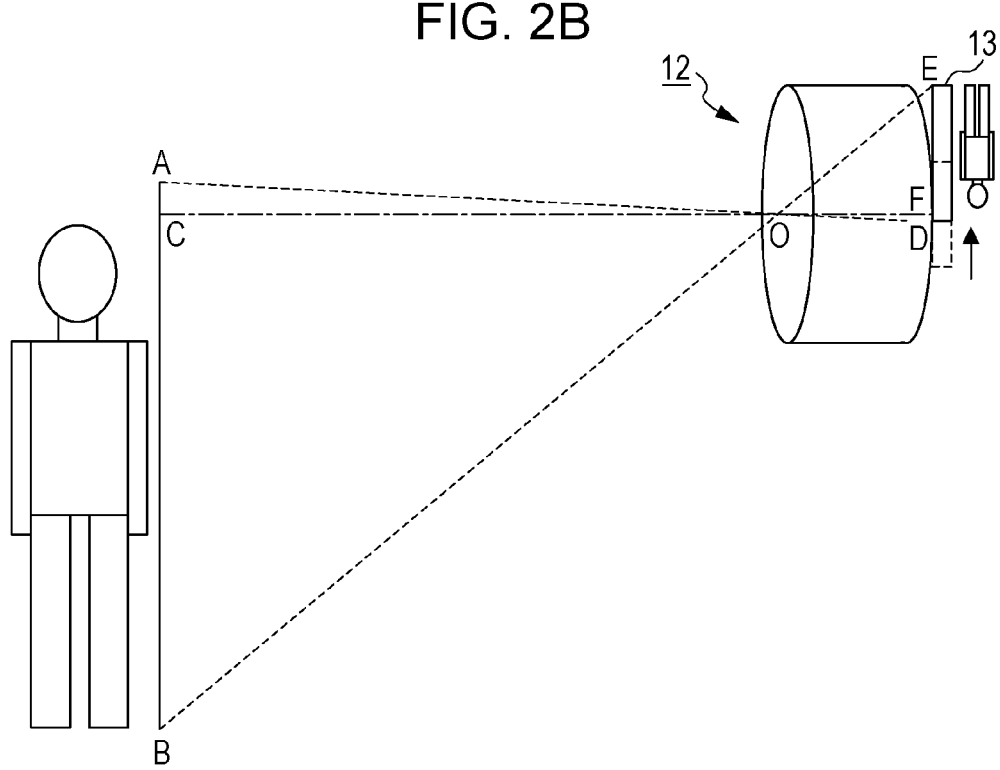
FIG. 2B is a schematic view illustrating an example in which an imaging element is movable in a direction perpendicular to an optical axis of an optical system.

The principle of optical shift is described with reference to FIGS. 2A and 2B. Two examples are described below. FIG. 2A illustrates an example in which a lens barrel 18 is configured to be dividable into two parts 18A and 18B. In the example illustrated in FIG. 2A, the part 18A of the lens barrel is deviated with respect to the imaging element 13 in a direction perpendicular to the imaging surface of the imaging element 13. The part 18A of the lens barrel typically includes a lens. The segment COF in FIG. 2A schematically represents an optical axis of the lens included in the part 18A of the lens barrel. FIG. 2B illustrates an example in which an imaging device that has an imaging element supported so as to be movable along a direction parallel with an imaging surface is used. The imaging element is movably supported by an optical axis shift device (not illustrated). In the example illustrated in FIG. 2B, the imaging element 13 is deviated in a direction perpendicular to the optical axis COF of the optical system 12. In this way, the imaging element 13 may be moved relative to the optical system 12 by the optical axis shift device. The optical axis can be shifted by changing the relative position between at least part of the optical system 12 and the imaging element 13. In this case, both in FIGS. 2A and 2B, the subject (the plane ACB) and the plane DFE, which is the imaging surface, are parallel with each other, and therefore the subject and an image formed on the imaging surface are similar. That is, the image has no distortion. According to such an arrangement, it is possible to display a well-balanced image with no distortion such as short legs.

Figure 19:
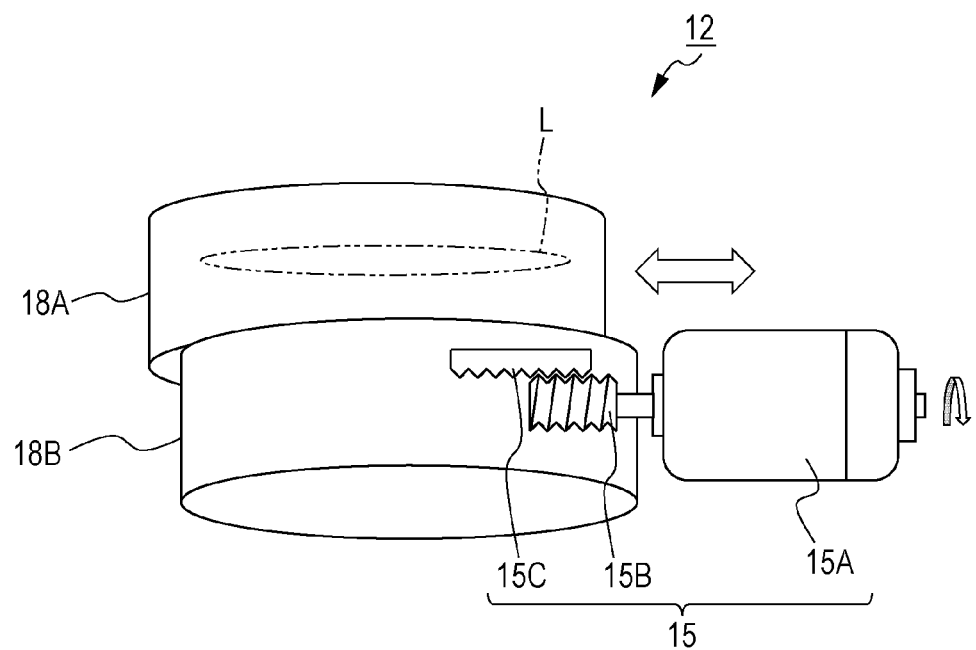
FIG. 19 is a schematic view illustrating an example of a configuration of an optical axis shift device included in an imaging device.

FIG. 19 is a schematic view illustrating an example of a configuration of an optical axis shift device 15 included in the imaging device 10. In the example illustrated in FIG. 19, the optical axis shift device 15 has a pair of a motor 15A and a gear. For example, a worm gear 15B is attached to a shaft of the motor (for example, a stepping motor) 15A. Furthermore, for example, a rack 15C is provided on one part (the subject-side part 18A) of the lens barrel 18 that is configured to be dividable. The worm gear 15B and the rack 15C are disposed so that their teeth are engaged with each other. For example, the shaft of the motor 15A is rotated by a necessary amount on the basis of a predetermined signal supplied to the motor 15A under control of a computer such as a control section that will be described later. This makes it possible to slide the part 18A of the lens barrel by only a necessary amount, thereby making it possible to move a lens L supported by the part 18A of the lens barrel relative to the imaging element (not illustrated in FIG. 19) by a necessary amount. The lens L forms an image of the subject on the imaging surface of the imaging element. As described with reference to FIG. 2B, the imaging element may be slid instead of part of the optical system 12 (for example, the lens L supported by the part 18A of the lens barrel). Note that the mechanism for shifting the optical axis is not limited to the example illustrated in FIG. 19, and can be one of various known configurations. For example, a lens or an imaging element may be moved by using a pair of rack-and-pinion gears, ball screws, or the like.

FIG. 1E is referred to below. An example of a flow of control in the imaging and displaying device 100a according to Embodiment 1 is described with reference to the block diagram of FIG. 1E. In the example illustrated in FIG. 1E, the imaging device 10 includes an optical zoom device 11, the optical axis shift device 15, and the imaging element 13. In FIG. 1E, illustration of the optical system 12 is omitted. Illustration of the optical system 12 is sometimes omitted also in the other block diagrams.

Light from a subject enters the imaging device 10. The zoom ratio of the image of the subject is optically adjusted by the optical zoom device 11. Adjustment of the zoom ratio can be executed under control of the control section that will be described later. For example, a control section 32 illustrated in FIG. 1E determines a magnification ratio in the optical zoom device 11 and instructs the optical zoom device 11 about a shift amount. A specific example of a method for determining a magnification ratio will be described later. Light enters the imaging element 13 via an optical system whose optical axis has been shifted by the optical axis shift device 15. In the imaging element 13, the light from the subject is converted to an electrical signal. The image signal (or the video signal) that is output from the imaging element 13 is supplied to an image processing device 31. The image signal (or the video signal) is subjected to lateral inversion etc. in the image processing device 31, and is then supplied to the display 20. The processing in the image processing device 31 can be executed by a dedicated processor. Then, the image of the subject (in this case, the user of the imaging and displaying device 100a) is displayed on the display 20.

The image processing device 31 may be realized by a dedicated processor (computer) such as a DSP (Digital Signal Processor), an ASSP (Application Specific Standard Product), ASIC (Application Specific Integrated Circuits), or an FPGA (Field Programmable Gate Array) or may be realized by a general-purpose processor (computer). For example, the image processing device 31 may be configured to have one or more processors and to read out a program from a memory (not illustrated) or a recording medium such as CD-ROM and execute the program thus read out. The memory in which programs are stored may be a storage device that is provided separately from the image processing device 31 or may be disposed in the image processing device 31 as part of the image processing device 31.

The height of the face in the image of the user displayed on the display 20 is determined on the basis of the shift amount of the optical axis shifted by the optical axis shift device 15. In order to determine this shift amount, the body height of the user may be acquired by a body height information acquiring device 33. Information on the body height of the user acquired by the body height information acquiring device 33 is sent to the control section 32. The control section 32 determines the shift amount, for example, on the basis of the information acquired by the body height information acquiring device 33. The shift amount is sent from the control section 32 to the optical axis shift device 15. The optical axis shift device 15 shifts the optical axis of the optical system by the designated shift amount under control of the control section 32.

Control in the control section 32 can be executed by a dedicated processor. The control section 32 can be realized by a dedicated processor (for example, a DSP, an ASSP, an ASIC, or an FPGA), as with the image processing device 31. The control section 32 may be realized by a general-purpose processor (computer). The control section 32 may be configured to have one or more processors and to read out a program from a memory (not illustrated) or a recording medium and execute the program thus read out. The memory in which programs are stored may be a storage device that is separately provided from the control section 32 or may be disposed in the control section 32 as part of the control section 32. Note that the control section 32 and the image processing device 31 may be realized as functional blocks in a single processor.

The configuration of the body height information acquiring device 33 is not limited to a specific one. The body height information acquiring device 33 can be one of various sensors utilizing radio waves, ultrasonic waves, infrared light, and the like. The body height information acquiring device 33 may be an interface that accepts user's input of a value of the body height. Examples of the interface encompass a keyboard, a touch panel, and a voice-input device. The body height information acquiring device 33 may acquire the height of a specific portion of the user instead of directly acquiring the body height. For example, information on the height of at least one of eyes, nose, mouth, ears, neck, shoulder, and the like may be acquired by detecting the position of this portion of the user.

Next, an example of how to calculate the shift amount of the optical axis is described with reference to FIGS. 3A through 3I. The shift amount is, for example, set to such an amount that the user feels that his or her line of sight matches that in the image displayed on the display.

Figure 3A:
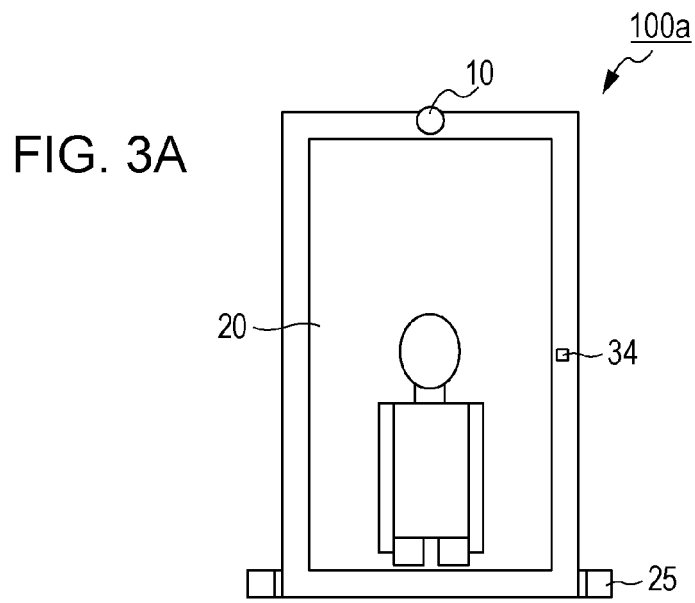
FIG. 3A is a front view of a display of the imaging and displaying device according to Embodiment 1.
Figure 3B:
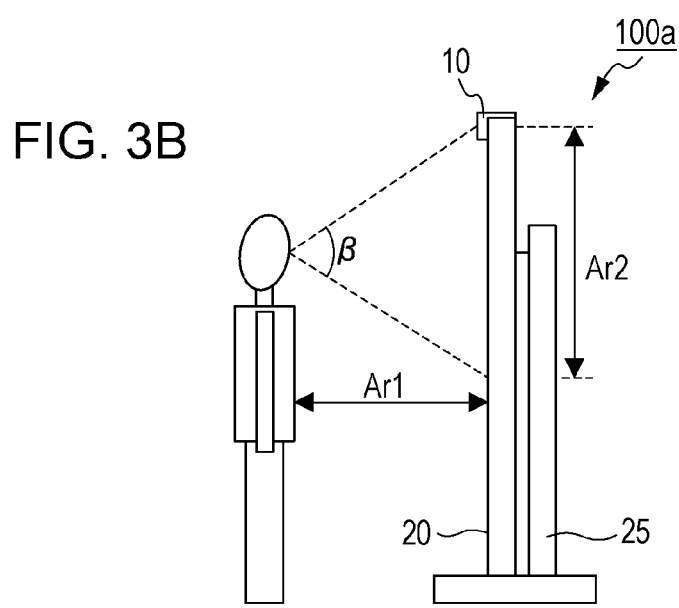
FIG. 3B is a side view that corresponds to FIG. 3A.
Figure 3C:
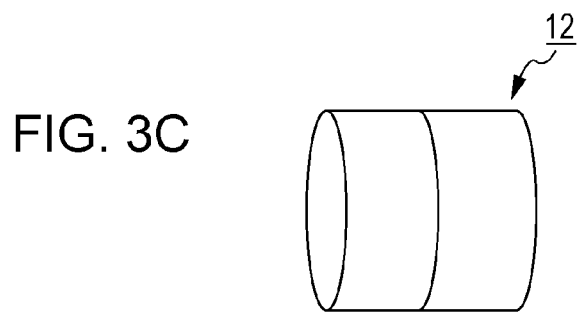
FIG. 3C is a view visualizing a shift amount in an optical axis shift device in the state illustrated in FIG. 3B.
Figure 3D:
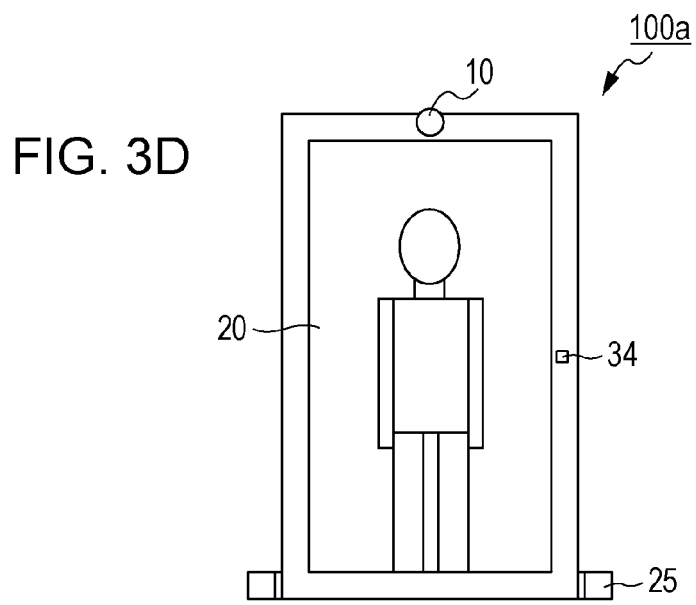
FIG. 3D is a front view of the display of the imaging and displaying device according to Embodiment 1.
Figure 3E:
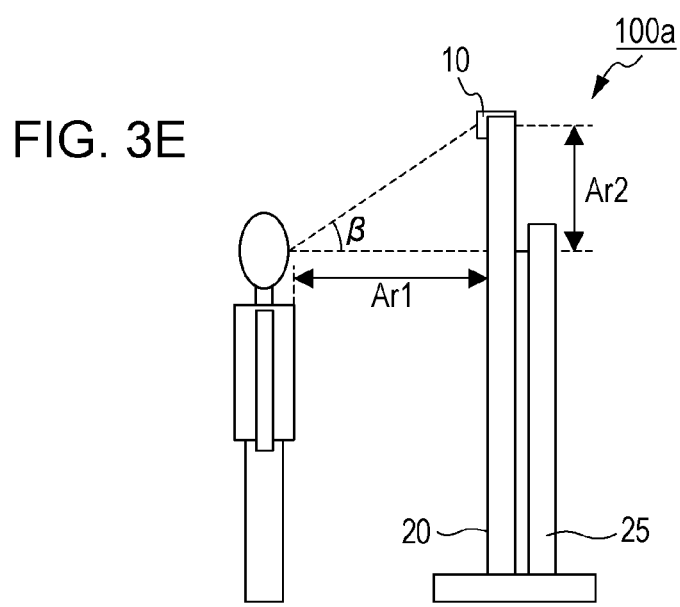
FIG. 3E is a side view that corresponds to FIG. 3D.
Figure 3F:
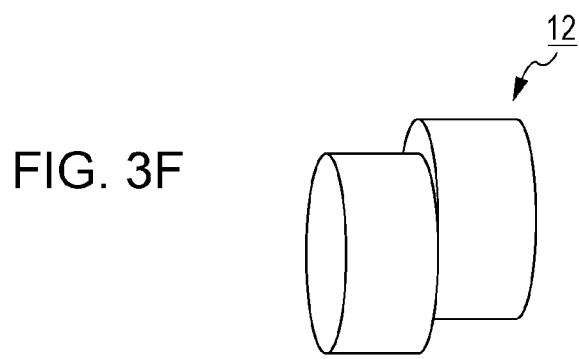
FIG. 3F is a view visualizing a shift amount in an optical axis shift device in the state illustrated in FIG. 3E.
Figure 3G:
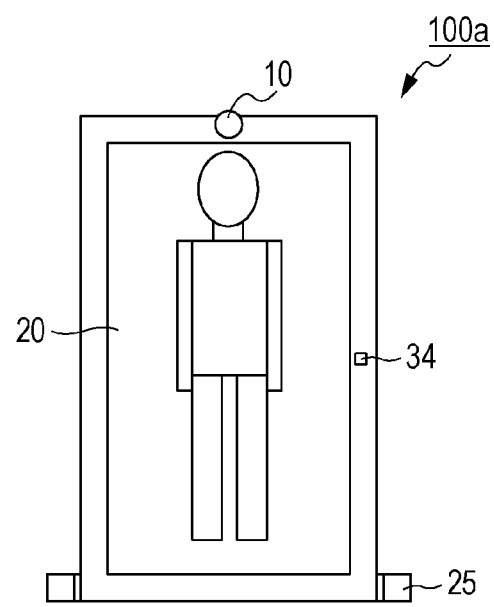
FIG. 3G is a front view of the display of the imaging and displaying device according to Embodiment 1.
Figure 3H:
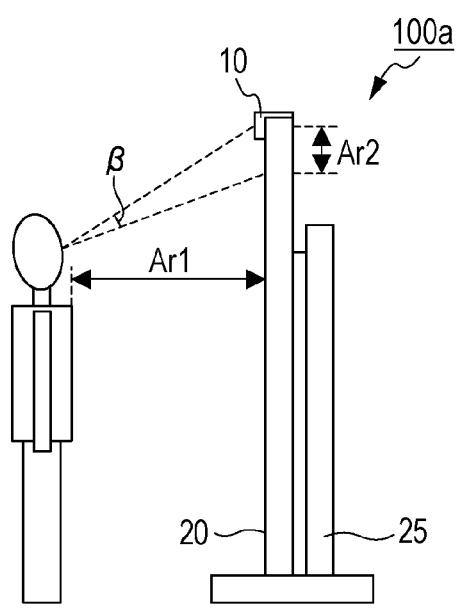
FIG. 3H is a side view that corresponds to FIG. 3G.
Figure 3I:
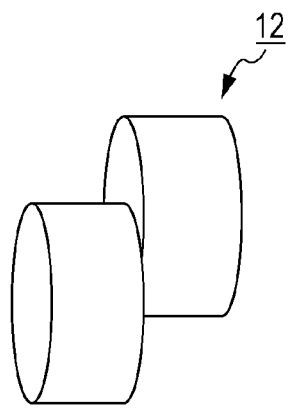
FIG. 3I is a view visualizing a shift amount in an optical axis shift device in the state illustrated in FIG. 3H.

FIGS. 3A, 3D, and 3G are front views of the display 20. FIGS. 3B, 3E, and 3H are side views that correspond to FIGS. 3A, 3D, and 3G, respectively. FIGS. 3C, 3F, and 3I are views visualizing the shift amount in the optical axis shift device in the states illustrated in FIGS. 3B, 3E, and 3H, respectively.

FIGS. 3A, 3B, and 3C illustrates a case where the shift amount is 0. In this case, the image of the user displayed on the display 20 is located in a rather lower portion of the display surface. As a natural consequence, the user's line of sight is directed downward and does not match that in the image of the user. The angle β illustrated in FIG. 3B schematically illustrates an angle formed by a segment connecting the position of the eyes of the user and the center of the imaging device 10 and a segment connecting the position of the eyes of the user and the position of the eyes of the user displayed on the display 20. Hereinafter, this angle β is referred to as a "deviation angle β". In FIG. 3, the arrow Ar1 schematically represents a distance between the imaging device 10 or the display 20 and the user, and the arrow Ar2 schematically represents a difference between the position of the eyes of the user displayed on the display 20 and the center of the imaging device 10.

Next, it is assumed that the optical axis is shifted so that the subject-side lens moves downward relative to the imaging element as illustrated in FIG. 3F. This moves the image displayed on the display 20 upward as illustrated in FIG. 3D. FIGS. 3D, 3E, and 3F illustrate a case where the eye height of the user matches that in the image displayed on the display. In a case where the user's body height is high, the user's line of sight almost matches that in the image displayed on the display without further adjustment. However, in a case where the user's body height is low, the user's line of sight sometimes does not match that in the image displayed on the display because of a large angle β illustrated in FIG. 3E. In this case, the shift amount is further increased as illustrated in FIGS. 3G, 3H, and 3I. This makes it possible to shift the image of the user displayed on the display 20 further upward. As a result, the user's line of sight is directed close to the imaging device 10, and thereby the deviation angle becomes smaller. It is therefore easier to achieve matching of the user's line of sight and that in the image displayed on the display.

According to such an arrangement in which the imaging device 10 is fixed at an upper part of the display 20, the image displayed on the display 20 moves upward when the subject-side lens is moved downward relative to the imaging element. In this case, the larger the shift amount of the optical axis is, the larger the amount of movement of the image displayed on the display 20 is. Therefore, according to the arrangement in which the imaging device 10 is fixed at an upper part of the display 20 as illustrated in FIGS. 1A through 1F, it is, for example, only necessary to increase the shift amount as the body height of the user becomes lower. For example, the control section 32 (see FIG. 1E) may control the operation of the optical axis shift device 15 on the basis of the shift amount determined in accordance with the body height of the user.

Table 1 below illustrates a specific example of numerical values of the deviation angle β. Table 1 illustrates a distance from the imaging device 10 or the display 20 (the camera or the display) to the user and a deviation angle if there is deviation from the center.

TABLE 1

| Deviation angle | | Distance from camera/display (cm) | | | | | | | | | |
|---|---|---|---|---|---|---|---|---|---|---|---|
| (°) | | 50 | 100 | 150 | 200 | 250 | 300 | 350 | 400 | 450 | 500 |
| Deviation from center (cm) | 5 | 5.7 | 2.9 | 1.9 | 1.4 | 1.1 | 1.0 | 0.8 | 0.7 | 0.6 | 0.6 |
| | 10 | 11.3 | 5.7 | 3.8 | 2.9 | 2.3 | 1.9 | 1.6 | 1.4 | 1.3 | 1.1 |
| | 15 | 16.7 | 8.5 | 5.7 | 4.3 | 3.4 | 2.9 | 2.5 | 2.1 | 1.9 | 1.7 |
| | 20 | 21.8 | 11.3 | 7.6 | 5.7 | 4.6 | 3.8 | 3.3 | 2.9 | 2.5 | 2.3 |
| | 25 | 26.6 | 14.0 | 9.5 | 7.1 | 5.7 | 4.8 | 4.1 | 3.6 | 3.2 | 2.9 |
| | 30 | 31.0 | 16.7 | 11.3 | 8.5 | 6.8 | 5.7 | 4.9 | 4.3 | 3.8 | 3.4 |
| | 35 | 35.0 | 19.3 | 13.1 | 9.9 | 8.0 | 6.7 | 5.7 | 5.0 | 4.4 | 4.0 |
| | 40 | 38.7 | 21.8 | 14.9 | 11.3 | 9.1 | 7.6 | 6.5 | 5.7 | 5.1 | 4.6 |
| | 45 | 42.0 | 24.2 | 16.7 | 12.7 | 10.2 | 8.5 | 7.3 | 6.4 | 5.7 | 5.1 |
| | 50 | 45.0 | 26.6 | 18.4 | 14.0 | 11.3 | 9.5 | 8.1 | 7.1 | 6.3 | 5.7 |
| | 55 | 47.7 | 28.8 | 20.1 | 15.4 | 12.4 | 10.4 | 8.9 | 7.8 | 7.0 | 6.3 |
| | 60 | 50.2 | 31.0 | 21.8 | 16.7 | 13.5 | 11.3 | 9.7 | 8.5 | 7.6 | 6.8 |
| | 65 | 52.4 | 33.0 | 23.4 | 18.0 | 14.6 | 12.2 | 10.5 | 9.2 | 8.2 | 7.4 |
| | 70 | 54.5 | 35.0 | 25.0 | 19.3 | 15.6 | 13.1 | 11.3 | 9.9 | 8.8 | 8.0 |
| | 75 | 56.3 | 36.9 | 26.6 | 20.6 | 16.7 | 14.0 | 12.1 | 10.6 | 9.5 | 8.5 |
| | 80 | 58.0 | 38.7 | 28.1 | 21.8 | 17.7 | 14.9 | 12.9 | 11.3 | 10.1 | 9.1 |
| | 85 | 59.5 | 40.4 | 29.5 | 23.0 | 18.8 | 15.8 | 13.7 | 12.0 | 10.7 | 9.6 |

The "deviation from the center" refers to a difference between the eye height in the image displayed on the display and the height of the center of the imaging device. The "deviation angle" in Table 1 refers to the deviation angle β described above. It can be said that the magnitude of the "deviation angle" represents the degree of deviation of the line of sight. It is well known that the permissible limit of the deviation angle in an upward direction is 12° (SATOSHI MINAMI, "Ninngen—Kikai Interface Tokusyuu/4.2 Terebi Denwaki (A special issue of Man—Machine Interface/4.2 Television Telephone set)", The Journal of the Institute of Electronics and Communication Engineers of Japan, 56, pp. 1485-1590, November 1973 issue)). The Inventers think that the user surely recognizes that the user's line of sight matches that in the image displayed on the display 20, for example, if permissible limit of the deviation angle in an upward direction is 9°, which is smaller than 12°. In view of this value, for example, in a case where the user is away by 2 m from the imaging device 10 or the display 20, deviation up to approximately 30 cm is permitted. That is, in a case where the user is away by 2 m from the imaging device 10 or the display 20, the user recognizes that the user's line of sight matches that in the image displayed on the display 20 if a difference between the eye height in the image displayed on the display 20 and the height of the center of the imaging device 10 is approximately 30 cm. This is a sufficiently feasible value. That is, for example, the control section 32 need just control the optical axis shift device 15 to increase the shift amount so that the difference between the eye height of the user in the image displayed on the display 20 and the height of the center of the imaging device 10 is smaller than 30 cm. Needless to say, the user feels that his or her appearance displayed on the display 20 is more natural as this deviation becomes smaller. The value "9°" is one example. The permissible limit of the deviation angle in an upward direction is any value equal to or less than 12°.

As described above, according to the present embodiment, an image of a human can be displayed without distortion by using the optical axis shift device 15. Moreover, an image of a user displayed on a display can be displayed at the same height as or slightly higher than the user standing before the display. That is, it is possible to realize a full-length mirror that achieves matching of lines of sight.

The size of the displayed image of the user may be corrected in accordance with the distance between the user and the imaging and displaying device 100a. This makes it possible to lessen user's sense of strangeness caused by back and forth movement of the user relative to the imaging and displaying device 100a. The principle of this is described with reference to FIGS. 4A through 4E.

Figure 4A:
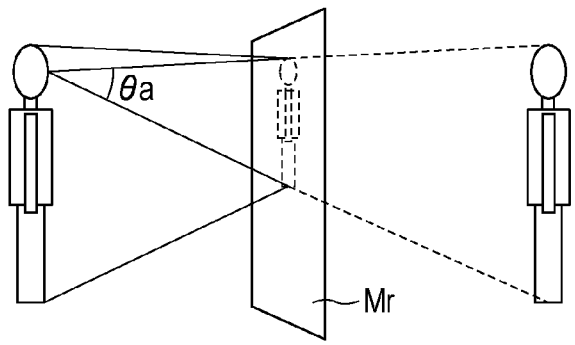
FIG. 4A is a schematic view illustrating a relationship between the position of a user and the position of an image of the user with respect to a mirror.
Figure 4B:
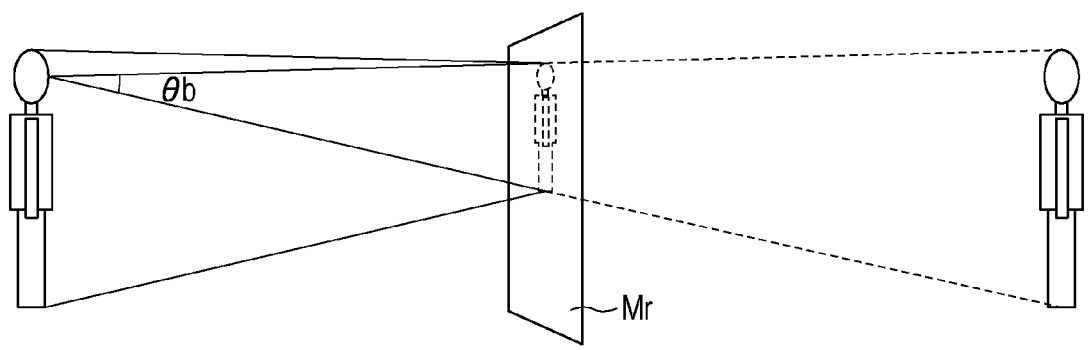
FIG. 4B is a schematic view illustrating a state where a distance between the mirror and the user has doubled.

FIGS. 4A and 4B schematically illustrate an image of a user reflected on a mirror Mr. In the case of an actual mirror, it can be assumed that an image of the same size as the user (life size) is present on the opposite side of the mirror symmetrically with respect to the mirror Mr as illustrated in FIG. 4A. In this case, the magnitude of an angle at which the size of the image is recognized is θa illustrated in FIG. 4A. FIG. 4B illustrates a state where the distance between the mirror Mr and the user has doubled. In this case, the magnitude of the angle at which the size of the image is recognized is θb illustrated in FIG. 4B.

Figure 4C:
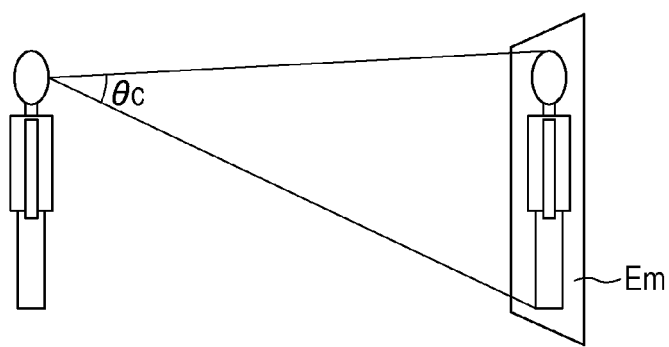
FIG. 4C is a schematic view illustrating an example of an image of a user displayed on an electronic mirror using a conventional imaging and displaying device.
Figure 4D:
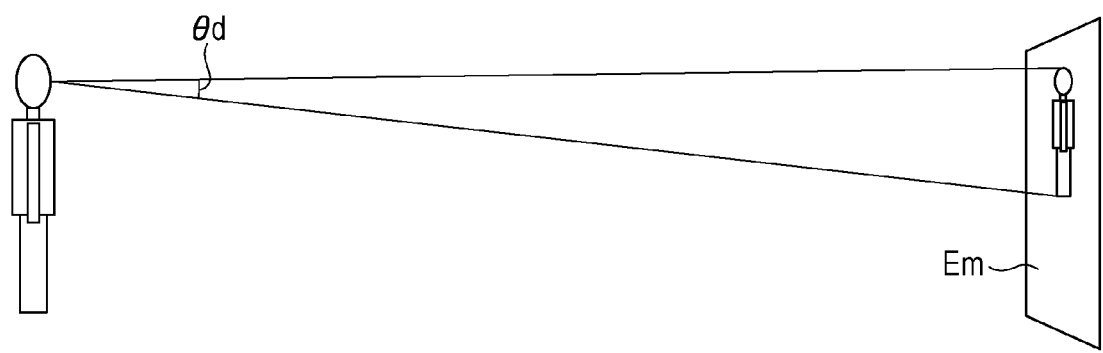
FIG. 4D is a schematic view illustrating a state where a distance between the electronic mirror and the user has doubled.

FIGS. 4C and 4D illustrate, as a comparative example, how the user appears on an electronic mirror Em using a conventional imaging and displaying device. In a case where an imaging and displaying device is used, a taken image is displayed on a display unlike the case of a mirror. For example, it is assumed that an image of a user is displayed life size on a display as illustrated in FIG. 4C. In this case, the magnitude of an angle at which the size of the image displayed on the display is recognized is θc illustrated in FIG. 4C. It is assumed here that the value of θc is the same as that of θa. It is assumed that the user steps back from the state illustrated in FIG. 4C so that the distance between the user and the electronic mirror doubles as illustrated in FIG. 4D. In this case, the size of the image of the user taken by an imaging device is ½ of that in the case of FIG. 4C. Therefore, the image of the user is displayed in the size of ½ of the image illustrated in FIG. 4C on the display of the imaging and displaying device. The magnitude of an angle at which the size of the image displayed on the display is recognized is θd illustrated in FIG. 4D. The value of θd is smaller than that of θb. That is, in the state illustrated in FIG. 4D, the image of the user displayed on the display is smaller than that in the case illustrated in FIG. 4B. In other words, in the case of an electronic mirror, a change of the size of an image caused by back and forth movement is larger than that in the case of an actual mirror.

Figure 4E:
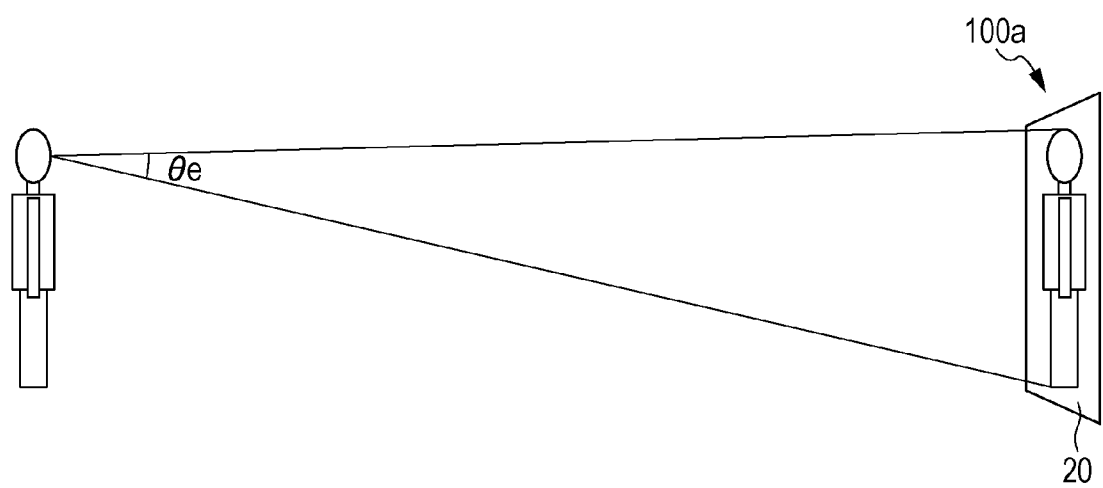
FIG. 4E is a schematic view illustrating an example in which an image of a life size is displayed on a screen regardless of a distance to the user by using an imaging and displaying device of the present disclosure.

In view of this, an image of a life size may be displayed on a screen regardless of the distance to the electronic mirror. That is, the size of an image displayed on the display 20 may be changed in accordance with the distance to the electronic mirror as illustrated in FIG. 4E. For example, in a case where the distance between the imaging and displaying device 100a and the user has doubled, it is only necessary to double the magnification ratio. In this case, the size of the image on the screen is unchanged, that is, remains a life size, and the angle θe is the same as the angle θb obtained in the case of an actual mirror. That is, it is only necessary to determine the magnification ratio in proportion to the distance between the imaging and displaying device 100a and the user.

Figure 1F:
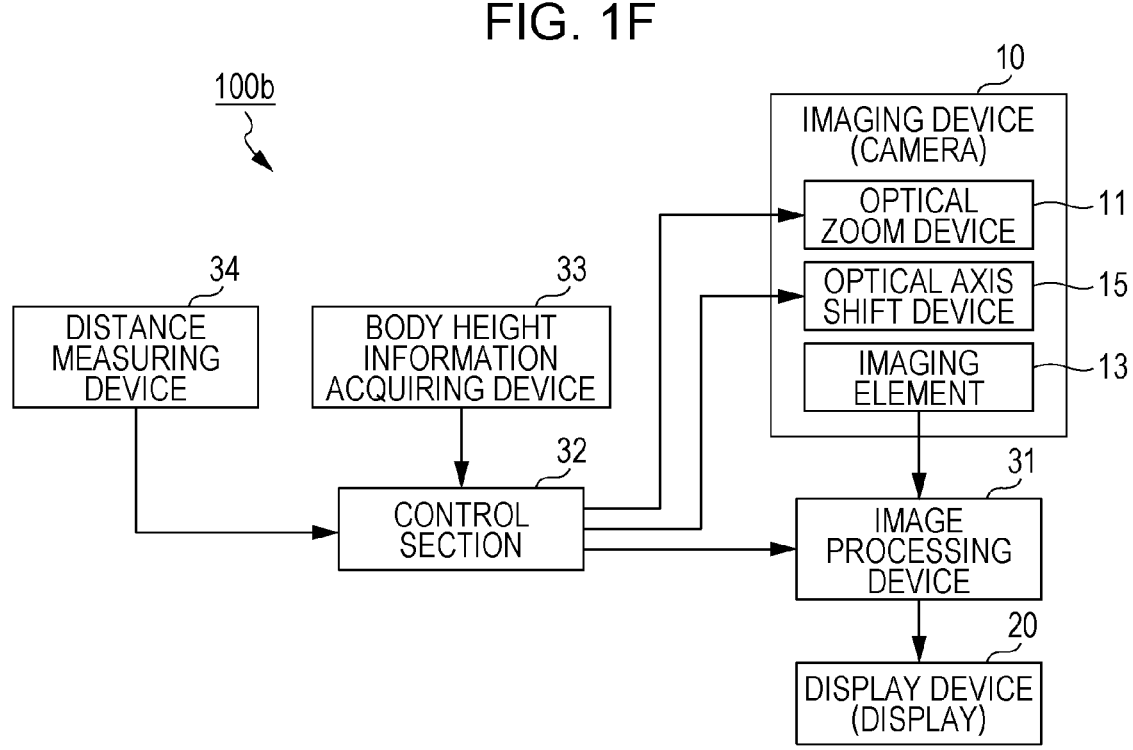
FIG. 1F is a block diagram illustrating an example of a configuration of an imaging and displaying device that has a distance measuring device.

The imaging and displaying device can have a distance measuring device that measures a distance to a user. FIG. 1F illustrates an example of a configuration of an imaging and displaying device 100b that has a distance measuring device 34. A known device such as a laser distance meter may be used as the distance measuring device 34. In a case where an autofocus sensor is incorporated in the imaging device 10, the autofocus sensor may be used as the distance measuring device 34.

The distance measuring device 34 measures a distance between the imaging and displaying device 100b and a user. The distance measuring device 34 sends, to the control section 32, information indicative of the distance between the imaging and displaying device 100b and the user. The control section 32 determines a ratio in accordance with the distance between the imaging and displaying device 100b and the user. This ratio as a magnification ratio is, for example, set to a larger value as the distance between the imaging and displaying device and the user becomes larger. Also, this ratio as a reduction ratio is, for example, set to a smaller value as the distance between the imaging and displaying device and the user becomes smaller. This ratio includes a magnification ratio (or a reduction ratio) that is proportional to the distance between the imaging and displaying device 100b and the user. The control section 32 causes the optical zoom device 11 to operate in accordance with the determined ratio. The optical zoom device 11 performs optical magnification or reduction processing under control of the control section 32. The image processing device 31 may performs processing for magnifying or reducing an image obtained by the imaging device 10 under control of the control section 32. In this case, the magnification ratio determined by the control section 32 is sent from the control section 32 to the image processing device 31 (FIG. 1F). The image processing device 31 performs processing for magnifying the image on the basis of the magnification ratio acquired from the control section 32. Note that it is also possible that a magnification ratio be determined on the basis of information on the body height of the user, and the magnification ratio be sent from the control section 32 to the image processing device 31 (FIGS. 1E and 1F). Such image correction may be, for example, executed by the control section 32. Although the magnification ratio (or reduction ratio) is determined on the basis of the distance in the above example, it is also possible that the foot of the user be detected, and the magnification ratio (or reduction ratio) be determined so that the foot of the user is displayed on the bottommost part of the screen.

Note that the technique of the present disclosure can be also applied to an imaging and displaying device using a half mirror.

Figure 5A:
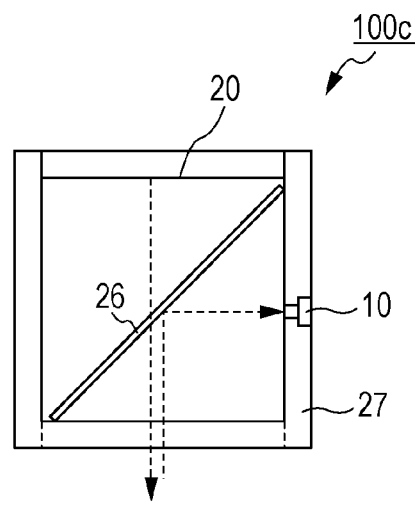
FIG. 5A is a top view of an imaging and displaying device that includes a half mirror.
Figure 5B:
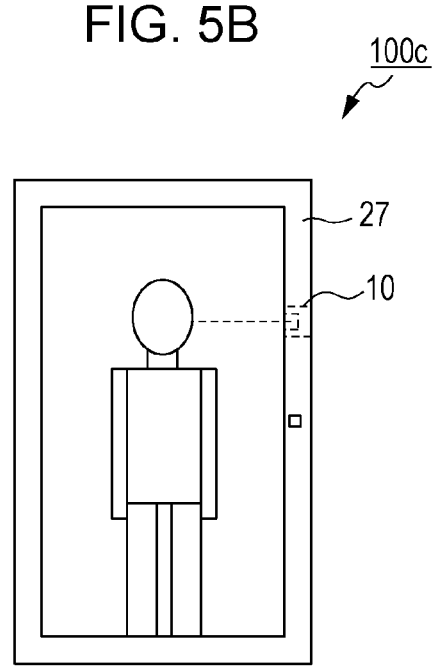
FIG. 5B is a front view of the imaging and displaying device.
Figure 5C:
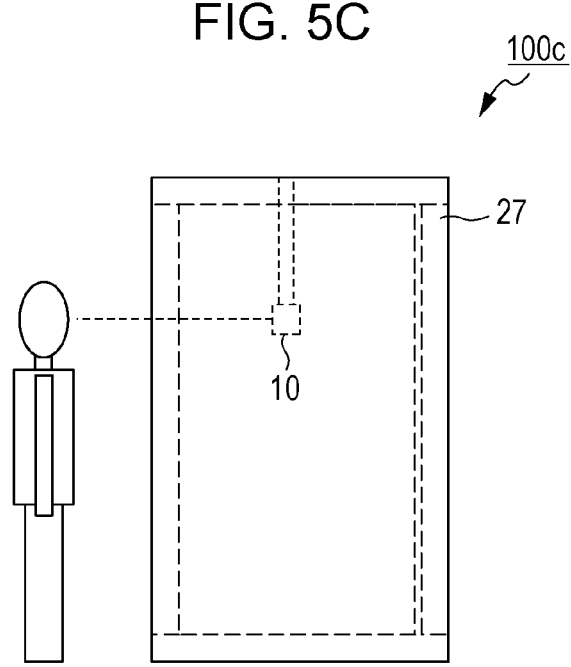
FIG. 5C is a side view of the imaging and displaying device.
Figure 5D:
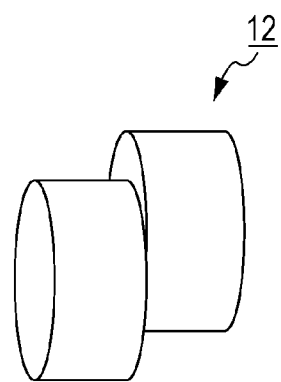
FIG. 5D is a view visualizing a shift amount in an optical axis shift device.

FIGS. 5A through 5D illustrate an example of a configuration of an imaging and displaying device 100c that includes a half mirror 26. FIG. 5A is a top view of the imaging and displaying device 100c. FIG. 5B is a front view of the imaging and displaying device 100c. FIG. 5C is a side view of the imaging and displaying device 100c. As illustrated in FIGS. 5A, 5B, and 5C, the imaging and displaying device 100c has a dark box 27. The imaging device 10, the display 20, and the half mirror 26 are disposed in the dark box 27. FIG. 5D is a view visualizing the shift amount in the optical axis shift device.

In the imaging and displaying device 100c, the height of the imaging device 10 can be freely set physically. The height of the imaging device 10 may be set, for example, to the average height of human eyes (for example, 160 cm from the floor). A transmissive liquid crystal display device, a hologram screen, or the like may be used instead of the half mirror 26. Such an imaging and displaying device can be within an applicable range of the present disclosure.

Embodiment 2

Figure 6A:
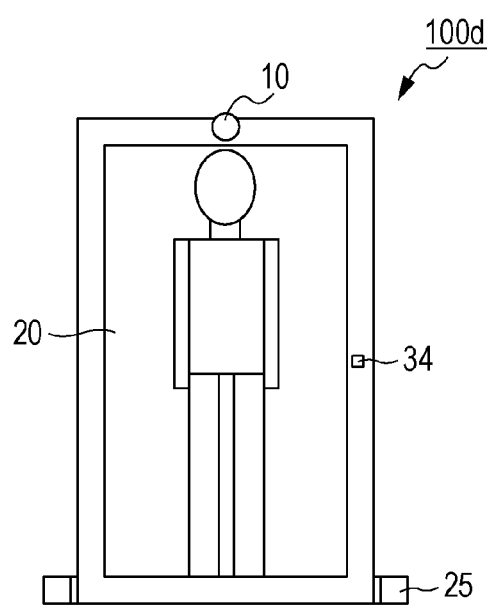
FIG. 6A is a front view of a display of an imaging and displaying device according to Embodiment 2.
Figure 6B:
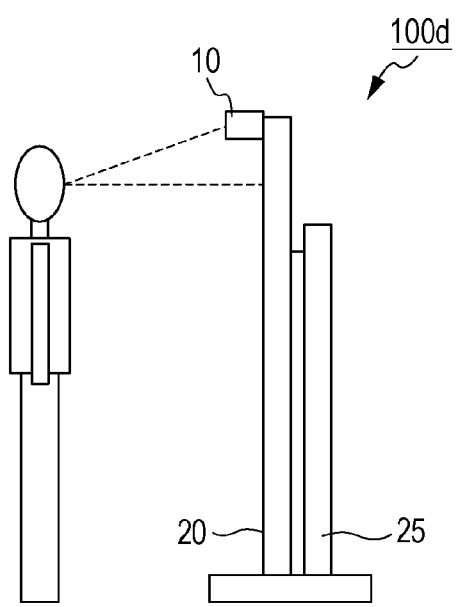
FIG. 6B is a side view that corresponds to FIG. 6A.
Figure 6C:
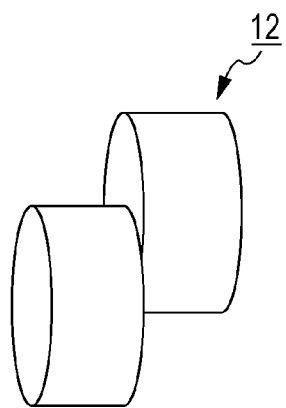
FIG. 6C is a view visualizing a shift amount in an optical axis shift device in the state illustrated in FIG. 6B.
Figure 6D:
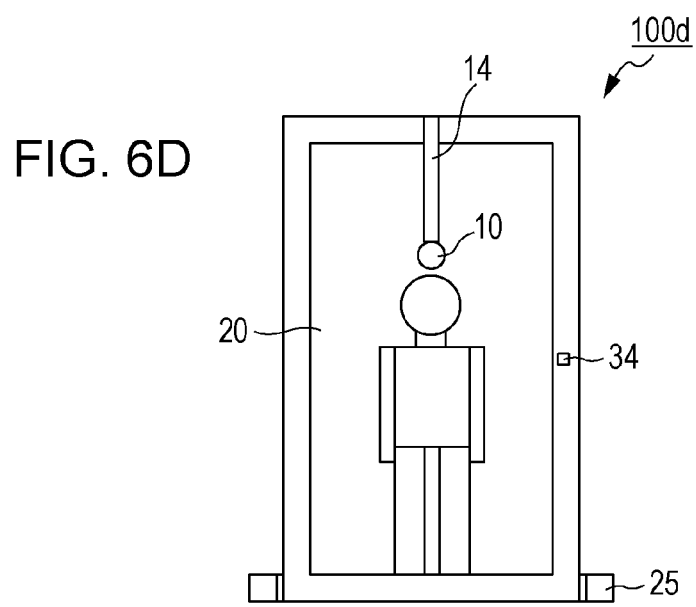
FIG. 6D is a front view of the display of the imaging and displaying device according to Embodiment 2.
Figure 6E:
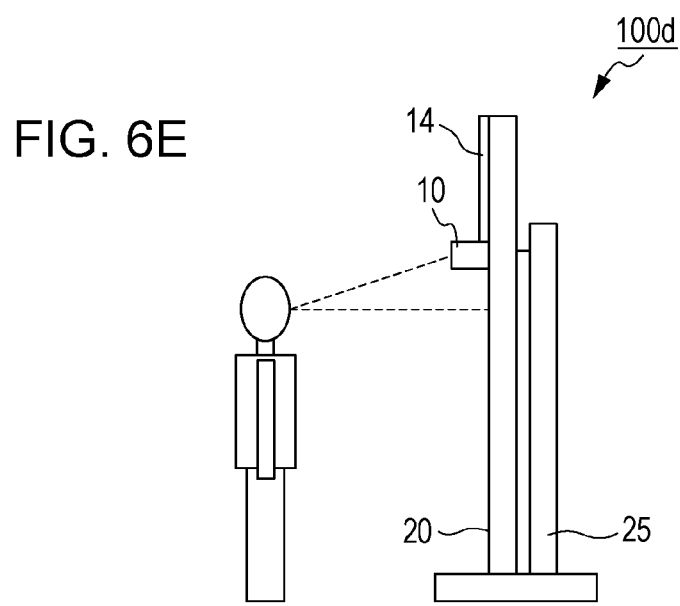
FIG. 6E is a side view that corresponds to FIG. 6D.
Figure 6F:
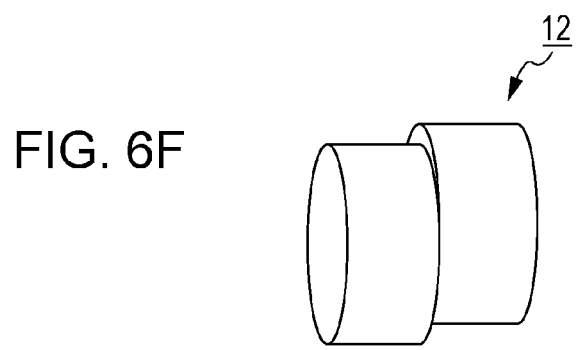
FIG. 6F is a view visualizing a shift amount in an optical axis shift device in the state illustrated in FIG. 6E.
Figure 6G:
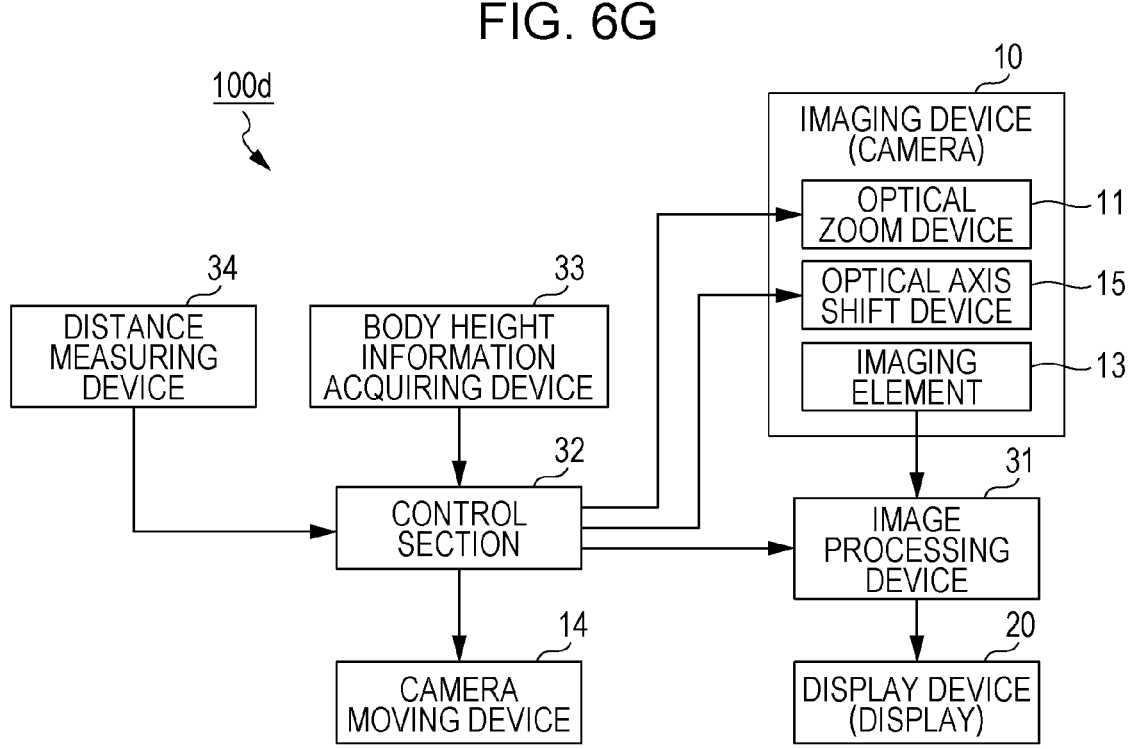
FIG. 6G is a block diagram illustrating an example of an outline configuration of the imaging and displaying device.

Embodiment 2 of the present disclosure is described with reference to FIGS. 6A through 6G and FIGS. 7A through 7D. FIGS. 6A through 6G are views each illustrating an exemplary configuration of an imaging and displaying device 100d according to Embodiment 2. FIGS. 6A and 6D are front views of a display 20. FIGS. 6B and 6E are side views that correspond to FIGS. 6A and 6D, respectively. FIGS. 6C and 6F are views visualizing a shift amount in an optical axis shift device in the states illustrated in FIGS. 6B and 6E, respectively. FIG. 6G is a block diagram illustrating an example of an outline configuration of the imaging and displaying device 100d. FIGS. 6A, 6B, and 6C illustrate a case where the body height of a user is high, and FIGS. 6D, 6E, and 6F illustrate a case where the body height of a user is low.

The imaging and displaying device 100d according to the present embodiment includes a camera moving device 14. In the imaging and displaying device 100d, the camera moving device 14 is configured to move an imaging device 10 up and down near the screen of the display 20 in accordance with the body height of the user. From the viewpoint of matching lines of sight, it is useful to dispose the imaging device 10 at a position slightly higher than the body height of the user. The camera moving device 14 can be realized, for example, by a combination of a motor and a ball screw. The camera moving device 14 may be realized by using a telescopic arm, a multijoint arm, or the like. The configuration of the camera moving device 14 is not limited to a specific one, as long as the camera moving device 14 can move the imaging device 10 to a desired height.

A control section 32 may be configured to control the camera moving device 14 in accordance with information on the body height. In the configuration illustrated in FIG. 6G, the control section 32 acquires information indicative of the body height of the user, for example, from a body height information acquiring device 33 and then determines the height of the imaging device 10 on the basis of the acquired information. Information indicative of the height of the imaging device 10 is sent from the control section 32 to the camera moving device 14. The camera moving device 14 changes the height of the imaging device 10 on the basis of the information received from the control section 32. In this way, the control section 32 may control the camera moving device 14 in accordance with the body height of the user or the height of a specific portion such as eyes. The image of the user on the display 20 moves higher as the height of the imaging device 10 becomes lower. Therefore, control is executed, for example, so that the position of the imaging device 10 becomes lower as the body height of the user or the height of the specific portion of the body of the user (for example, eyes) becomes lower. Note that the control section 32 may set a shift amount in an optical axis shift device 15 in accordance with the information on the body height as described below.

Note that the shift amount in the optical axis shift device 15 can depends on the height of the imaging device 10 from the floor. Typically, the shift amount is larger as the height of the imaging device 10 from the floor is higher, whereas the shift amount is smaller as the height of the imaging device 10 from the floor is lower. For example, in a case where the body height of the user is high, the imaging device 10 is also at a high position as illustrated in FIGS. 6A and 6B. Accordingly, the position of the image of the user displayed on the display 20 is sometimes low. In this case, the image of the user displayed on the display 20 is moved upward by making the shift amount in the optical axis shift device 15 relatively large as illustrated in FIG. 6C. Therefore, it becomes likely to achieve matching of lines of sight. Meanwhile, in a case where the body height of the user is low, the imaging device 10 is also at a low position as illustrated in FIGS. 6D and 6E. Accordingly, the position of the image of the user displayed on the display 20 is relatively high, and the shift amount in the optical axis shift device 15 need just be relatively small as illustrated in FIG. 6F. That is, the relationship between the body height of the user and the shift amount is opposite to that in Embodiment 1. In this way, the control section 32 may be configured to control the optical axis shift device 15 so that the shift amount becomes smaller as the height of the imaging device 10 becomes lower.

According to the present embodiment, it is possible to display a well-balanced image with no distortion such as short legs. Moreover, since the imaging device 10 can be moved to a position slightly higher than the body height of the user, it is relatively easy to achieve matching of lines of sight especially for a user whose body height is low.

Figure 7A:
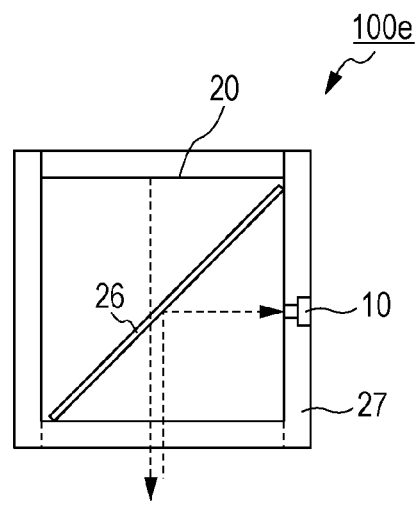
FIG. 7A is a top view of an imaging and displaying device that includes a half mirror.
Figure 7B:
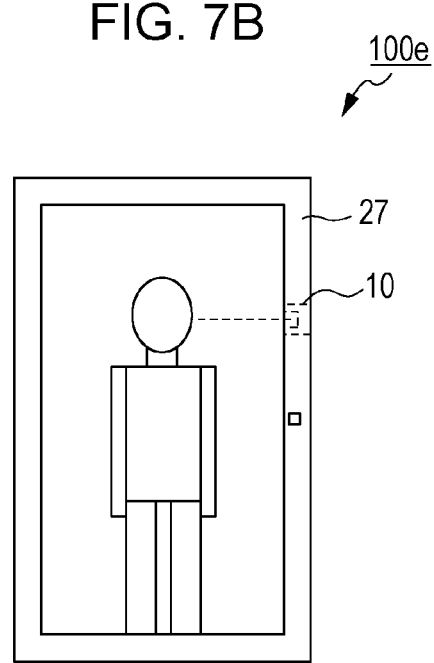
FIG. 7B is a front view of the imaging and displaying device.
Figure 7C:
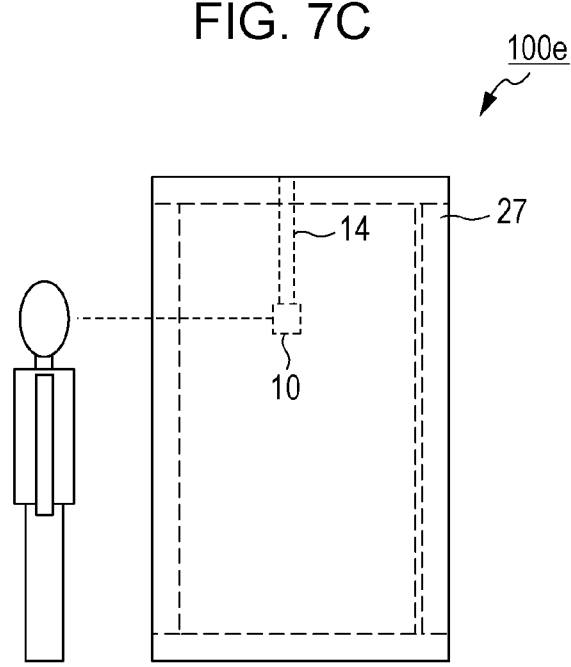
FIG. 7C is a side view of the imaging and displaying device.
Figure 7D:
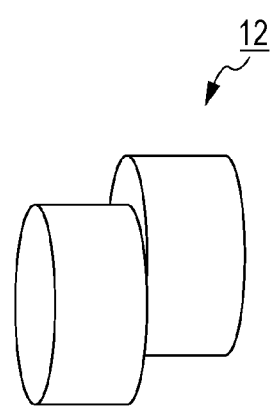
FIG. 7D is a view visualizing an optical axis shift device in an optical axis shift device.

Note that a half mirror may be utilized as illustrated in FIGS. 7A through 7C. FIG. 7A is a top view of an imaging and displaying device 100e that includes a half mirror 26. FIG. 7B is a front view of the imaging and displaying device 100e. FIG. 7C is a side view of the imaging and displaying device 100e. FIG. 7D is a view visualizing the shift amount in the optical axis shift device. According to the configuration illustrated in FIGS. 7A through 7D, it is possible to relatively easily achieve matching of a user's line of sight and a line of sight in an image on a screen. A transmissive liquid crystal display device, a hologram screen, or the like may be used instead of the half mirror. Such an imaging and displaying device is also within an applicable range of the present disclosure.

Embodiment 3

Figure 8A:
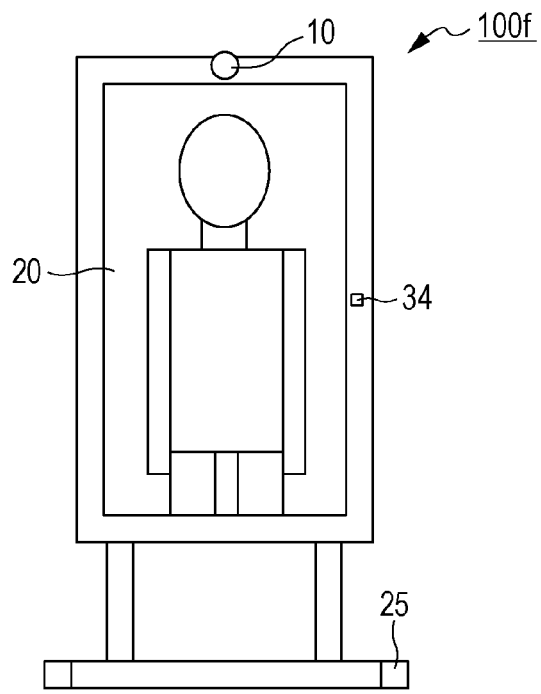
FIG. 8A is a front view of a display of an imaging and displaying device according to Embodiment 3.
Figure 8B:
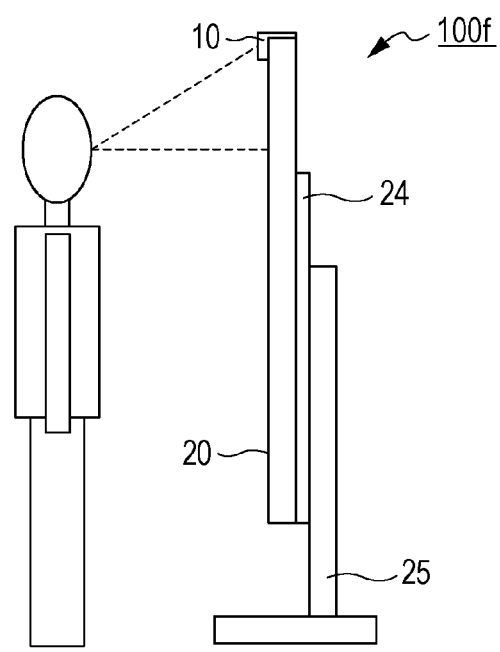
FIG. 8B is a side view that corresponds to FIG. 8A.
Figure 8C:
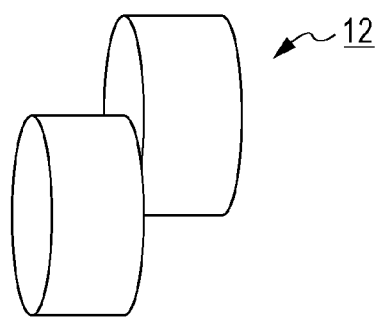
FIG. 8C is a view visualizing a shift amount in an optical axis shift device in the state illustrated in FIG. 8B.
Figure 8D:
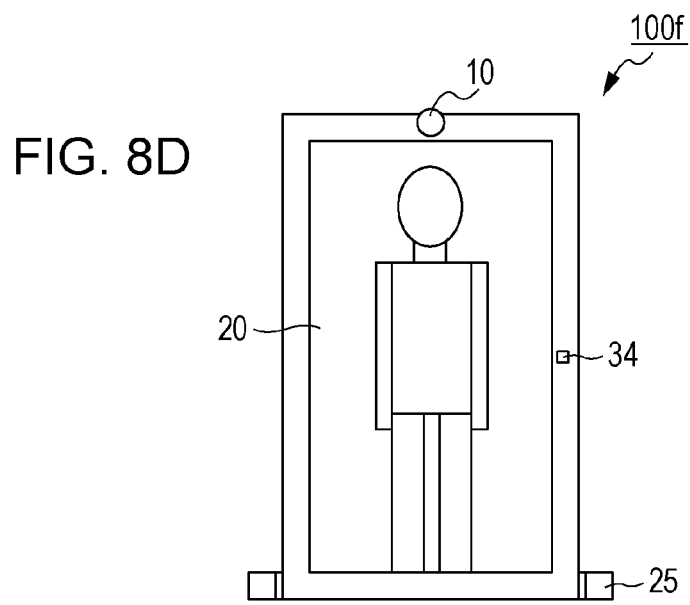
FIG. 8D is a front view of the display of the imaging and displaying device according to Embodiment 3.
Figure 8E:
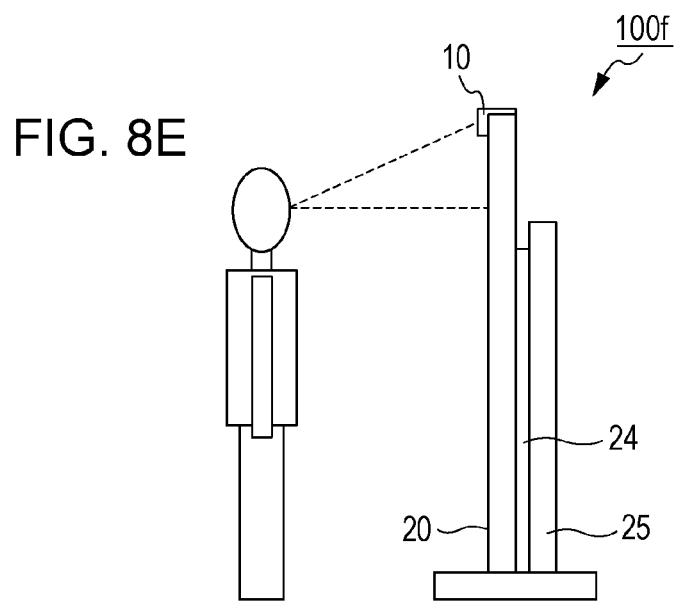
FIG. 8E is a side view that corresponds to FIG. 8D.
Figure 8F:
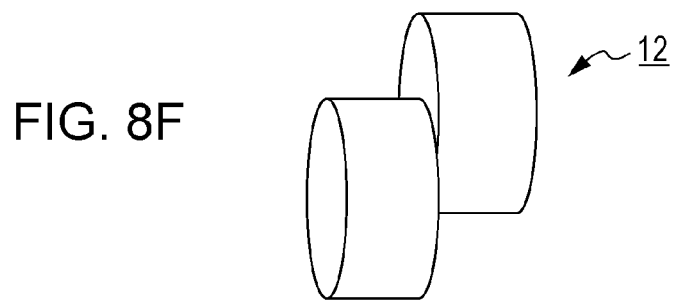
FIG. 8F is a view visualizing a shift amount in an optical axis shift device in the state illustrated in FIG. 8E.
Figure 8G:
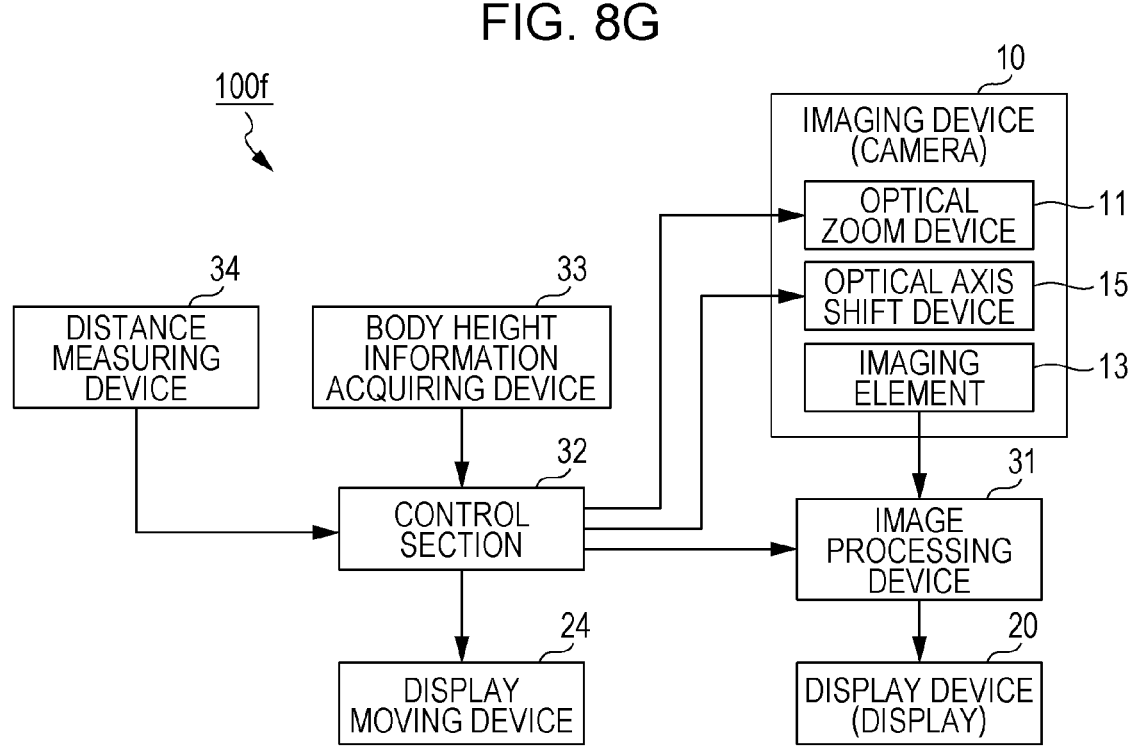
FIG. 8G is a block diagram illustrating an example of an outline configuration of the imaging and displaying device.

Embodiment 3 of the present disclosure is described with reference to FIGS. 8A through 8G and FIGS. 9A through 9I. FIGS. 8A through 8G are views each illustrating an exemplary configuration of an imaging and displaying device 100f according to Embodiment 3. FIGS. 8A and 8D are front views of a display 20. FIGS. 8B and 8E are side views that correspond to FIGS. 8A and 8D, respectively. FIGS. 8C and 8F are views visualizing a shift amount in an optical axis shift device in the states illustrated in FIGS. 8B and 8E, respectively. FIG. 8G is a block diagram illustrating an example of an outline configuration of the imaging and displaying device 100f. FIGS. 8A, 8B, and 8C illustrate a case where the body height of a user is high, and FIGS. 8D, 8E, and 8F illustrate a case where the body height of a user is low.

In the present embodiment, an imaging device 10 is fixed at an upper part of the display 20. The imaging and displaying device 100f according to the present embodiment includes a display moving device 24. The display moving device 24 is configured to move the display 20 up and down. The display moving device 24 can be, for example, realized by a combination of a motor and a ball screw or a toothed belt. The configuration of the display moving device 24 is not limited to a specific one, as long as the display moving device 24 can move the display 20 to a desired height. The height of the display 20 is set, for example, in accordance with the body height of the user. From the viewpoint of matching lines of sight, it is useful to set the height of the display 20 so that the imaging device 10 is located at a position slightly higher than the body height of the user.

A control section 32 may be configured to control the display moving device 24 in accordance with information indicative of the body height of the user. In the configuration illustrated in FIG. 8G, the control section 32 acquires the information indicative of the body height of the user, for example, from a body height information acquiring device 33 and then determines the height of the display 20 on the basis of the acquired information. Information indicative of the height of the display 20 is sent from the control section 32 to the display moving device 24. The display moving device 24 changes the height of the display 20 on the basis of the information received from the control section 32. In this way, the control section 32 may control the display moving device 24 in accordance with the body height of the user or the height of a specific portion such as eyes.

For example, when the display 20 is moved upward, the imaging device 10 fixed onto the display 20 also moves upward in accordance with movement of the display 20. As a result, the image of the user displayed on the display 20 moves downward on the display 20. However, since the display 20 itself is moved upward, a change of the eye height in the image of the user relative to the floor is relatively small. The height of the display 20 can be appropriately determined within a range in which distortion of the image is permissible. The shift amount in the optical axis shift device 15 may be fixed. That is, the shift amount in the optical axis shift device 15 may be fixed within a range in which the display 20 can move up and down regardless of the body height of the user as illustrated in FIGS. 8C and 8F.

In a case where the display 20 is relatively small, the range in which the display 20 can move up and down is wide. In a case where the display 20 is large, the lower limit of movement of the display 20 is a position at which the display 20 makes contact with the floor. That is, in a case where the display 20 is large, the range in which the display 20 can move up and down is narrow. In a case where the range of movement of the display 20 is insufficient, part of the operation of Embodiment 1 may be employed as described below.

Figure 9A:
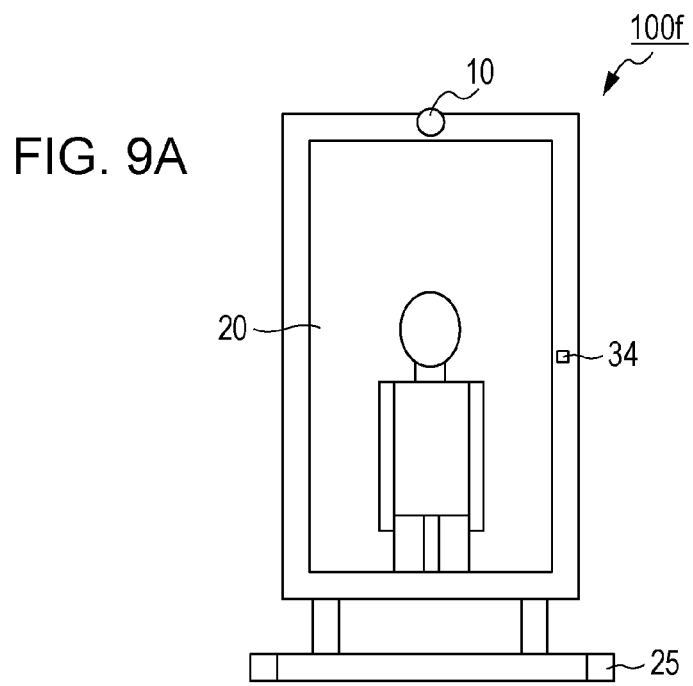
FIG. 9A is a front view of the display of the imaging and displaying device.
Figure 9B:
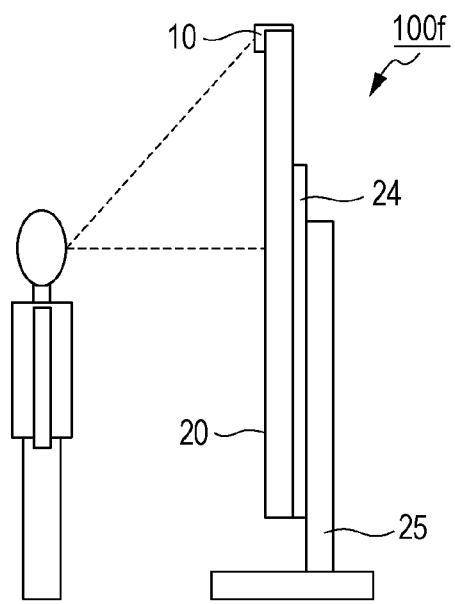
FIG. 9B is a side view that corresponds to FIG. 9A.
Figure 9C:
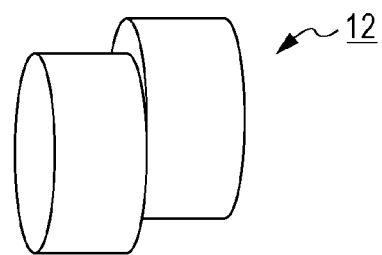
FIG. 9C is a view visualizing a shift amount in an optical axis shift device in the state illustrated in FIG. 9B.
Figure 9D:
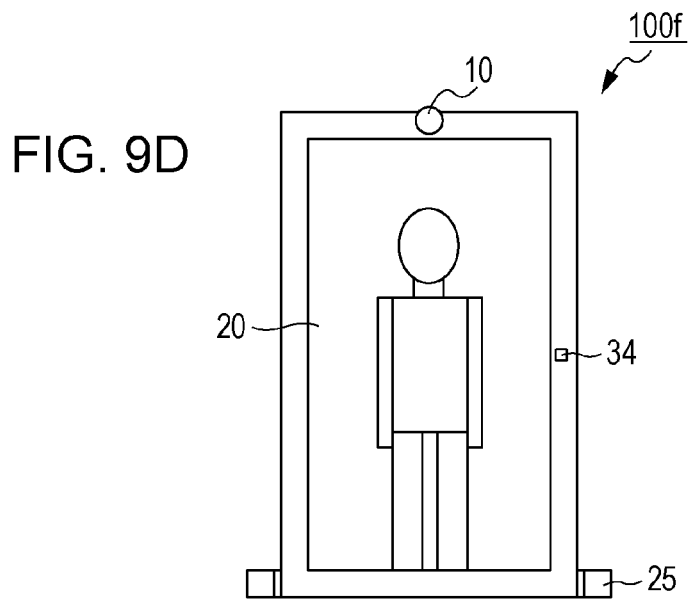
FIG. 9D is a front view of the display of the imaging and displaying device.
Figure 9E:
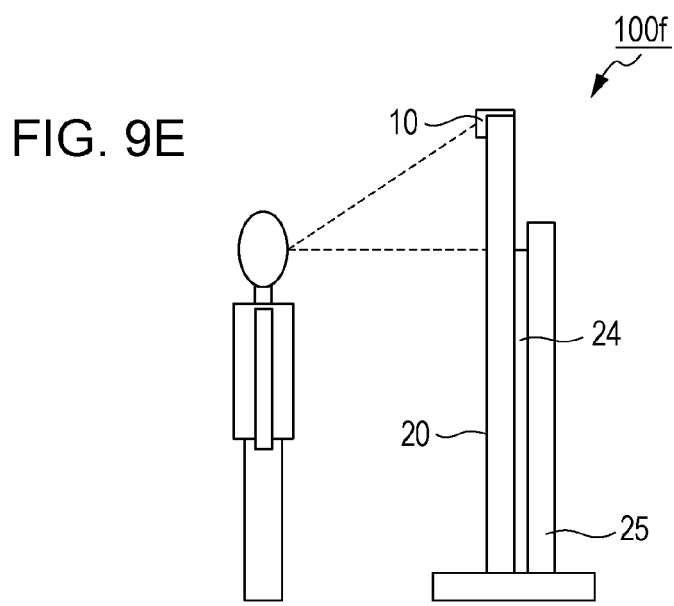
FIG. 9E is a side view that corresponds to FIG. 9D.
Figure 9F:
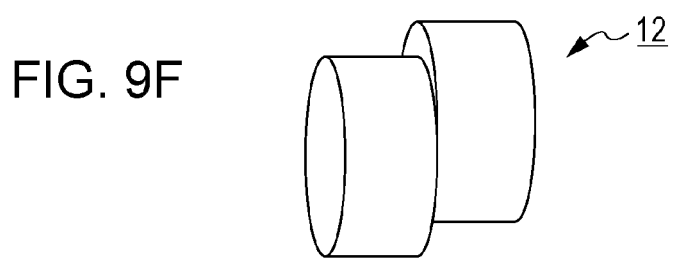
FIG. 9F is a view visualizing a shift amount in an optical axis shift device in the state illustrated in FIG. 9E.
Figure 9G:
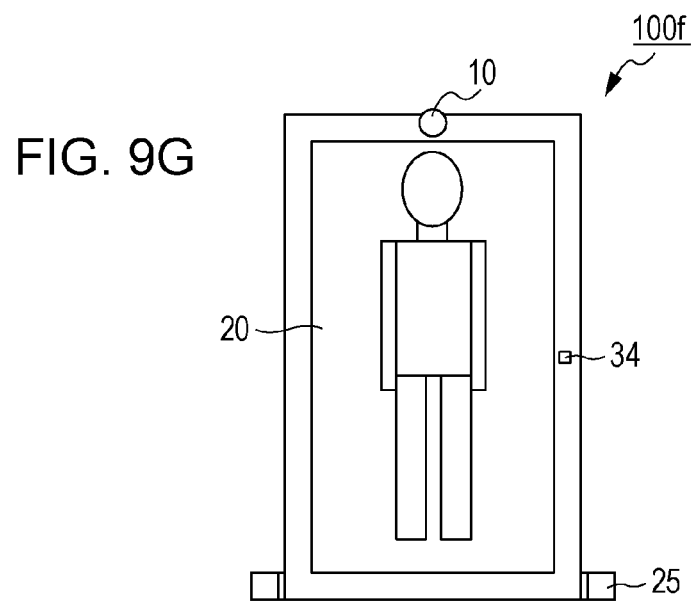
FIG. 9G is a front view of the display of the imaging and displaying device.
Figure 9H:
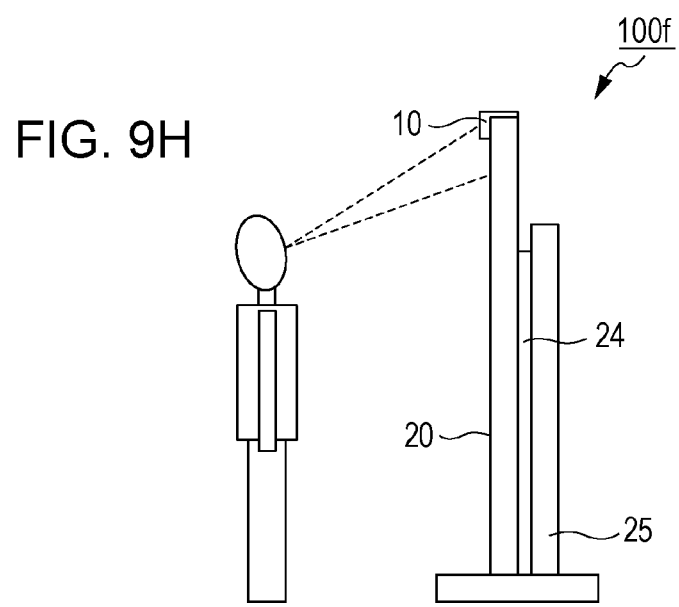
FIG. 9H is a side view that corresponds to FIG. 9G.
Figure 9I:
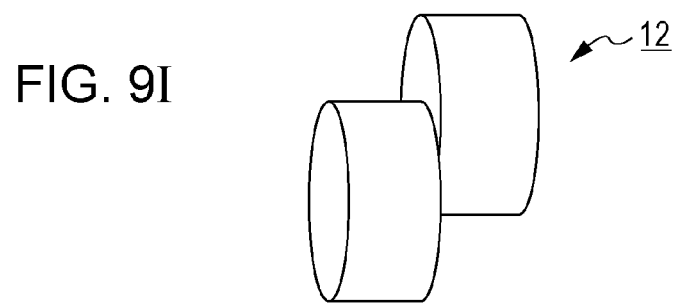
FIG. 9I is a view visualizing a shift amount in an optical axis shift device in the state illustrated in FIG. 9H.

An example of operation of the imaging and displaying device 100f is described with reference to FIGS. 9A through 9I. FIGS. 9A, 9D, and 9G are front views of the display 20. FIGS. 9B, 9E, and 9H are side views that correspond to FIGS. 9A, 9D, and 9G, respectively. FIGS. 9C, 9F, and 9I are views visualizing a shift amount in an optical axis shift device in the states illustrated in FIGS. 9B, 9E, and 9H, respectively.

FIGS. 9A, 9B, and 9C illustrate a state in which the display 20 is located at a high position relative to the user. It is assumed here that the body height of the user is low. The control section 32 acquires information on the body height of the user, for example, from a body height information acquiring device 33 (see FIG. 8G). The control section 32 determines the height of the display 20 on the basis of the acquired information. The display moving device 24 lowers the position of the display 20 under control of the control section 32. In this case, the shift amount in the optical axis shift device 15 is not changed. FIGS. 9D, 9E, and 9F illustrate a state where the display 20 has reached the floor. The display 20 does not go down any further from the state illustrated in FIGS. 9D, 9E, and 9F. In a case where the amount of movement of the display 20 is insufficient (that is, in a case where the deviation angle is relatively large), the control section 32 controls the optical axis shift device 15 to increase the shift amount in the optical axis shift device 15 as illustrated in FIG. 9I. This further moves up the image of the user displayed on the display 20 as illustrated in FIG. 9G. Therefore, the deviation angle is reduced. As a result, matching of the lines of sight is achieved.

As described above, according to the present embodiment, it is possible to achieve matching of lines of sight even in a case where the size of the display 20 is large and where a sufficient amount of movement cannot be secured.

Figure 20:
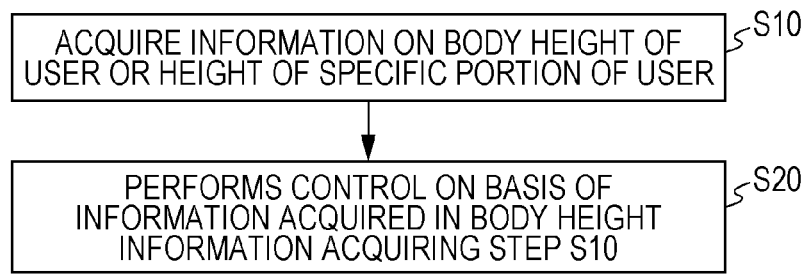
FIG. 20 is a flow chart illustrating an outline of an exemplary method of operation of an imaging and displaying device of the present disclosure.

FIG. 20 is a flow chart illustrating an outline of an exemplary method of operation of the imaging and displaying device of the present disclosure. The operation method illustrated in FIG. 20 includes a body height information acquiring step S10 and a control step S20. In the body height information acquiring step S10, information on the body height of the user or the height of a specific portion of the user is acquired. In the control step S20, control is performed on the basis of the information acquired in the body height information acquiring step S10. In the control step S20, at least one of the shift amount in the optical axis shift device 15, the amount of movement of the display in the display moving device 24, and the amount of movement of the camera in the camera moving device 14 can be set.

Embodiment 4

Embodiment 4 of the present disclosure is described with reference to FIGS. 10A through 14C, and FIG. 21. To summarize Embodiment 4, an image of a human in an image is cut out by an image processing device 31 by using an imaging device whose range of coverage is wider.

Figure 10A:
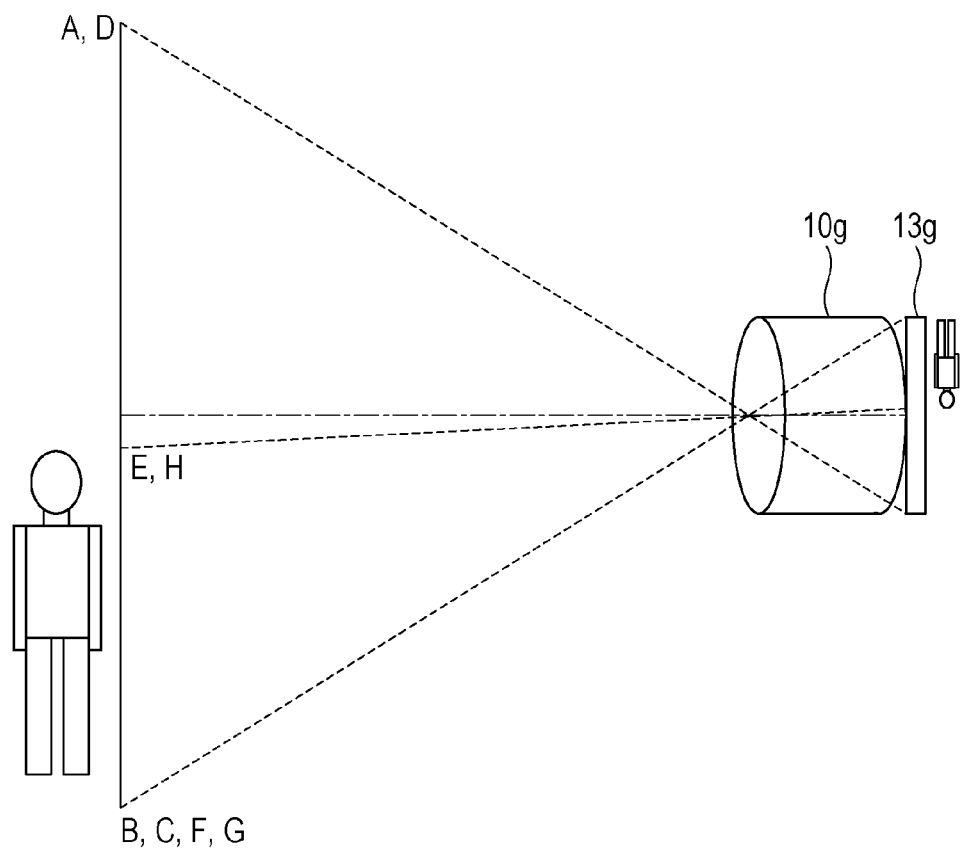
FIG. 10A is a schematic view for explaining cutout of an image.
Figure 10B:
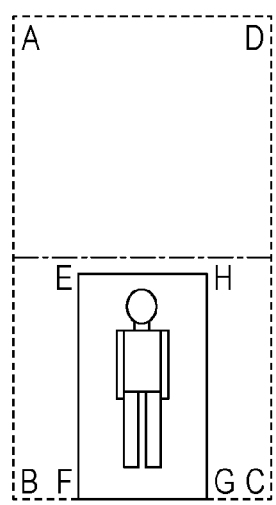
FIG. 10B is a view illustrating an example of a cutout range.
Figure 10C:
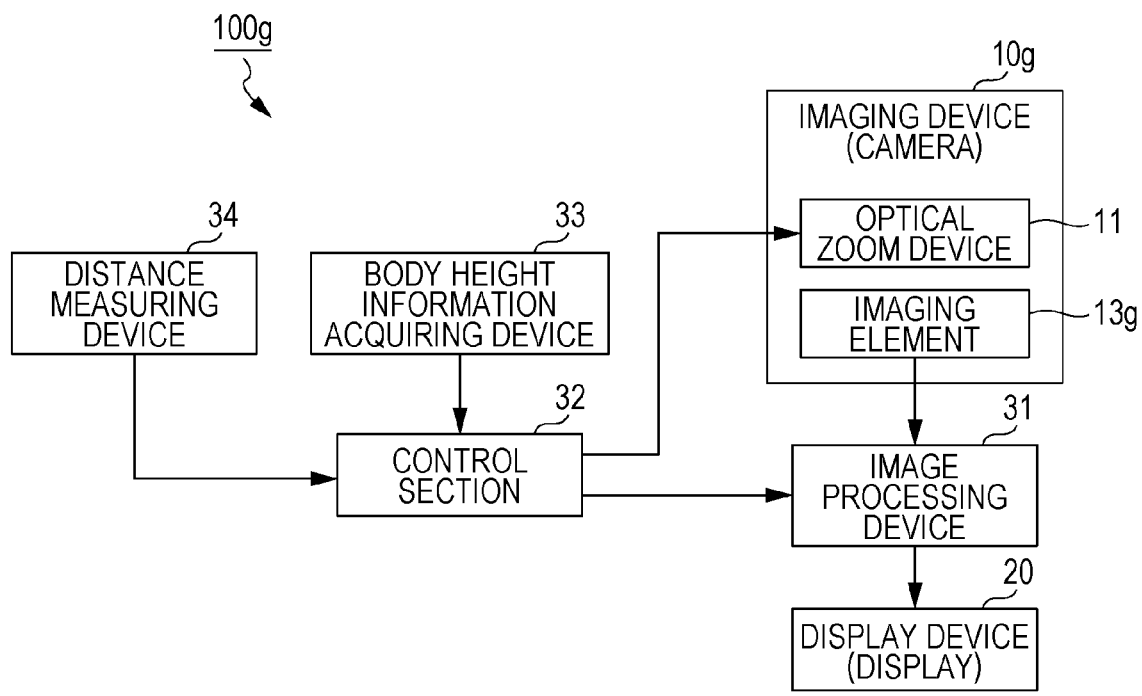
FIG. 10C is a block diagram illustrating an example of an outline configuration of an imaging and displaying device.

FIGS. 10A through 10C are referred to below. FIG. 10A is a schematic view for explaining cutout of an image. FIG. 10B is a view illustrating an example of a range of cutout. FIG. 10C is a block diagram illustrating an example of an outline configuration of an imaging and displaying device 100g according to the present embodiment.

As illustrated in FIG. 10A, when an image of the whole body of a user is taken by using an imaging device 10g whose optical axis is parallel with the floor, the user and an image on an imaging surface become parallel with each other. Accordingly, the image of the user formed on the imaging surface becomes similar to the user. Therefore, no distortion of shape occurs. In the present embodiment, an imaging element 13g having an imaging surface that is large enough to be able to take an image of the whole body of the user is used.

FIG. 10B schematically illustrates an example of an image acquired by the imaging element 13g. In FIG. 10B, the rectangle ABCD indicated by the broken line schematically represents a range of coverage of the imaging element 13g. As illustrated in FIG. 10B, an image obtained by the imaging device 10 is an image whose range is wide, i.e., the rectangle ABCD. In the present embodiment, the range EFGH including a human is cut out from the image whose range is wide. This cutout processing can be executed by an image processing device 31. Note that the positions of the vertexes of the rectangle ABCD and the rectangle EFGH are also illustrated in FIG. 10A.

FIG. 10C is referred to below. In the configuration illustrated in FIG. 10C, the imaging device 10g is fixed on a display 20 as in the imaging and displaying device according to Embodiment 1. In the imaging and displaying device 100g, the imaging device 10g does not have an optical axis shift device. In the imaging and displaying device 100g, an image signal (or a video signal) that is output from the imaging element 13g is sent to the image processing device 31, and a control section 32 determines the position of cutout of an image of a human in the image. Information designating the cutout position is sent from the control section 32 to the image processing device 31. The image processing device 31 cuts out the image of the human on the basis of the cutout position designated by the control section 32.

Figure 11A:
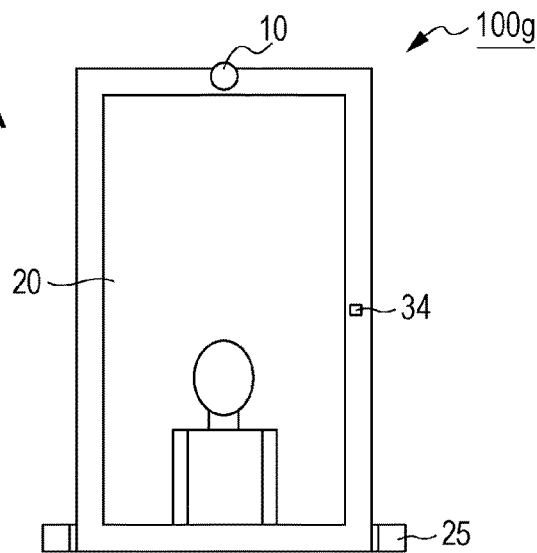
FIG. 11A is a front view of a display of the imaging and displaying device.
Figure 11B:
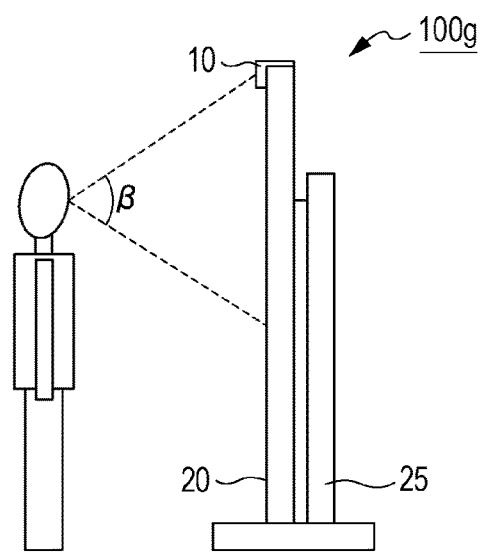
FIG. 11B is a side view that corresponds to FIG. 11A.
Figure 11C:
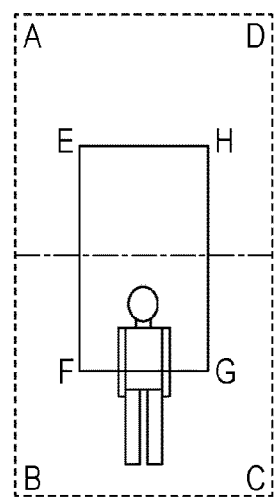
FIG. 11C is a view visualizing a cutout range of an image of a human in an image acquired in the state illustrated in FIG. 11B.
Figure 11D:
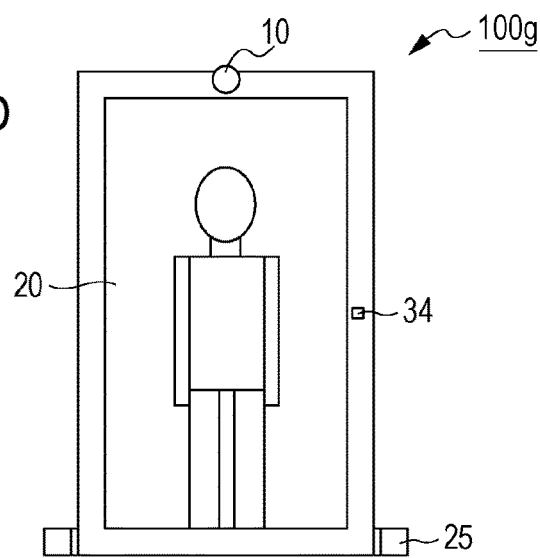
FIG. 11D is a front view of the display of the imaging and displaying device.
Figure 11E:
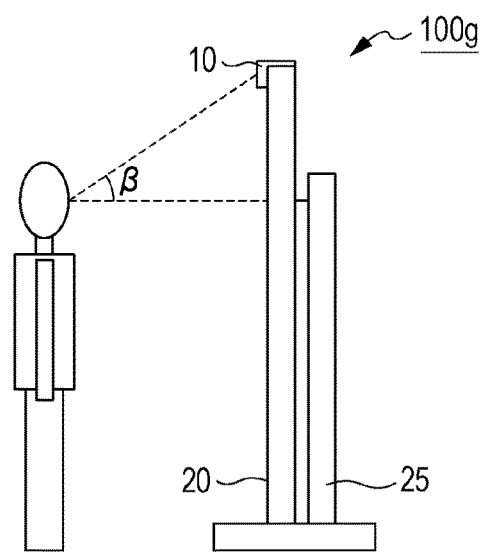
FIG. 11E is a side view that corresponds to FIG. 11D.
Figure 11F:
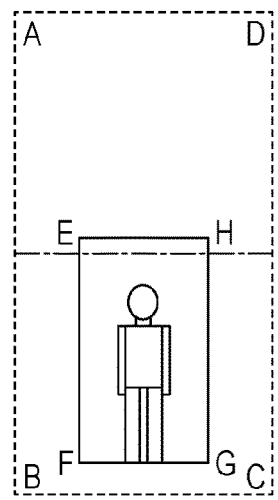
FIG. 11F is a view visualizing a cutout range of an image of a human in an image acquired in the state illustrated in FIG. 11E.
Figure 11G:
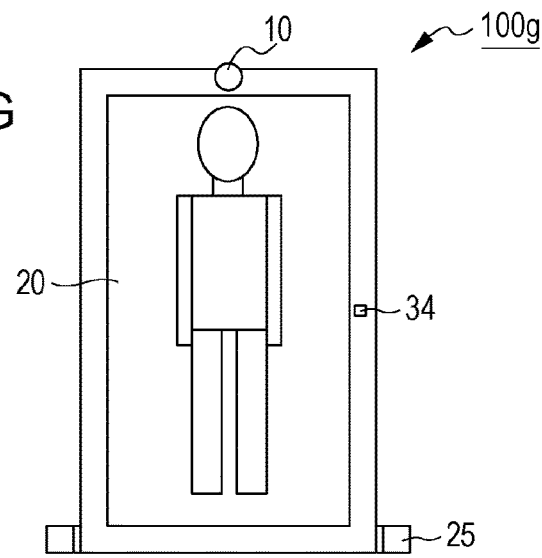
FIG. 11G is a front view of the display of the imaging and displaying device.
Figure 11H:
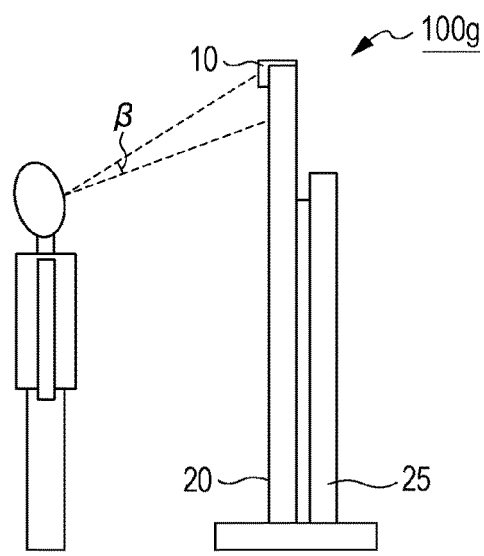
FIG. 11H is a side view that corresponds to FIG. 11G.
Figure 11I:
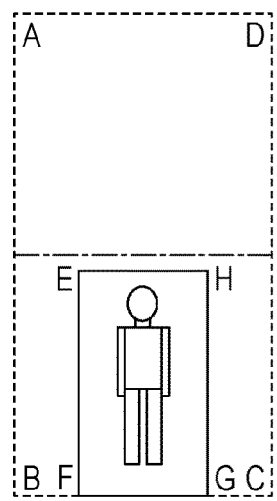
FIG. 11I is a view visualizing a cutout range of an image of a human in an image acquired in the state illustrated in FIG. 11H.

A relationship between a cutout position and the position of an image of a user on the display 20 is described with reference to FIGS. 11A through 11I. FIGS. 11A through 11I are views for explaining an example of a cutout position. FIGS. 11A, 11D, and 11G are front views of the display 20. FIGS. 11B, 11E, and FIG. 11H are side views that correspond to FIGS. 11A, 11D, and 11G, respectively. FIGS. 11C, 11F, and FIG. 11I are views visualizing a cutout range of an image of a human in an image acquired in the states illustrated in FIGS. 11B, 11E, and 11H, respectively.

FIGS. 11A, 11B, and 11C illustrate a case where a central region of a captured range (see the rectangle ABCD illustrated in FIG. 10B) has been cut out. In this case, an image of a user is displayed in a rather lower portion of the display 20. As a natural consequence, the user's line of sight is directed downward and does not match that in the image displayed on the display 20. It is assumed here that the cutout position is lowered as illustrated in FIGS. 11D, 11E, and 11F. As a result, the image of the human displayed on the display 20 moves upward. FIGS. 11D, 11E, and 11F illustrate a case where the eye height of the user just matches that in the image. In a case where the user is a user whose body height is high, matching of the lines of sight is achieved without further adjustment. However, in a case where the body height of the user is low, a deviation angle is large, and therefore matching of the lines of sight is sometimes not achieved. In this case, it is only necessary to further lower the cutout position as illustrated in FIGS. 11G, 11H, and 11I. This makes it possible to further move up the image of the human displayed on the display 20. By further moving up the image of the human displayed on the display 20, the user is caused to face in the direction of the imaging device 10, and as a result, the deviation angle becomes smaller. Therefore, matching of the lines of sight is achieved. In this way, the cutout position of the image may be lowered as the body height of the user (or the height of a specific portion such as eyes) becomes lower.

The imaging and displaying device 100g can include a camera moving device 14 as in Embodiment 2. That is, in the imaging and displaying device 100g, the imaging device 10 may be configured to move up and down.

Figure 12A:
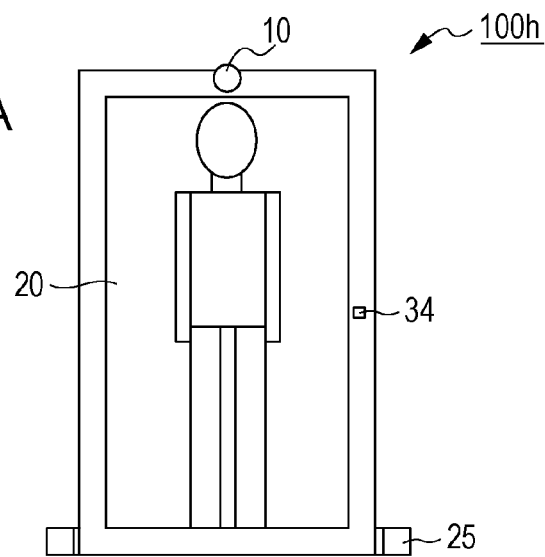
FIG. 12A is a front view of a display of an imaging and displaying device that includes a camera moving device.
Figure 12B:
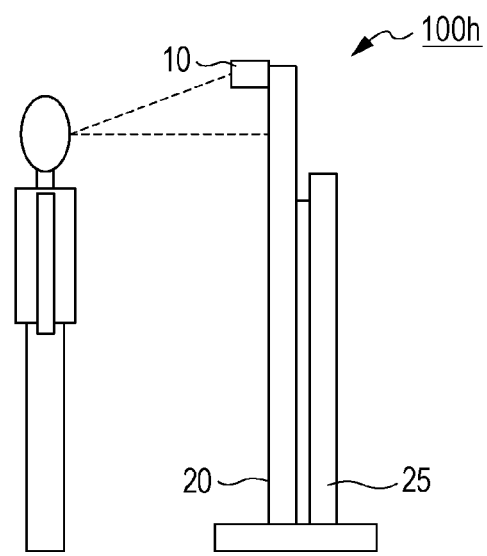
FIG. 12B is a side view that corresponds to FIG. 12A.
Figure 12C:
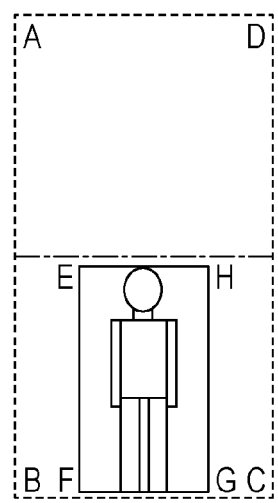
FIG. 12C is a view visualizing a cutout range of an image of a human in an image acquired in the state illustrated in FIG. 12B.
Figure 12D:
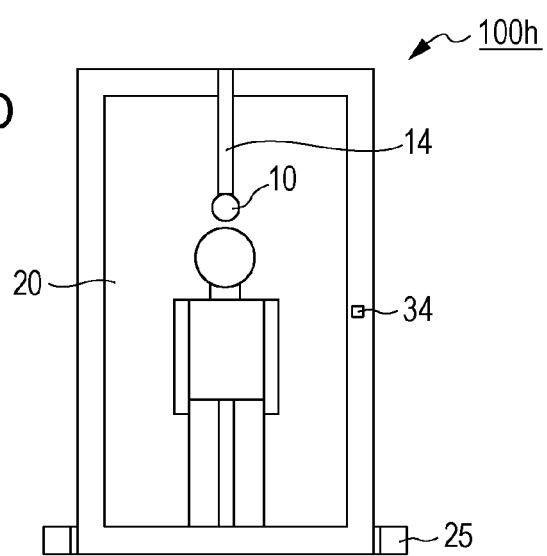
FIG. 12D is a front view of the display of the imaging and displaying device that includes the camera moving device.
Figure 12E:
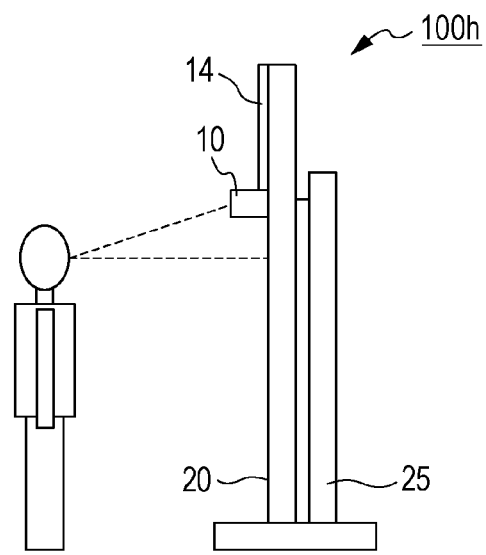
FIG. 12E is a side view that corresponds to FIG. 12D.
Figure 12F:
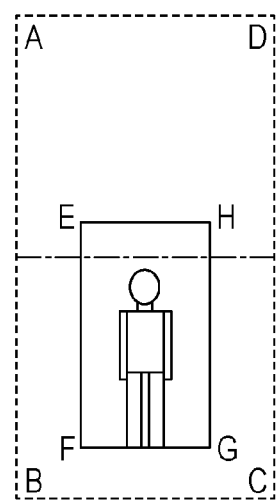
FIG. 12F is a view visualizing a cutout range of an image of a human in an image acquired in the state illustrated in FIG. 12E.

An example of an operation of an imaging and displaying device 100h that includes the camera moving device 14 is described with reference to FIGS. 12A through 12G. FIGS. 12A and 12D are front views of the display 20. FIGS. 12B and 12E are side views that correspond to FIGS. 12A and 12D, respectively. FIGS. 12C and 12F are views visualizing a cutout range of an image of a human in an image acquired in the states illustrated in FIGS. 12B and 12E, respectively.

Figure 12G:
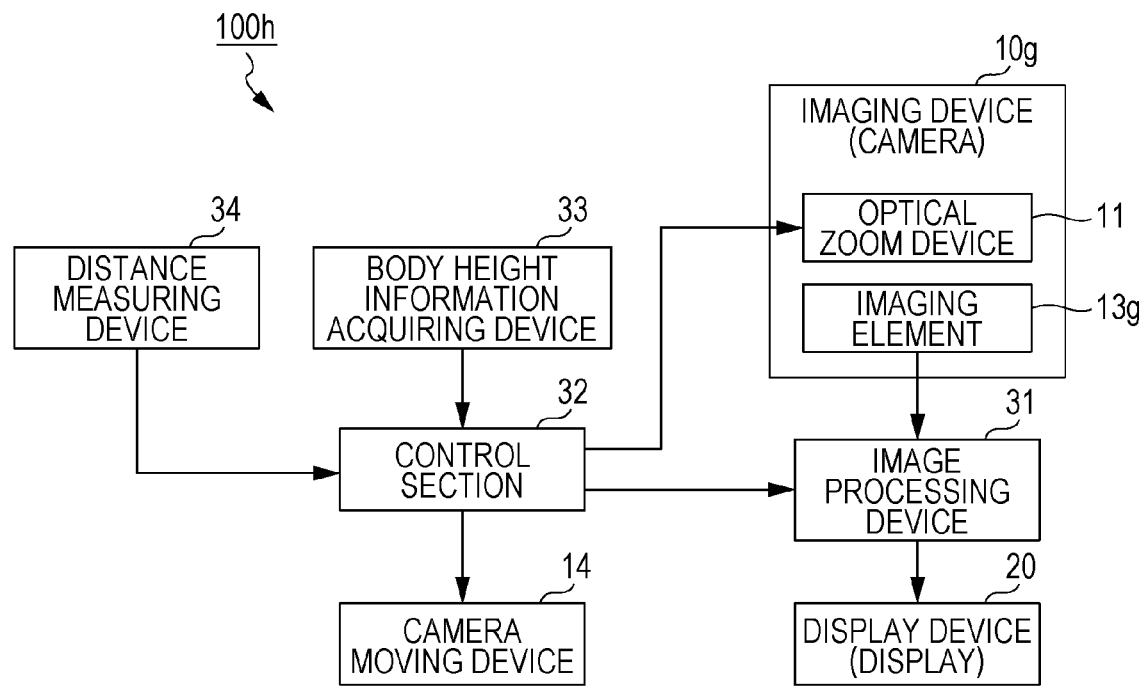
FIG. 12G is a block diagram illustrating an example of an outline configuration of the imaging and displaying device.

FIG. 12G is a block diagram illustrating an example of an outline configuration of the imaging and displaying device 100h.

In a case where the body height of the user is high, the imaging device 10 is at a high position as illustrated in FIGS. 12A and 12B. In this case, a relatively lower region in the acquired image is cut out as illustrated in FIG. 12C. In a case where the body height of the user is low, the imaging device 10 is moved to a low position by the camera moving device 14 as illustrated in FIGS. 12D and 12E. In this case, the position of the human in the acquired image moves upward as illustrated in FIG. 12F, as compared with the case where the imaging device 10 is at a high position. That is, it is only necessary to cut out a more upper region as compared with the example illustrated in FIG. 12C. In this way, in a case where the imaging device 10 is movable up and down, the cutout position of the image may be made higher as the position of the imaging device 10 becomes lower. For example, the control section 32 acquires the body height of the user from a body height information acquiring device 33, and then instructs the image processing device 31 about the cutout position on the basis of the acquired information.

The imaging and displaying device can include a display moving device 24 as in Embodiment 3. That is, in the imaging and displaying device, the display 20 may be configured to move up and down.

Figure 13A:
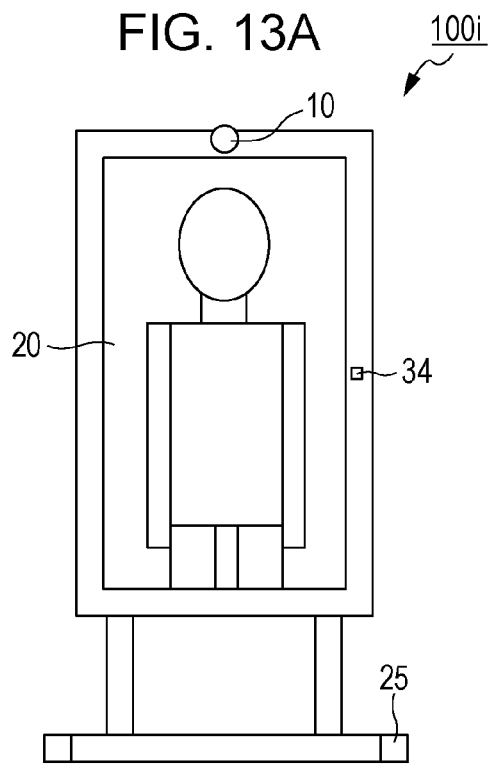
FIG. 13A is a front view of a display of an imaging and displaying device that includes a display moving device.
Figure 13B:
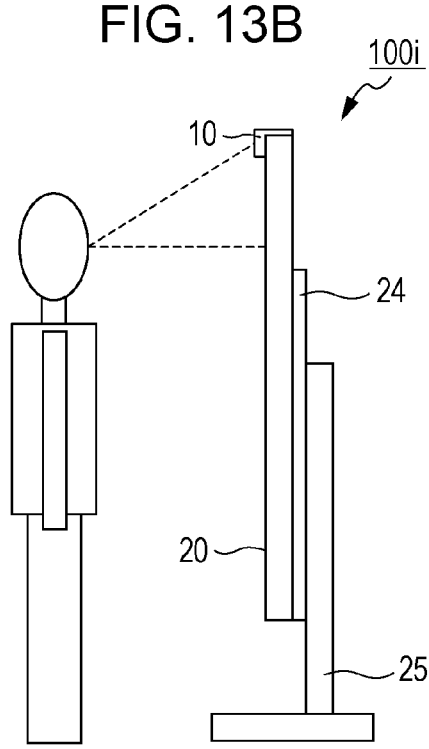
FIG. 13B is a side view that corresponds to FIG. 13A.
Figure 13C:
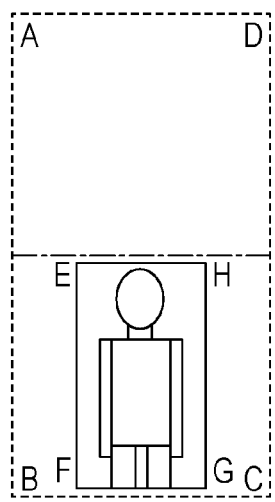
FIG. 13C is a view visualizing a cutout range of an image of a human in an image acquired in the state illustrated in FIG. 13B.
Figure 13D:
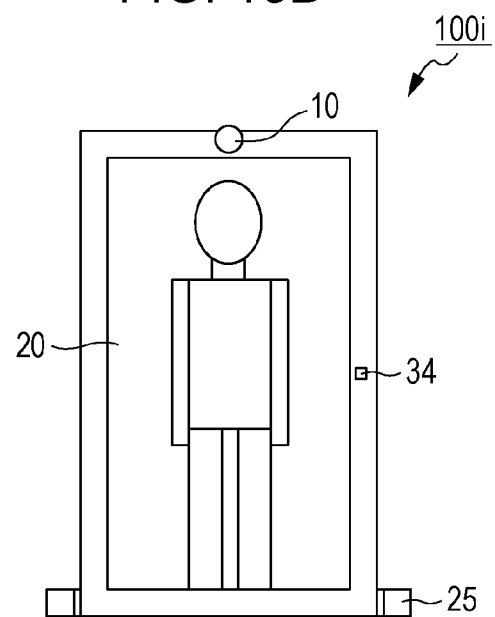
FIG. 13D is a front view of the display of the imaging and displaying device that includes the display moving device.
Figure 13E:
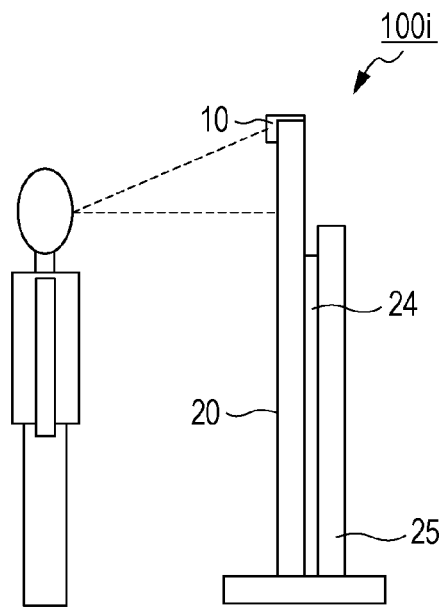
FIG. 13E is a side view that corresponds to FIG. 13D.
Figure 13F:
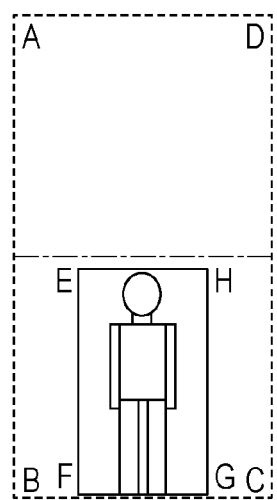
FIG. 13F is a view visualizing a cutout range of an image of a human in an image acquired in the state illustrated in FIG. 13E.
Figure 13G:
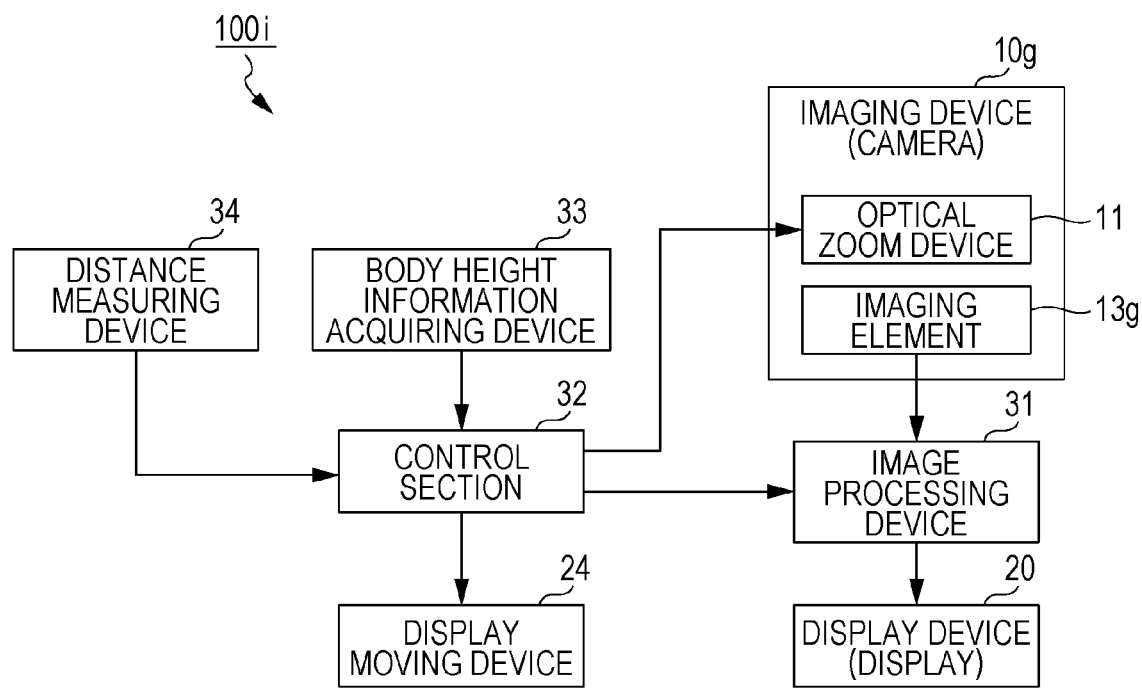
FIG. 13G is a block diagram illustrating an example of an outline configuration of the imaging and displaying device.

An example of an operation of an imaging and displaying device 100i that includes the display moving device 24 is described with reference to FIGS. 13A through 13G. FIGS. 13A and 13D are front views of the display 20. FIGS. 13B and 13E are side views that correspond to FIGS. 13A and 13D, respectively. The imaging device 10 is fixed on the display 20. FIGS. 13C and 13F are views visualizing a cutout range of an image of a human in an image acquired in the states illustrated in FIGS. 13B and 13E, respectively. FIG. 13G is a block diagram illustrating an example of an outline configuration of the imaging and displaying device 100i.

In this case, for example, the display 20 can be disposed at a height corresponding to the body height of the user. Therefore, the cutout position can be fixed regardless of the body height of the user, that is, the height of the imaging device 10 as in the example illustrated in FIGS. 13C and 13F. Note that in a case where the display 20 is in contact with the floor (in a case where the display 20 has reached a lower limit position), the position of the image of the human displayed on the display 20 can be made higher by lowering the cutout position. This makes it possible to direct the user's line of sight toward the vicinity of the imaging device 10.

As described above, according to the present embodiment, it is possible to display a human image without distortion with a simpler configuration although the imaging element 13g having a larger imaging surface is used. In the imaging and displaying device, both of the imaging device 10 and the display 20 may be configured to be movable up and down.

Figure 14A:
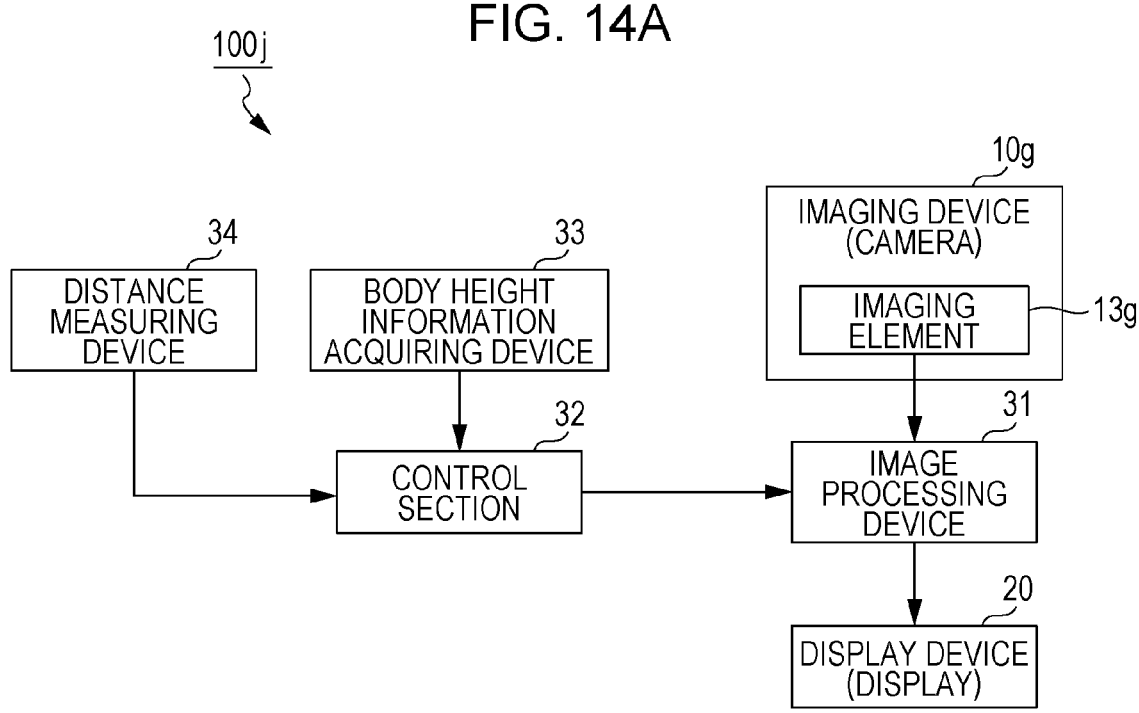
FIG. 14A is a block diagram illustrating an example of an imaging and displaying device in which an image processing device is configured to perform zoom processing by using numerical value computation.
Figure 14B:
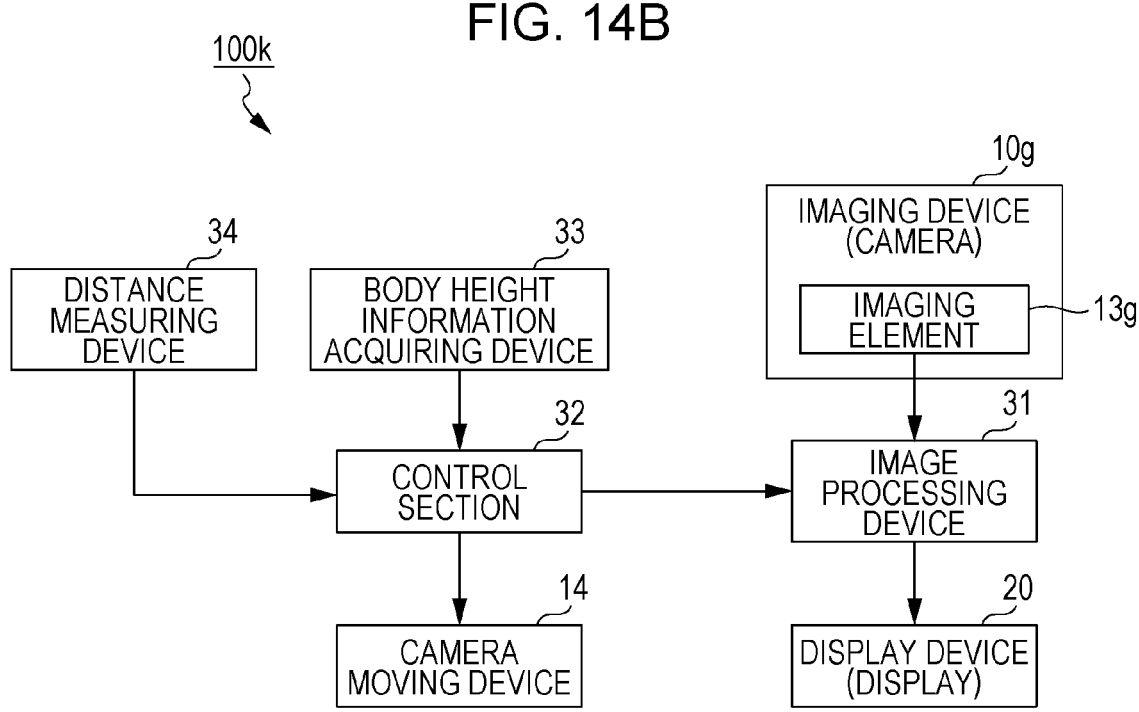
FIG. 14B is a block diagram illustrating an example of an imaging and displaying device in which an image processing device is configured to perform zoom processing by using numerical value computation.
Figure 14C:
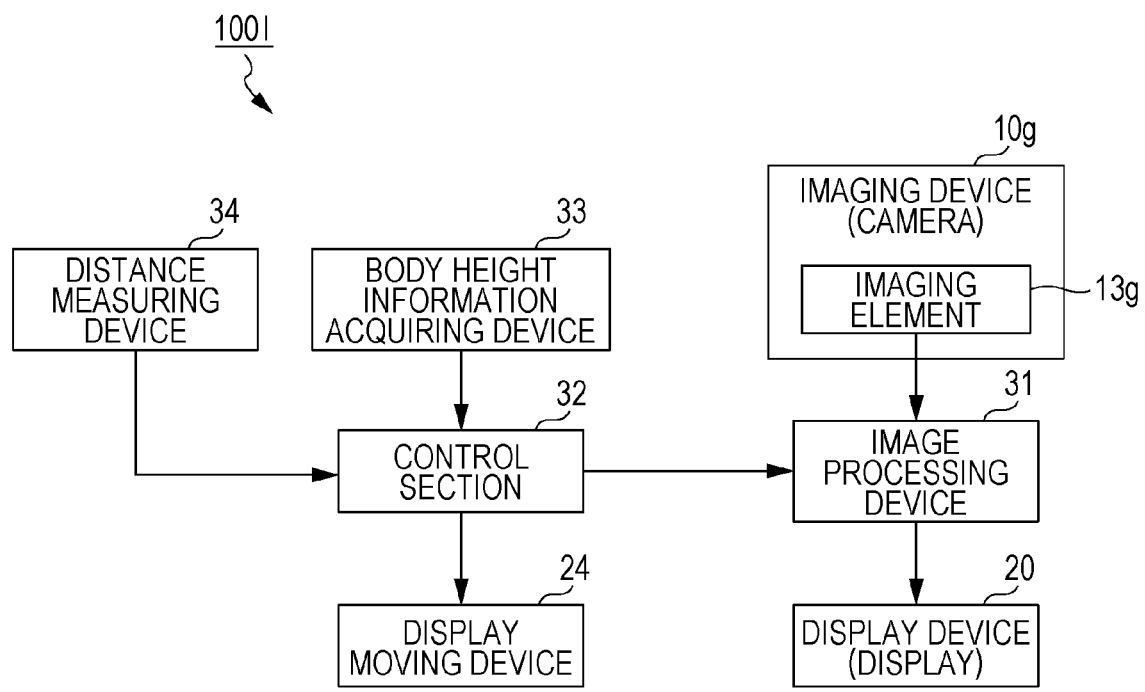
FIG. 14C is a block diagram illustrating an example of an imaging and displaying device in which an image processing device is configured to perform zoom processing by using numerical value computation.

Note that an optical zoom device 11 is not essential in the imaging and displaying device. For example, the image processing device 31 may perform zoom processing by using numerical value computation. FIGS. 14A, 14B, and 14C are block diagrams illustrating examples of imaging and displaying devices 100j, 100k, and 100l having such a configuration, respectively. FIGS. 14A, 14B, and 14C correspond to configurations obtained by excluding the optical zoom device 11 from the configurations illustrated in FIGS. 10C, 12G, and 13G, respectively. In these configurations, the control section 32, for example, instructs the image processing device 31 about a cutout position and a magnification ratio. According to such configurations, it is possible to provide an imaging and displaying device that displays a human image without distortion by using the imaging device 10g having a simpler structure.

Figure 21:
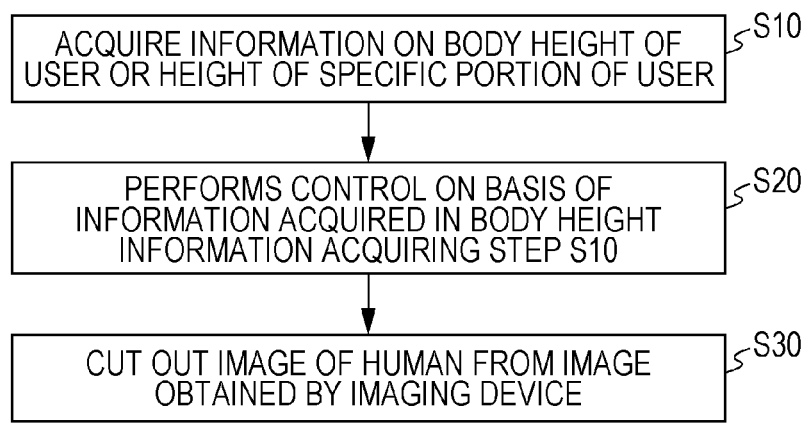
FIG. 21 is a flow chart illustrating an outline of another exemplary method of operation of an imaging and displaying device of the present disclosure.

FIG. 21 is a flow chart illustrating an outline of another exemplary method of operation of the imaging and displaying device of the present disclosure. The operation method illustrated in FIG. 21 includes a body height information acquiring step S10, a control step S20, and an image cutout step S30. In the body height information acquiring step S10, information on the body height of a user or the height of a specific portion of the user is acquired. In the control step S20, control is performed on the basis of the information acquired in the body height information acquiring step S10. In the image cutout step S30, a human image is cut out from an image obtained by an imaging device. In the control step S20, at least one of the amount of movement of a display in the display moving device 24 and the amount of movement of a camera in the camera moving device 14 may be set. In the image cutout step S30, processing may can be executed so that the cutout position of the image becomes lower as the body height of the user or the height of the specific portion of the user becomes lower. In the image cutout step S30, processing can be executed so that the cutout position of the image becomes higher as the height of the imaging device 10 becomes lower.

Embodiment 5

Figure 15A:
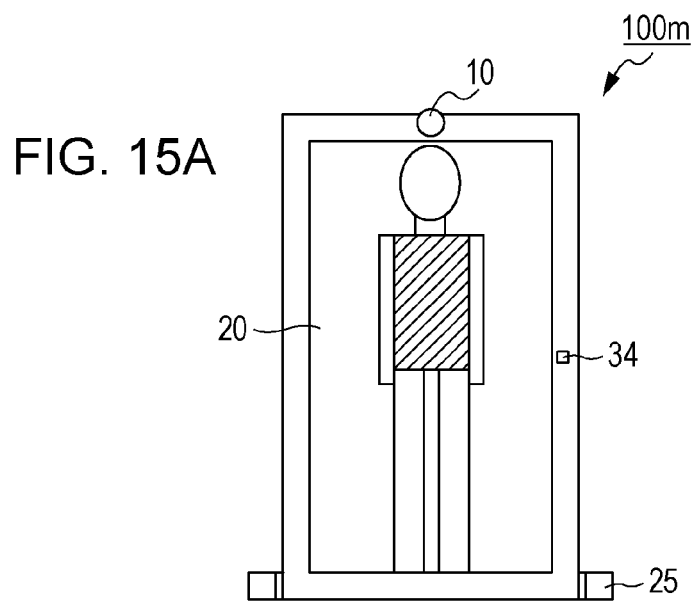
FIG. 15A is a front view of an imaging and displaying device disposed at a point A.
Figure 15B:
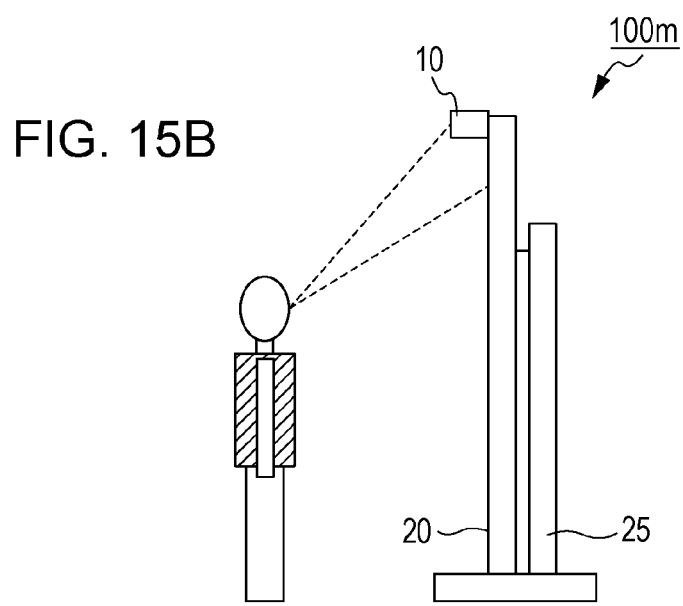
FIG. 15B is a side view of the imaging and displaying device disposed at the point A.
Figure 15C:
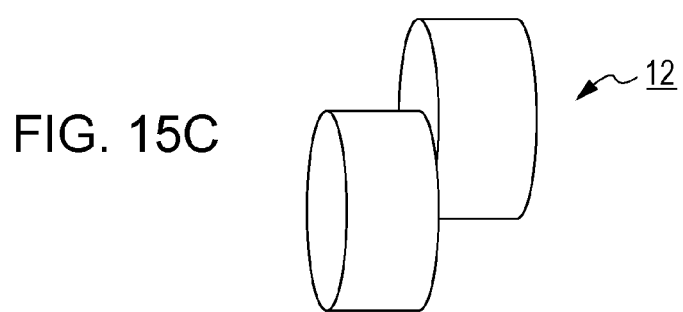
FIG. 15C is a view visualizing a shift amount in an optical axis shift device in the state illustrated in FIG. 15B.
Figure 15D:
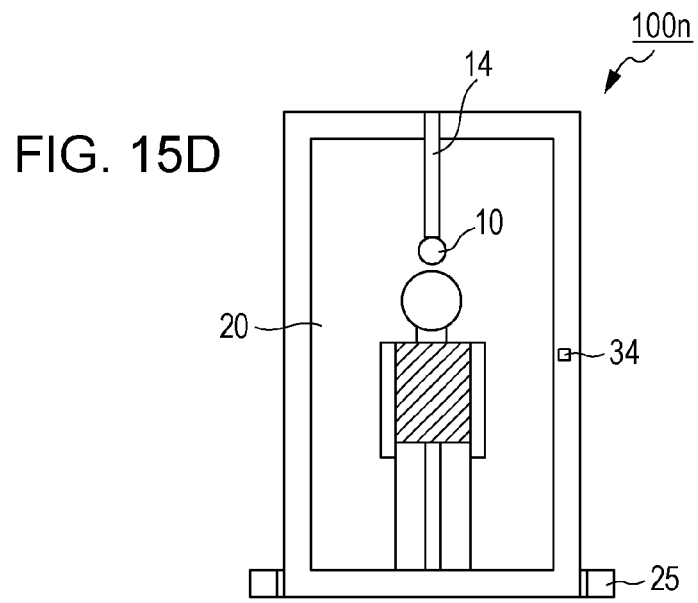
FIG. 15D is a front view of an imaging and displaying device disposed at a point B that is different from the point A.
Figure 15E:
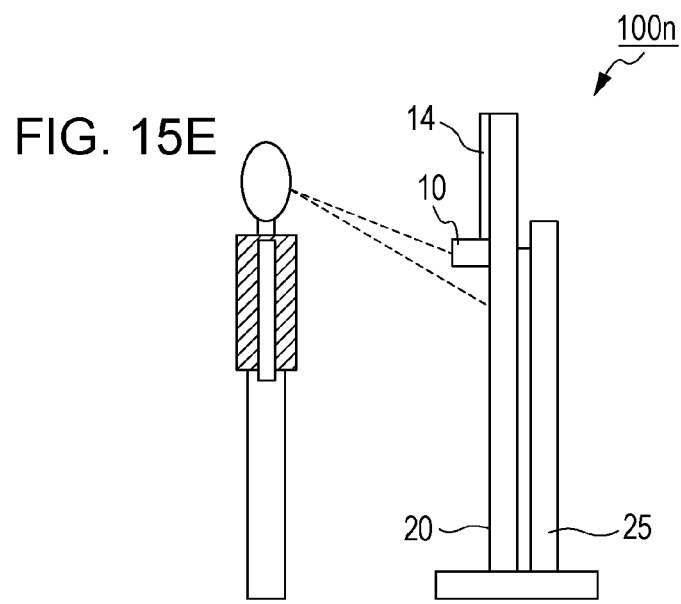
FIG. 15E is a side view of the imaging and displaying device disposed at the point B that is different from the point A.
Figure 15F:
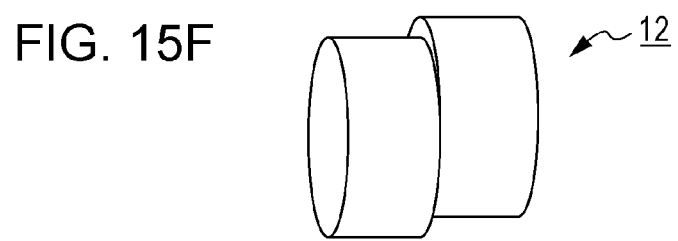
FIG. 15F is a view visualizing a shift amount in an optical axis shift device in the state illustrated in FIG. 15E.
Figure 15G:
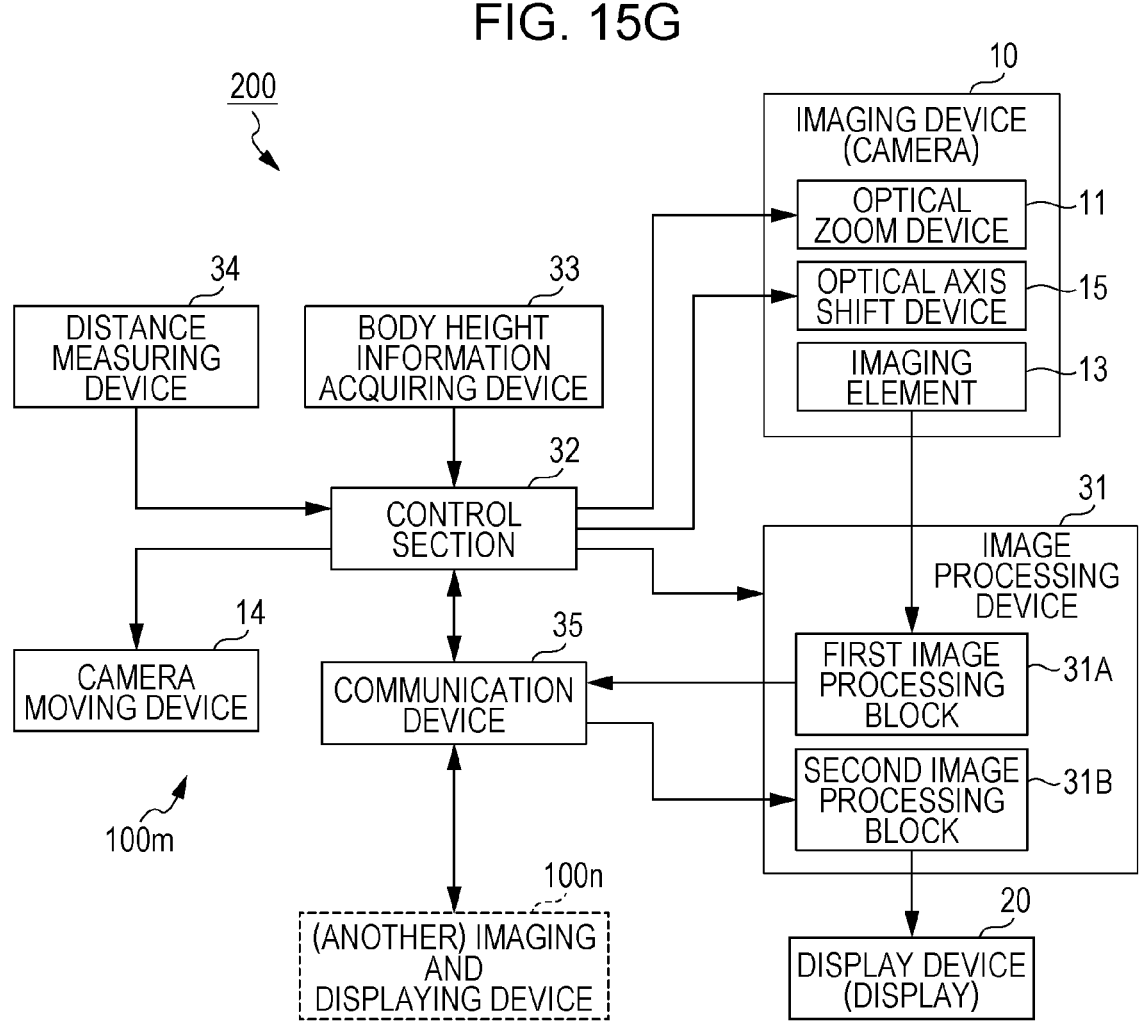
FIG. 15G is a block diagram illustrating an example of an outline configuration of the imaging and displaying device disposed at the point A.

Embodiment 5 of the present disclosure is described with reference to FIGS. 15A through 15G. In the present embodiment, a remote communication system using an imaging and displaying device is described. FIGS. 15A through 15G are schematic views for explaining an example of a configuration of a remote communication system 200. FIGS. 15A and 15B illustrate an imaging and displaying device 100m disposed at a point A. FIGS. 15D and 15E illustrate an imaging and displaying device 100n disposed at a point B that is different from the point A. FIGS. 15A and 15D are front views of a display 20. FIGS. 15B and 15E are side views that correspond to FIGS. 15A and 15D, respectively. FIGS. 15C and 15F are views visualizing a shift amount in an optical axis shift device in the states illustrated in FIGS. 15B and 15E, respectively. FIG. 15G is a block diagram illustrating an example of an outline configuration of the imaging and displaying device 100m disposed at the point A.

In each of the imaging and displaying devices 100m and 100n of the present embodiment, a camera moving device 14 is provided and an imaging device 10 is movable up and down as in Embodiment 2. An example in which two persons having different body heights remotely communicate with each other by using the imaging and displaying devices 100m and 100n is described. For example, it is assumed that a person whose body height is low is present at the point A and a person whose body height is high is present at the point B.

At the point A, the person with a high body height present at the point B is being displayed on the display 20 of the imaging and displaying device 100m as illustrated in FIG. 15A. An image displayed on the display 20 of the imaging and displaying device 100m is an image taken by the imaging and displaying device 100n at the point B. In this case, in the imaging and displaying device 100m disposed at the point A, a control section 32 controls the camera moving device 14 so that the imaging device 10 is located slightly higher than the position of the head of the person with a high body height displayed on the display 20 as illustrated in FIG. 15B. Meanwhile, at the point B, the person with a low body height present at the point A is being displayed on the display 20 of the imaging and displaying device 100n as illustrated in FIG. 15D. An image displayed on the display 20 of the imaging and displaying device 100n is an image taken by the imaging and displaying device 100m at the point A. In this case, in the imaging and displaying device 100n disposed at the point B, the control section 32 controls the camera moving device 14 so that the imaging device 10 is located slightly higher than the position of the head of the person with a low body height displayed on the display 20 as illustrated in FIG. 15E. That is, the height of the imaging device 10 in an imaging and displaying device that is present on one user's side depends on the body height of the other user.

A specific example of a flow of control is described with reference to the block diagram of FIG. 15G. Note that the imaging and displaying device 100n disposed at the point B can have a similar configuration to the imaging and displaying device 100m disposed at the point A. Therefore, illustration and description of the imaging and displaying device 100n are omitted. In the example illustrated in FIG. 15G, the imaging and displaying device 100m includes a communication device (typically, a communication circuit) 35 that transmits and receives image data and the like to and from another imaging and displaying device (in the present embodiment, the imaging and displaying device 100n disposed at the point B). In the present embodiment, the imaging device 10 includes an optical zoom device 11, an optical axis shift device 15, and an imaging element 13.

Light from a subject enters the imaging device 10. A zoom ratio of an image of the subject is optically adjusted by the optical zoom device 11. The zoom ratio in the optical zoom device 11 can be determined by the control section 32 on the basis of distance information supplied from a distance measuring device 34. The light enters the imaging element 13 via an optical system whose optical axis has been shifted by the optical axis shift device 15. In the imaging element 13, the light from the subject is converted to an electrical signal. The video signal (or the image signal) that is output from the imaging element 13 is supplied to an image processing device 31. In the configuration illustrated in FIG. 15G, the image processing device 31 includes a first image processing block 31A and a second image processing block 31B. The signal supplied to the image processing device 31 is subjected to image processing such as image quality correction in the first image processing block 31A. The first image processing block 31A may execute processing for magnifying an image on the basis of a magnification ratio determined by the control section 32. The first image processing block 31A can be a signal processing circuit that executes signal processing for transmission of image data. The image data that has been subjected to the image processing is transmitted to another imaging and displaying device via a communication device 35 by using, for example, optical communications. In the present embodiment, information on the body height of the user present at the point A that is acquired by a body height information acquiring device 33 is also transmitted to the imaging and displaying device via the control section 32 and the communication device 35.

The communication device 35 receives information transmitted from another imaging and displaying device (in the present embodiment, the imaging and displaying device 100n at the point B). The information transmitted from the imaging and displaying device 100n can include image data acquired by the imaging and displaying device 100n and information on the body height of the user present at the point B. The image data transmitted from the imaging and displaying device 100n is supplied to the image processing device 31 via the communication device 35. The image data from the imaging and displaying device 100n is subjected to image processing such as image quality correction and processing for magnifying or reducing an image according to the size of the display in the second image processing block 31B. The second image processing block 31B can be a signal processing circuit that executes processing with respect to a received signal. The data (for example, the video signal) that has been subjected to image processing is supplied to the display 20, and thus the image of the user present at the point B is displayed on the display 20. The information on the body height of the user present at the point B is sent to the control section 32 via the communication device 35. The control section 32 controls the camera moving device 14 in accordance with the information on the body height of the user present at the point B. In this way, the height of the imaging device 10 is changed. Furthermore, the control section 32 controls the shift amount in the optical axis shift device 15 in accordance with the height of the imaging device 10.

According to the present embodiment, the body shape of the user present at a remote place can be displayed with little distortion. Furthermore, the imaging device 10 can be moved to a position right above the face of a communication partner displayed on the display 20. By performing control so that the imaging device 10 is located right above the face of the communication partner displayed on the display 20, the deviation angle can be within 9°. It is therefore possible to achieve matching of the user's line of sight and the line of sight of the communication partner.

The configuration of the imaging and displaying devices 100m and 100n is not limited to the configuration in which the imaging device 10 is movable up and down as in Embodiment 2. An imaging and displaying device in which the imaging device 10 is fixed may be used as in Embodiment 1. An imaging and displaying device in which the imaging device 10 is fixed on the display 20 and the display 20 is movable up and down may be used as in Embodiment 3. For example, the control section 32 may be configured to set at least one of the shift amount in the optical axis shift device 15, the amount of movement of the display in the display moving device 24, and the amount of movement of a camera in the camera moving device 14 on the basis of information on the body height of the communication partner that is transmitted from another imaging and displaying device.

Embodiment 6

Embodiment 6 of the present disclosure is described with reference to FIGS. 16A through 16G. The present embodiment also relates to an example of a remote communication system using an imaging and displaying device. As the imaging and displaying device, an imaging and displaying device that has a similar configuration to that of Embodiment 5 can be used.

Figure 16A:
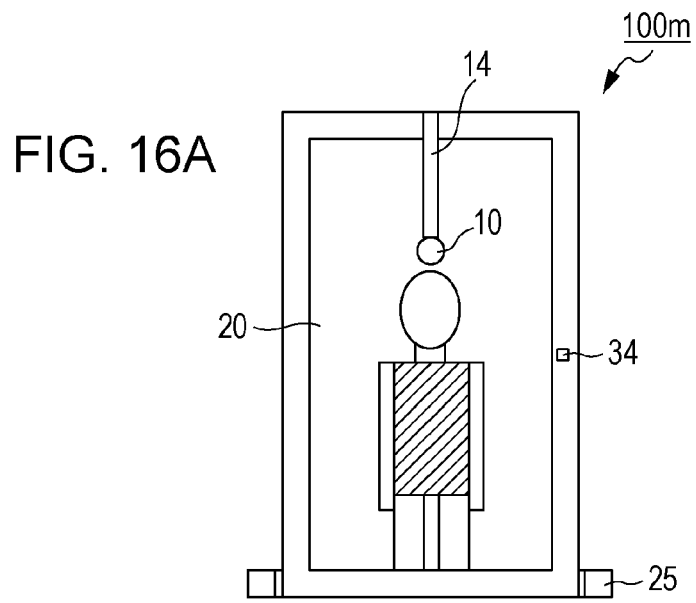
FIG. 16A is a front view of the imaging and displaying device disposed at the point A.
Figure 16B:
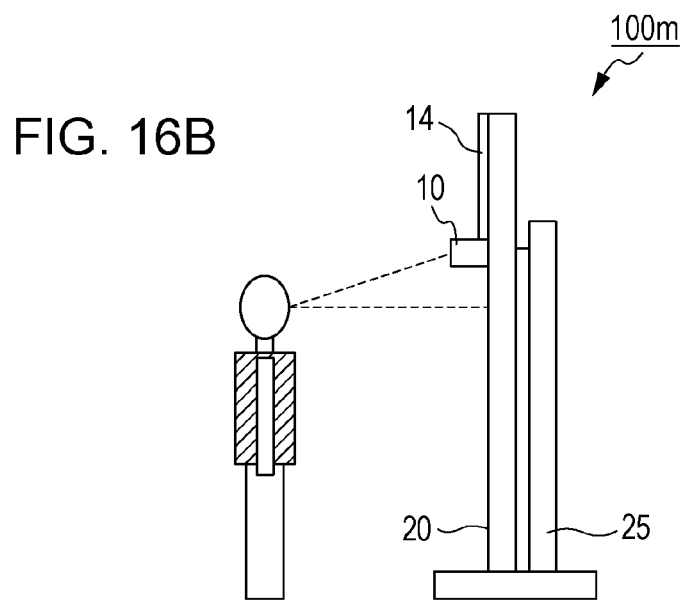
FIG. 16B is a side view of the imaging and displaying device disposed at the point A.
Figure 16C:
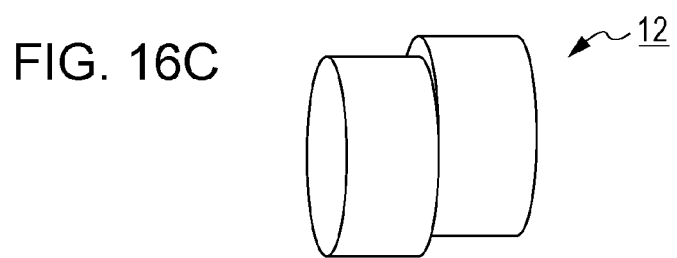
FIG. 16C is a view visualizing a shift amount in an optical axis shift device in the state illustrated in FIG. 16B.
Figure 16D:
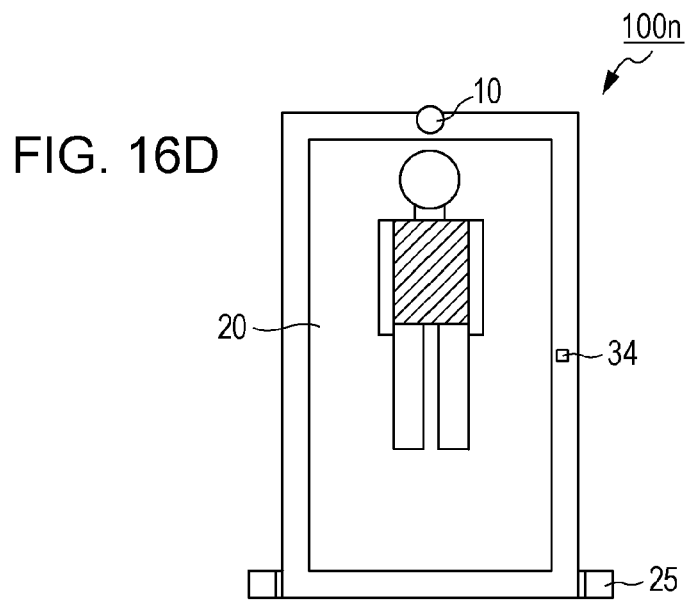
FIG. 16D is a front view of the imaging and displaying device disposed at the point B that is different from the point A.
Figure 16E:
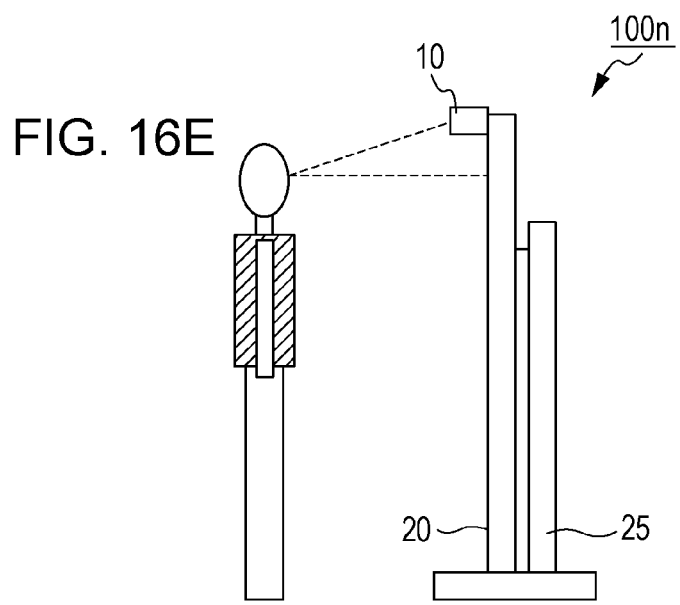
FIG. 16E is a side view of the imaging and displaying device disposed at the point B that is different from the point A.

FIGS. 16A through 16G are schematic views for explaining another example of a configuration of a remote communication system. FIGS. 16A and 16B illustrate an imaging and displaying device 100m disposed at a point A. FIGS. 16D and 16E illustrate an imaging and displaying device 100n disposed at a point B that is different from the point A. FIGS. 16A and 16D are front views of a display 20. FIGS.

Figure 16F:
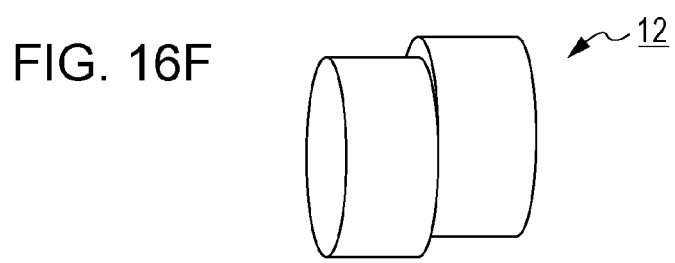
FIG. 16F is a view visualizing a shift amount in an optical axis shift device in the state illustrated in FIG. 16E.
Figure 16G:
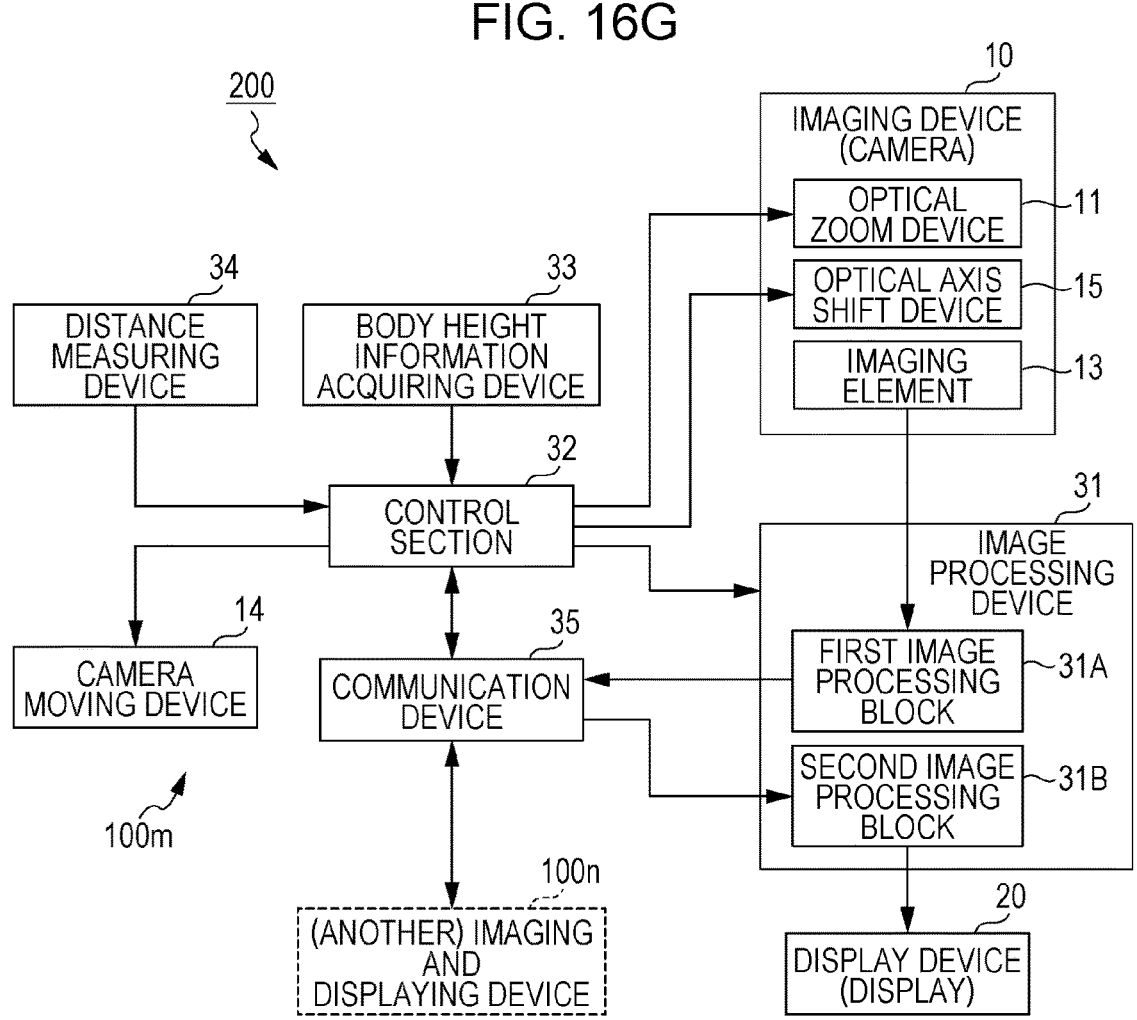
FIG. 16G is a block diagram illustrating an outline configuration of the imaging and displaying device disposed at the point A.

16B and 16E are side views that correspond to FIGS. 16A and 16D, respectively. FIGS. 16C and 16F are views visualizing a shift amount in an optical axis shift device in the states illustrated in FIGS. 16B and 16E, respectively. FIG. 16G is a block diagram illustrating an example of an outline configuration of the imaging and displaying device 100m disposed at the point A. The imaging and displaying device 100n disposed at the point B can have a similar configuration to the imaging and displaying device 100m disposed at the point A. Therefore, illustration and description of the imaging and displaying device 100n are omitted.

A difference from Embodiment 5 is that the face of a communication partner displayed on a screen is displayed at the same height as the face of a user regardless of the body height of the communication partner. In the present embodiment, a control section 32 controls a camera moving device 14 so that an imaging device 10 is located slightly higher than the body height of the user.

A specific example of a flow of control is described with reference to the block diagram of FIG. 16G. In the present embodiment, body height information of the user obtained by a body height information acquiring device 33 is used in control of the camera moving device 14 by the control section 32. For example, the imaging and displaying device 100m disposed at the point A causes the body height information acquiring device 33 to acquire information on the body height of the user present at the point A. The control section 32 in the imaging and displaying device 100m controls the camera moving device 14 in the imaging and displaying device 100m on the basis of the information on the body height of the user present at the point A. This moves the imaging device 10 to a position slightly higher than the body height of the user present at the point A. In this case, the shift amount in the optical axis shift device 15 may be a fixed value that does not depend on the body height of the user.

An image of the user present at the point B taken by the imaging and displaying device 100n is displayed on the display 20 of the imaging and displaying device 100m. The control section 32 controls the image processing device 31 so that the face of the user present at the point B is displayed at the same height as the face of the user present at the point A on the basis of information on the body height of the user present at the point A. In displaying the image of the user present at the point B, cutout of the image of the user present at the point B may be performed. In this way, the face of the communication partner is displayed at the same height as the face of the user as illustrated in FIG. 16A.

Similar processing to that in the imaging and displaying device 100m disposed at the point A is also executed in the imaging and displaying device 100n disposed at the point B. That is, the control section 32 in the imaging and displaying device 100n controls the image processing device 31 so that the face of the user present at the point A is displayed at the same height as the face of the user present at the point B on the basis of information on the body height of the user present at the point B. In this way, the face of the communication partner can be displayed at the same height as the face of the user as illustrated in FIG. 16D.

According to the present embodiment, the body height of a user present at a remote place can be displayed with little distortion. Furthermore, since the imaging device 10 is disposed at a position slightly higher than the body height of the user, the deviation angle can be within 9°. It is therefore possible to achieve matching of the user's line of sight and the line of sight of the communication partner.

The configuration of the imaging and displaying devices 100m and 100n is not limited to the configuration in which the imaging device 10 is movable up and down as in Embodiment 2. An imaging and displaying device in which the imaging device 10 is fixed may be used as in Embodiment 1. An imaging and displaying device in which the imaging device 10 is fixed on the display 20 and the display 20 is movable up and down may be used as in Embodiment 3. For example, the control section 32 may be configured to set at least one of the shift amount in the optical axis shift device 15, the amount of movement of the display in the display moving device 24, and the amount of movement of a camera in the camera moving device 14 on the basis of information on the body height of the communication partner that is transmitted from another imaging and displaying device.

Various embodiments described above can be combined with each other as long as no contradiction occurs.

An imaging and displaying device according to the present disclosure is useful as an electronic mirror, a trial fitting simulation system, and the like. Furthermore, an imaging and displaying device according to the present disclosure is also applicable as a remote communication device and the like.

What is claimed is:

1. An imaging and displaying device comprising:
   an imaging device, an optical axis of light input to the imaging device is parallel with a floor surface, the imaging device obtains an image of a user;
   a body height information acquirer that acquires information on a body height of the user or a height of a specific portion of the user;
   a determiner that determines a position of a cutout of an image of the user in the obtained image on the basis of the acquired information;
   an image processor that cuts out the image of the user from the obtained image on the basis of the determined position of the cutout; and
   a display that displays the cutout image of the user,
   wherein the determined position of the cutout becomes lower as the body height of the user or the height of the specific portion of the user becomes lower, and
   wherein, a display position of a top of head of the user in the cutout image displayed by the display is equal to or higher than a position corresponding to the top of head of the user, and a position of a line of sight of the user in the cutout image displayed by the display matches a position of a line of sight of the user.

2. The imaging and displaying device according to claim 1, wherein at least one of the body height information acquirer, the determiner, and the image processor comprises a processor.

3. The imaging and displaying device according to claim 1, wherein:
   the imaging device is fixed on an upper part of the display.

4. The imaging and displaying device according to claim 1, wherein a cutout range of the cutout image is determined based on the line of sight of the user being imaged.

5. An imaging and displaying device comprising:
   an imaging device, an optical axis of light input to the imaging device is parallel with a floor surface, the imaging device takes an area including a user to obtain an image;
   a body height information acquirer that acquires information on a body height of the user or a height of a specific portion of the user;

a determiner that determines a height of the imaging device on the basis of the acquired information;
a camera mover that moves the imaging device up or down on the basis of the determined height of the imaging device; and
an image processor that processes an image obtained by the imaging device, of which a height is moved to the determined height;
a display that displays the processed image on a screen;
wherein the camera mover moves the imaging device in front of the screen,
wherein the determined height of the imaging device becomes lower as the body height of the user or the height of the specific portion of the user becomes lower, and
wherein, a display position of a top of head of the user in a cutout image displayed on the screen is equal to or higher than a position corresponding to the top of head of the user, and a position of a line of sight of the user in the cutout image displayed by the display matches a position of a line of sight of the user.

6. The imaging and displaying device according to claim 5, wherein the
determiner determines a position of a cutout of an image of the user in the obtained image on the basis of the acquired information,
wherein the image processor cuts out the image of the user from the obtained image on the basis of the determined position of the cutout, and
wherein the determined position of the cutout becomes higher as the determined height of the imaging device becomes lower.

7. The imaging and displaying device according to claim 5,
wherein at least one of body height information acquirer, the determiner and the image processor comprises a processor.

8. A method comprising:
taking, using an imaging device, an area including a user to obtain an image, wherein the imaging device is a device having an optical axis of input light that is parallel with a floor surface;
acquiring, using a processor, information on a body height of the user or a height of a specific portion of the user;
determining, using the processor, a position of a cutout of an image of the user in the obtained image on the basis of the acquired information;
cutting out, using an image processing device, the image of the user from the obtained image on the basis of the determined position of the cutout; and
displaying, using a display, the cutout image of the user,
wherein, the determined position of the cutout becomes lower as the body height of the user or the height of the specific portion of the user becomes lower, and
wherein, a display position of a top of head of the user in the cutout image displayed using the display is equal to or higher than a position corresponding to the top of head of the user, and a position of a line of sight of the user in the cutout image displayed by the display matches a position of a line of sight of the user.

9. A method comprising:
taking, using an imaging device, an area including a user to obtain an image, wherein the imaging device is a device having an optical axis of input light that is parallel with a floor surface;
acquiring, using a processor, information on a body height of the user or a height of a specific portion of the user;
determining, the using a processor, a height of the imaging device on the basis of the acquired information;
moving, using a camera mover, the imaging device up or down on the basis of the determined height of the imaging device;
processing, using an image processing device, an image obtained by the imaging device of which a height is moved; and
displaying the processed image on a screen,
wherein, in the moving, the imaging device is moved in front of the screen,
wherein the determined height of the imaging device becomes lower as the body height of the user or the height of the specific portion of the user becomes lower, and
wherein, a display position of a top of head of the user in a cutout image displayed on the screen is equal to or higher than a position corresponding to the top of head of the user, and a position of a line of sight of the user in the cutout image displayed by the display matches a position of a line of sight of the user.

* * * * *